United States Patent [19]

Kato et al.

[11] Patent Number: 5,625,561
[45] Date of Patent: Apr. 29, 1997

[54] APPARATUS AND METHOD FOR FEEDBACK ADJUSTING MACHINE WORKING CONDITION FOR IMPROVING DIMENSIONAL ACCURACY OF PROCESSED WORKPIECES

[75] Inventors: Chisato Kato; Yoshihiko Yamakawa, both of Toyota, Japan

[73] Assignees: Toyota Jidosha Kabushiki Kaisha; Toyotsu Engineering & Manufacturing Co., Ltd., both of Japan

[21] Appl. No.: 379,950

[22] Filed: Jan. 27, 1995

[30] Foreign Application Priority Data

Jan. 31, 1994 [JP] Japan .................. 6-009924

[51] Int. Cl.$^6$ .................. G06F 19/00; G06G 7/64; G06G 7/66
[52] U.S. Cl. .................. 364/474.35; 364/551.08
[58] Field of Search .................. 364/474.35, 474.15, 364/551.02

[56] References Cited

U.S. PATENT DOCUMENTS

| 3,628,002 | 12/1971 | Meese et al. ............ 235/151.11 |
| 4,176,396 | 11/1979 | Howatt .................. 364/551 |
| 4,669,927 | 6/1987 | Zeller .................. 408/13 |

FOREIGN PATENT DOCUMENTS

| 2-259905 | 10/1990 | Japan . |
| 2-259906 | 10/1990 | Japan . |
| 2-260001 | 10/1990 | Japan . |
| 2-260002 | 10/1990 | Japan . |
| 2-260035 | 10/1990 | Japan . |
| 2-260036 | 10/1990 | Japan . |
| 2-260039 | 10/1990 | Japan . |
| 2-260040 | 10/1990 | Japan . |
| 2-260041 | 10/1990 | Japan . |

OTHER PUBLICATIONS

Automation, vol. 35, No. 10, pp. 74–75.
U.S. application No. 08/016,979, Feb. 12, 1993.

*Primary Examiner*—Roy N. Envall, Jr.
*Assistant Examiner*—Monica Lewis
*Attorney, Agent, or Firm*—Finnegan, Henderson, Farabow, Garrett & Dunner

[57] ABSTRACT

An apparatus for feedback adjusting the working condition of a working machine on the basis of measured dimensions of processed workpieces, including a determining device for determining automatic and manual compensating values, and an applying device for applying the automatic and manual compensating values (Ui, U') to a machine controller for adjusting the machine working condition. The determining device determines the automatic compensating value on the basis of first or second estimated dimensional values of the workpieces obtained in an automatic compensating cycle. Each first estimated dimensional value is a sum of an actually measured dimension (X) of the workpiece and a last compensating value (U'), while each second estimated dimensional value is a sum of the actually measured dimension, the last compensating value and a previous compensating value (Ui-2, Ui-1) preceding the last compensating value. Also disclosed is a method of feedback adjusting the machine working condition.

6 Claims, 40 Drawing Sheets

WEIGHT

K : NUMBER OF MEASURED VALUES TO OBTAIN MOVING AVERAGE

HIGHEST INCREASE RATE

VARIABLE

LOWEST INCREASE RATE

R (μm)

T = tan θ

MEASURED VALUES X
MOVING AVERAGE VALUES P
ERROR VALUES R
DERIVATIVE T
PROVISIONAL COMPENSATING VALUES
FINAL COMPENSATING VALUES

APPARATUS AND METHOD FOR FEEDBACK ADJUSTING MACHINE WORKING CONDITION FOR IMPROVING DIMENSIONAL ACCURACY OF PROCESSED WORKPIECES

BACKGROUND OF THE INVENTION

1. Field of the Invention

The present invention relates to a feedback compensating apparatus adapted to adjust the working condition of a working machine for a workpiece to be processed next, by feeding back dimensional error data associated with already processed workpieces.

2. Discussion of the Related Art

A feedback compensating apparatus as described above is used for a working system including (a) a working machine for performing successive working operations on a plurality of workpieces, (b) machine control means for determining a working condition of the working machine on the basis of an extraneous compensating signal and controlling the working machine according to the determined working condition, and (c) a measuring device for measuring actual dimensions of the workpieces processed by the working machine. The feedback compensating apparatus is constructed so as to include (i) determining means for determining a compensating value as said extraneous compensating signal for the workpiece to be processed next, on the basis of the actual dimensions of the already processed workpieces which have been measured by the measuring device, and (ii) applying means for applying the determined compensating value to the machine control means.

In some working systems, the measuring device is adapted to measure the workpieces immediately after the workpieces are processed by the working machine. In this case, the workpiece processed under the working condition influenced by the currently effective or last compensating value is measured shortly after the working operation on that workpiece is completed. Therefore, an influence of the last compensating value appears on the last measured workpiece, and the measured dimensions of the recently processed workpieces can be used to check the last compensating value for adequacy, immediately after the last compensating value is used. Where the above-indicated feedback compensating apparatus is used for this type of working systems, it is comparatively easy to improve the accuracy of determination of the compensating values for adjusting the working condition of the working machine.

In another type of working systems, however, there exist pre-measured workpieces between the working machine and the measuring device. The pre-measured workpieces are the workpieces which have been processed by the working machine but have not been measured yet by the measuring device. These pre-measured workpieces cause a so-called "dead time", which is a time required for the first workpiece influenced by the currently effective or last compensating value to be measured by the measuring device. In other words, an influence of the last compensating value appears on the actually measured dimension after the dead time has passed after the workpiece is processed under the influence of that compensating value. For this reason, it is comparatively difficult to determine the compensating values with high accuracy, where the feedback compensating apparatus is used for the working systems of this second type in which the dead time exists.

In view of the second type of working systems, the assignees of the present application have made a research to develop an improved feedback compensating apparatus capable of dealing with the "dead time" or the existence of "pre-measured workpieces", and proposed the apparatus including (a) improved determining means for determining the present compensating value and (b) applying means for applying each determined compensating value to the machine control means for adjusting the working condition of the workpieces to be processed next. This improved determining means is adapted to store in suitable memory means dimensional values of the processed workpieces measured by the measuring device, and update the compensating value, namely, determine each present compensating value for adjusting the working condition of the workpieces to be processed next. This determination of each compensating value is made on the basis of a predetermined number of the last stored dimensional values of the workpieces which have been processed under the same working condition determined or influenced by the currently effective or last compensating value. After the present compensating value is determined at the end of each automatic compensating interval or cycle, an estimated dimensional value is obtained when each processed workpiece is measured in the next automatic compensating cycle, until the measuring device completes the measurement of the workpiece which immediately precedes the first workpiece processed under the working condition influenced by the last compensating value which precedes the compensating value to be determined next. Each estimated dimensional value is obtained on the basis of the measured dimensional value of the corresponding workpiece and the last compensating value, assuming that the workpiece whose dimension is measured was processed under the working condition influenced by the last compensating value, while the working condition for that workpiece was not in fact influenced by the last compensating value. The thus obtained estimated dimensional values are stored in the memory means, and the compensating value is updated on the basis of the stored estimated dimensional values when the number of these stored estimated values reaches a predetermined value.

The determining means indicated above is based on an assumption that the first workpiece influenced by the last determined and currently effective compensating value is measured by the measuring device at a given point of time during each automatic compensating interval or cycle which begins with the commencement of storing of the measured values and ends with the determination of the present automatic compensating value used for the workpieces to processed next. Referring to the schematic view of FIG. 38 in which each rectangular block indicates an automatic compensating interval or cycle, an influence of the last compensating value Ui-1 determined at the end of a given compensating cycle appears on the dimensional values actually measured by the measuring device at a given point of time during the next compensating cycle in which the present compensating value Ui is determined. In FIG. 38, the influences of the compensating values U are indicated by stepped drops of the actually measured value indicated by solid line. During a period from the beginning of each automatic compensating cycle to the moment at which the influence of the last compensating value Ui-1 first appears on the measured value, estimated dimensional values are obtained each by adding the last compensating value Ui-1 (currently effective value) to each actually measured value (which was not in fact influenced by the last compensating value), and the thus obtained estimated values are stored in the memory means. In the following period between the moment at which the influence of the last compensating value Ui-1 first appears on the measured value and the moment at which the present compensating value Ui is determined, the actually measured values are stored in the memory means. The present compensating value Ui is determined on the basis of a predetermined number of the stored values (which include the estimated values).

The improved feedback compensating apparatus described above does not require a manual operation of the operator of the working system when each compensating value is determined by the determining means. In some cases, however, manual compensation or adjustment of the machine working condition by the operator is desired to assure high quality of the processed workpieces. For instance, this manual adjustment is desired when the working tool (such as a grinding wheel used on a grinding machine) is replaced or changed.

Even when the working tool is changed, the automatic compensation or adjustment of the working condition of the working machine as described above permits the actual dimensions of the processed workpieces to gradually approach and finally coincide with the desired or nominal value. In a working system having the dead time or premeasured workpieces, however, the workpieces which have been processed shortly after the new working tool is used may be unacceptable as the final product, with their dimensions being outside the tolerable range, since the compensating value to adjust the working condition of the machine cannot be updated until the workpiece first processed by the new working tool is measured by the measuring device. In the light of this drawback, it is desirable to provide a quality checking station between the working machine and the measuring device, preferably at a position as near as possible to the working machine, so that the operator of the machine may inspect the processed workpieces for the processing accuracy (quality of the product), as needed, or when there arises anything that causes a comparatively large change in the measured dimensions of the processed workpieces, for example, when the working tool is changed. The operator manipulates suitable data input means to enter an appropriate manual compensating value, which is determined on the basis of a result of the inspection of the processed workpieces at the checking station. One form of the working system provided with such checking station is schematically illustrated in FIG. 39, in which the working machine, checking station and measuring device are indicated at CK 110 and 112, respectively.

The assignees of the present application has further improved the above-indicated improved feedback compensating apparatus, so that the improved determining means is capable of effecting not only the automatic compensation as described above, but also manual compensation according to a manual compensation command entered by the machine operator. The thus improved apparatus is adapted, as indicated in the schematic view of FIG. 40, such that an automatic compensating cycle is interrupted or terminated if a manual compensation command is entered by the operator during that automatic compensating cycle, and a manual compensating value U' determined based on this command is applied to the machine control means. Then, a new automatic compensating cycle is performed. In the new automatic compensating cycle, the measured dimensional values which have been stored in the memory means during the interrupted cycle are ignored or discarded, and the currently effective manual compensating value U' is added to each newly measured dimensional value, to obtain estimated dimensional values. These estimated values are the dimensions of the workpieces which are expected to be established if the workpieces were processed under the working condition adjusted or influenced by the manual compensating value U'. The estimated values are stored in the memory means, and the present automatic compensating value Ui is determined on the basis of a predetermined number of the stored estimated dimensional values.

In the second improved feedback compensating apparatus whose operation is illustrated in FIG. 40, the influence of the previous automatic compensating value Ui-2 which is determined at the end of the automatic compensating cycle immediately preceding the interrupted cycle is not taken into account to obtain the estimated dimensional values. That is, the estimated dimensional values are determined solely on the basis of the manual compensating value U', which is the last compensating value. However, the influences of not only the manual compensating value U' but also the previous automatic compensating value Ui-2 should be taken into account, for the initial period from the beginning of the new automatic compensating cycle to the moment at which the influence of the previous automatic compensating value Ui-2 first appears on the actually measured dimension, as indicated in the schematic view of FIG. 41 wherein the new automatic compensating cycle is indicated by a complete rectangular block. That is, both of the compensating values Ui-2 and U' should have influenced the measured dimensions of the processed workpieces if the workpieces were processed under the working condition influenced by these two compensating values. Therefore, some of the estimated dimensional values determined by the manual compensating value U'only may be considerably different from the value which accurately reflect the actual current working condition which is influenced by both of the manual compensating value U' and the previous automatic compensating value Ui-2. Thus, the use of the manual compensating value U' only to obtain the estimated values does not assure accurate estimation of the actual working condition and suitable determination of the present automatic compensating value Ui for the workpieces to be processed next.

It will be understood that the second improved feedback compensating apparatus suffers from a problem that some of the estimated dimensional values obtained in an automatic compensating cycle following the generation of a manual compensation command considerably deviate from the dimension of the workpieces that should be obtained when the workpieces are processed under the actual working condition, whereby the accuracy of determination of the automatic compensating value tends to be deteriorated.

The above problem is encountered not only when the manual compensating value is entered during the automatic compensation, but also when only the manual compensation alone is effected continuously. Further, the problem is encountered also when only the automatic compensation alone is effected continuously. This may be caused because the influence of the last automatic compensating value does not necessarily appear on the measured workpiece dimensions in the present automatic compensating cycle during the continuous automatic compensation, contrary to the assumption described above. For example, the influences of two successive previous automatic compensating values Ui-2 and Ui-1 (one of which is the last compensating value) may appear in the present automatic compensating cycle.

SUMMARY OF THE INVENTION

It is therefore a first object of the present invention to provide a feedback compensating apparatus which permits improved accuracy of determination of the automatic compensating value and which is adapted to obtain estimated dimensional values of the processed workpieces for updating the automatic compensating value, while taking into account a possibility that two successive previous compensating values (automatic or manual) may influence the actual working condition of the working machine.

It is an optional second object of this invention to provide such feedback compensating apparatus that is adapted to effectively utilize the dimensions of the processed workpieces measured prior to the generation of a manual compensating command, to determine the present automatic compensating value, so as to permit early determination of the automatic compensating value after the generation of the manual compensation command, for thereby improving the processing accuracy of the workpieces.

It is a third object of this invention to provide a method of processing the workpieces with improved accuracy, while taking into account the manual compensating value as well as the actually measured dimensions of the processed workpieces.

The first object may be achieved according to a first aspect of the present invention, which provides a feedback compensating apparatus for a working system including, as indicated in the block diagram of FIG. 36, (a) a working machine 1 for performing successive working operations on a plurality of workpieces, (b) machine control means 2 for determining a working condition of the working machine on the basis of an extraneous compensating signal and controlling the working machine according to the determined working condition, and (c) a measuring device 3 for measuring dimensional values of the workpieces processed by the working machine, the measuring device 3 being positioned relative to the working machine 1 such that there exist pre-measured workpieces which have been processed by the working machine 1 and which have not been measured by the measuring device 3, the feedback compensating apparatus including, as also indicated in FIG. 36, compensating value determining means 4 for determining an automatic compensating value as the extraneous compensating signal for the workpieces to be processed next, on the basis of a plurality of the dimensional values which have been measured by the measuring device and stored in memory means, and compensating value applying means 5 for applying the determined automatic compensating value to the machine control means 2, wherein the compensating value determining means 4 is operable in an automatic compensation mode in which each automatic compensating cycle begins with commencement of the storing in the memory means of the dimensional values of the workpieces measured by the measuring device 3 and ends with determination of a present automatic compensating value, and in a manual compensation mode in which a manual compensating value is determined also as the extraneous compensating signal in response to and on the basis of a manual compensation command entered by an operator of the working system. The compensating value determining means 4 includes a first and a second operating state which are selectable in the automatic compensation mode. The compensating value determining means 4 operates in the first operating state to determine the present automatic compensating value on the basis of a plurality of first estimated dimensional values of the workpieces which are stored in the memory means in the automatic compensating cycle. Each first estimated dimensional value is obtained by adding a last compensating value (U') to the dimensional value of the corresponding workpiece which is measured by the measuring device 3, on an assumption that the corresponding workpiece is processed under the working condition influenced by the last compensating value. The compensating value determining means 4 operates in the second operating state to determine the present automatic compensating value on the basis of a plurality of second estimated dimensional values of the workpieces which are stored in the memory means in the automatic compensating cycle. Each second estimated dimensional value is obtained by adding a sum of the last compensating value and a previous compensating value immediately preceding the last compensating value, to the dimensional value of the corresponding workpiece which is measured by the measuring device. The compensating value applying means 5 applies the present automatic compensating value and the manual compensating value to the machine control means 2.

It is noted that the last compensating value and/or the previous compensating value which is/are added to the measured dimensional values to obtain the first or second estimated dimensional values may be either the automatic compensating value determined in the automatic compensation mode or the manual compensating value determined in the manual compensation mode.

It is also noted that the first and second operating states may be selected in respective different portions of the same automatic compensating cycle, or in respective different automatic compensating cycles. In the latter case, the compensating value determining means 4 is held in the first operating state throughout a given automatic compensating cycle, and in the second operating state throughout another automatic compensating cycle.

In the feedback compensating apparatus of the present invention constructed as described above, the compensating value determining means uses two different rules to obtain the first and second estimated dimensional values, that is, two different rules to determine the present automatic compensating value, in the automatic compensation mode. These different rules are used in the respective first and second operating states, which are selected depending upon whether the dimensional values of the processed workpieces which are actually measured in the relevant automatic compensating cycle should have been influenced by only one compensating value (i.e., last compensating value), or by two compensating values (i.e., last compensating value and the previous compensating value which immediately precedes the last compensating value). Namely, the compensating value determining means is constructed with a recognition that the current working condition of the machine may be influenced by two compensating values which precede the present automatic compensating value to be determined. Described in detail, the compensating value determining means 4 operates in the first operating state to obtain each first estimated dimensional value by adding the last compensating value to the dimensional value of the corresponding workpiece measured by the measuring device 3, on an assumption that the obtained first estimated dimensional value should have been measured by the measuring device 3 if the corresponding workpiece was processed under the working condition influenced by the last compensating value. In the second operating state, the compensating value determining means obtains each second estimated dimensional value by adding the sum of the last compensating value and the immediately preceding compensating value to the measured dimensional value of the corresponding workpiece.

In the present feedback compensating apparatus, the estimated dimensional values used to determine the present automatic compensating value are determined with both the previous compensating value and the last compensating value taken into account in the second operating state of the compensating value determining means. The second operating state is selected where these two compensating values influence the current working condition of the working machine. Therefore, even if the actually measured dimensional values do not reflect the influence of the previous compensating value, the present compensating value can be suitably determined with high accuracy on the basis of the estimated dimensional values which accurately reflect the actual working condition of the machine. Thus, the present apparatus assures improved accuracy of determination of the automatic compensating value.

In one form of the present invention, the apparatus is adapted such that when the manual compensation command is generated in a present automatic compensating cycle, the compensating value determining means (4) terminates the present automatic compensating cycle, determines the manual compensating value, and then starts a new automatic compensating cycle in which the present automatic compensating value is determined.

The above form of the apparatus may deal with two different cases which will be described by reference to the schematic views of FIGS. 37(a) and 37(b), respectively. In the first case indicated in FIG. 37(a), an influence of a previous automatic compensating value (Ui-2) determined in a previous automatic compensating cycle which immediately precedes the present automatic compensating cycle appears on the measured dimensional values of the processed workpieces in the new automatic compensating cycle, before an influence of the manual compensating value (U') appears on the measured dimensional values. In FIGS. 37(a) and 37(b), the new automatic compensating cycle is indicated by a complete rectangular block. In the second case indicated in FIG. 37(b), the influence of the previous automatic compensating value (Ui-2) appears on the measured dimensional values of the workpieces in the present automatic compensating cycle which is terminated upon generation of the manual compensation command, while the influence of the manual compensating value (U') appears on the measured dimensional values in the new automatic compensating cycle.

In the first case of FIG. 37(a) wherein the influence of the previous automatic compensating value (Ui-2) appears on the measured workpiece dimensions after the manual compensating value (U') is applied to the machine control means (2), the new automatic compensating cycle consists of a first period from the beginning of the new compensating cycle to a first moment at which the influence of the previous automatic compensating value (Ui-2) appears on the measured dimensional values, a second period from the first moment to a second moment at which the influence of the manual compensating value (U') appears on the measured dimensional values, and a third period from the second moment to an end of the new automatic compensating cycle. In this case, the compensating value determining means (4) operates to obtain the second estimated dimensional values by adding a sum of the previous automatic compensating value (Ui-2) as the previous compensating value and the manual compensating value (U') as the last compensating value to each of the dimensional values (X) of the workpieces measured in the first period, and obtain the first estimated dimensional values by adding only the manual compensating value (U') to each of the dimensional values of the workpieces measured in the second period. The compensating value determining means stores in the memory means the obtained first and second estimated dimensional values, and the dimensional values of the workpieces which are measured by the measuring device (3) in the third period.

In the second case of FIG. 37(b), the influence of the previous automatic compensating value (Ui-2) appears on the measured workpiece dimensions before the manual compensating value (U') is generated at the end of the present cycle. In this second case, the new automatic compensating cycle consists of a first period from the beginning of the cycle to the moment at which the influence of the manual compensating value (U') appears on the measured workpiece dimensions, and a second period which follows the first period. In this case, the compensating value determining means (4) operates to obtain the first estimated dimensional values by adding only the manual compensating value (U') as the last compensating value to each of the dimensional values of the workpieces which are measured in the first period. The compensating value determining means stores in the memory means the obtained first estimated dimensional values and the dimensional values of the workpieces which are measured by the measuring device (3) in the second period.

However, the above form of the feedback compensating apparatus has the following drawback. That is, the compensating value determining means requires a relatively long time before the automatic compensating value (Ui) is determined in the new automatic compensating cycle, because the measured values of the processed workpieces which have been stored before the generation of the manual compensation command are ignored and discarded. Further, since the automatic compensation by the automatic compensating value (Ui) following the last manual compensating value (U') has a function of adjusting the machine working condition as determined by the last manual compensating value, a delay in determining the automatic compensating value (Ui) results in a delay in adjusting the machine working condition as influenced by the manual compensating value.

The above drawback may be solved according to another form of the present invention, which achieves the second optional object of the invention indicated above. In this form of the invention, the present automatic compensating cycle is not terminated, and the dimensional values of the workpieces measured prior to the generation of the manual compensation command as well as those measured after the generation are utilized to determine the present automatic compensating value (Ui).

The above second form of the apparatus may deal with two different cases which will be described by reference to the schematic views of FIGS. 29(a) and 29(b), respectively. In the first case indicated in FIG. 29(a), an influence of the previous automatic compensating value (Ui-1) appears on the measured dimensional values of the processed workpieces after the generation of the manual compensating value (U'), and before an influence of the last manual compensating value (U') appears on the measured dimensional values. In the second case indicated in FIG. 29(b), the influence of the previous automatic compensating value (Ui-1) appears on the measured dimensional values before the generation of the manual compensating value (U'), and an influence of the manual compensating value appears on the measured dimensional values after the generation of the manual compensating value.

In the first and second cases of FIGS. 29(a) and 29(b), the influences of the previous automatic compensating value (Ui-1) and the last manual compensating value (U') appear on the measured dimensional values of the processed workpieces in the present automatic compensating cycle, and the present automatic compensating cycle consists of a first period from a beginning thereof to a first moment at which the influence of the previous automatic compensating value (Ui-1) appears on the measured dimensional values, a second period from the first moment to a second moment at which the influence of the manual compensating value (U') appears on the measured dimensional values, and a third period from the second moment to an end of the present automatic compensating cycle. In both of the two cases, the compensating value determining means (4) operates to obtain the second estimated dimensional values by adding a sum of the previous automatic compensating value (Ui-1) as the previous compensating value and the manual compensating value (U') as the last compensating value to each of the dimensional values (X) of the workpieces which are measured in the first period. Further, the compensating value determining means further obtains the first estimated dimensional values by adding only the manual compensating value (U') as the last compensating value to each of the dimensional values of the workpieces which are measured in the second period. The compensating value determining means stores in the memory means the obtained first and second estimated dimensional values, and the dimensional values of the workpieces which are measured by the measuring device (3) in the third period.

Thus, the second form of the apparatus described above effectively utilizes the measured dimensional values of the processed workpieces which are stored before the manual compensating command is generated. This arrangement permits reduction in the time required for determining the present automatic compensating value (Ui), and relatively frequent execution of the automatic compensating cycles, which assures improved accuracy of processing of the workpieces by the working machine.

The estimated dimensional values of the processed workpieces may be obtained only after the number of the measured dimensional values stored in the memory means has reached a predetermined value.

It is possible that there are three or more compensating values which actually influence the machine working condition but do not influence the dimensional values of the processed workpieces which are measured by the measuring device. In this case, the estimated dimensional values may be obtained by adding the sum of those three or more compensating values to the actually measured dimensional values.

As schematically shown in the block diagram of FIG. 35, the working system may include an in-process measuring device (12) for measuring the dimensional values of the workpieces W while the workpieces W are being processed by the working machine (1), as well as a post-process measuring device (44) as the measuring device (3). The in-process measuring device is connected to an automatic sizing device (14), which is adapted to terminate the working operation on each workpiece when the dimensional value of each workpiece W measured by the in-process measuring device reaches a reference value. The automatic sizing device is controlled by a controller (20) which incorporates the compensating value determining means (4) and the compensating value applying means (5). The compensating value determining means is connected to the post-process measuring device (16), while the compensating value applying means (5) is connected to the automatic sizing device (14) to apply the determined automatic or manual compensating value (Ui, U') to the automatic sizing device to adjust the reference value. The compensating value determining means (4) is arranged to determine the automatic compensating value (Ui) on the basis of at least an error value (R) of the dimensional value (X) measured by said post-processing measuring device with respect to a nominal value ($A_0$).

The compensating value determining means may use not only the error value (R) but also data indicative of a tendency of change in the error value, to determine the automatic compensating value. The tendency of change in the error value means a rate at which the error value changes with an increase in the number of the processed workpieces measured by the post-process measuring device. For example, the tendency of change in the error value may be expressed by a derivative of the error value. The determining means may further use a derivative of the derivative of the error value, namely, the second derivative of the error value (R)>

The third object indicated above may be achieved according to a second aspect of the invention, which provides a method of processing a plurality of workpieces by a working system including (a) a working machine for performing successive working operations on a plurality of workpieces, (b) machine control means for determining a working condition of the working machine on the basis of an extraneous compensating signal and controlling the working machine according to the determined working condition, and (c) a measuring device for measuring dimensional values of the workpieces processed by the working machine, the measuring device being positioned relative to the working machine such that there exist pre-measured workpieces which have been processed by the machine and which have not been measured by the measuring device, the method comprising the steps of (i) determining an automatic compensating value as the extraneous compensating signal for the workpieces to be processed next, on the basis of a plurality of the dimensional values which have been measured by the measuring device and stored in memory means, (ii) determining a manual compensating value also as the extraneous compensating signal in response to and on the basis of a manual compensation command entered by an operator of the working system, and (iii) applying the determined automatic compensating value and manual compensating value to the machine control means, the method being characterized in that: the step of determining an automatic compensating value comprises successive automatic compensating cycles each of which begins with commencement of the storing in the memory means of the dimensional values of the workpieces measured by the measuring device and ends with determination of a present automatic compensating value; and in that the automatic compensation includes a first and a second state which are selectable, the automatic compensation being effected in the first state to determine the present automatic compensating value on the basis of a plurality of first estimated dimensional values of the workpieces which are stored in the memory means in the automatic compensating cycle, each of the first estimated dimensional values being obtained by adding a last compensating value to the dimensional value of the corresponding workpiece which is measured by the measuring device, on an assumption that the corresponding workpiece is processed under the working condition influenced by the last compensating value, the automatic compensation being effected in the second state to determine the present automatic compensating value on the basis of a plurality of second estimated dimensional values of the workpieces which are stored in the memory means in the automatic compensating cycle, each of the second estimated dimensional values being obtained by adding a sum of the last compensating value and a previous compensating value immediately preceding the last compensating value, to the dimensional value of the corresponding workpiece which is measured by the measuring device.

BRIEF DESCRIPTION OF THE DRAWINGS

The above and optional objects, features and advantages of this invention will be better understood by reading the following detailed description of a presently preferred embodiment of the invention, when considered in connection with the accompanying drawings, in which:

FIG. 22 is a graph explaining an example of a process implemented by the compensating routine of FIGS. 4–9 to obtain a final compensating value U* from measured values X;

DETAILED DESCRIPTION OF THE PREFERRED EMBODIMENTS

Figure 1:
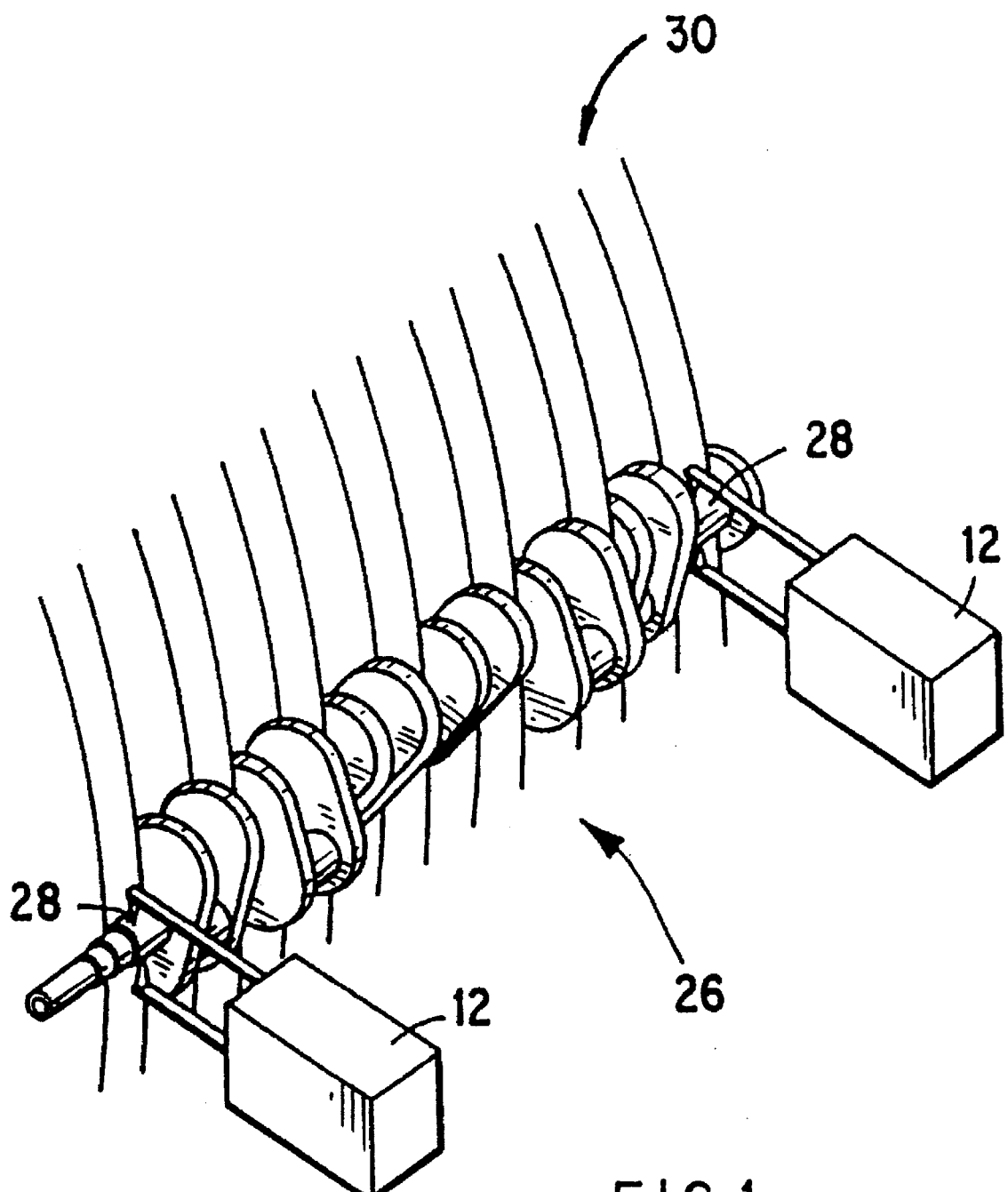
FIG. 1 is a perspective view showing a workpiece in the form of a crankshaft to be ground by an array of grinding wheels of a working system in the form of a grinding system incorporating a feedback compensating apparatus constructed according to one embodiment of the present invention.
Figure 2:
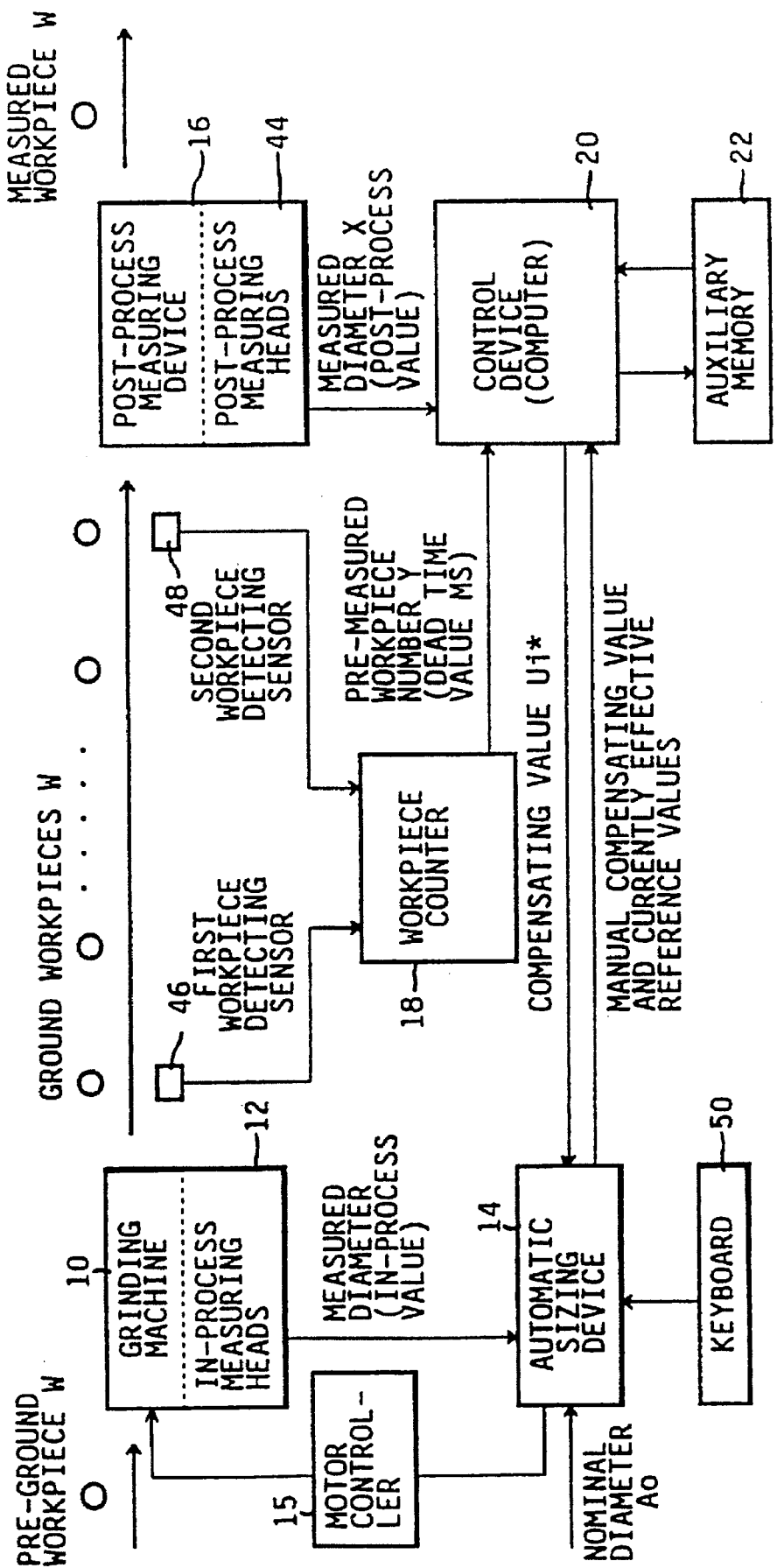
FIG. 2 is a schematic view illustrating the grinding system of FIG. 1.
Figure 3:
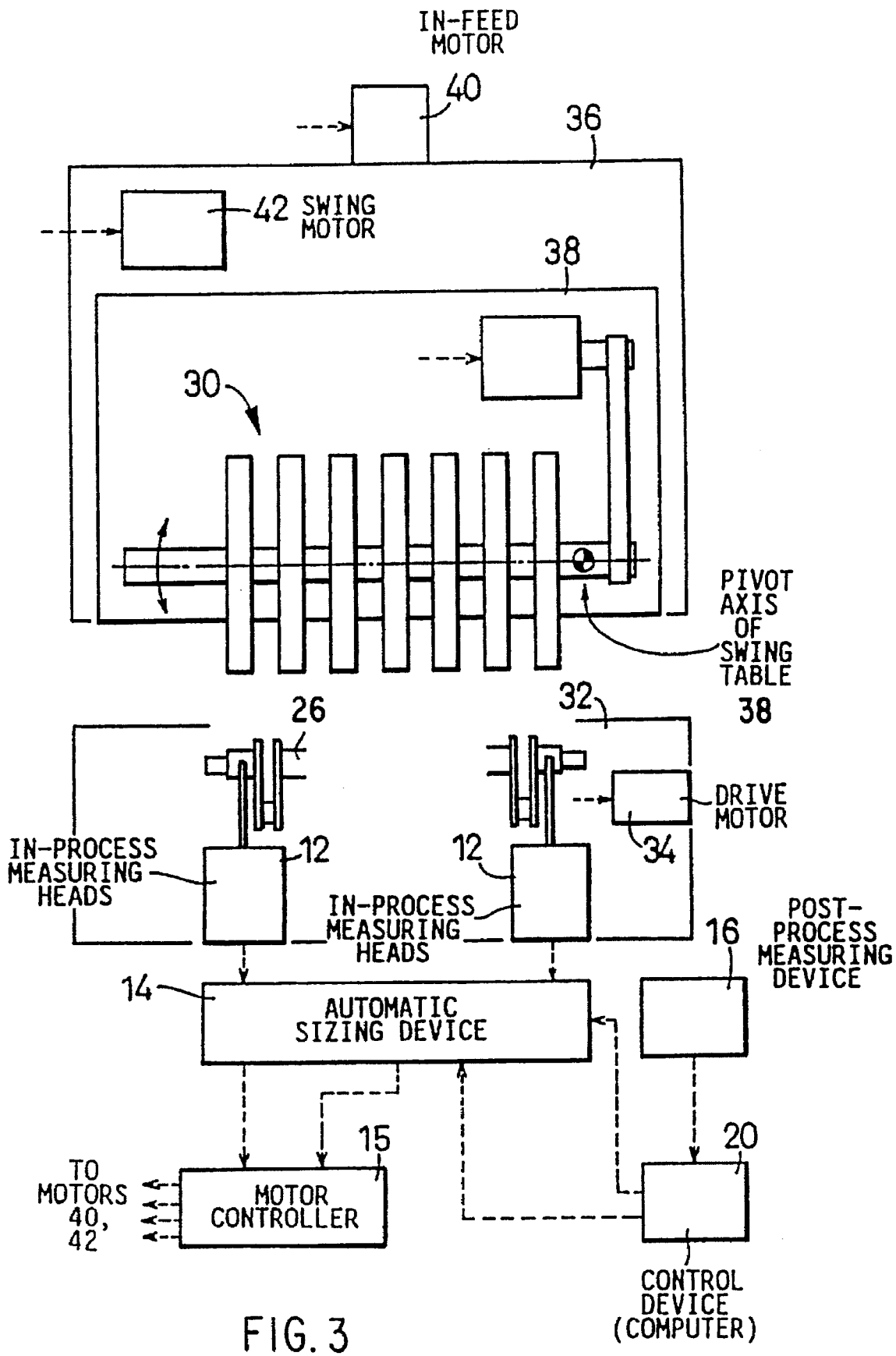
FIG. 3 is a schematic view showing in detail the construction of a grinding machine of the grinding system.

Referring first to FIGS. 1–3, there will be described an embodiment of the feedback compensating apparatus of this invention.

The present embodiment is applied to a working system in the form of a grinding system adapted to grind a workpiece in the form of a crankshaft of an engine of a motor vehicle, more specifically to grind cylindrical working portions of the crankshaft, namely, cylindrical surfaces of seven journals coaxially formed on the crankshaft. In FIG. 1, the crankshaft is indicated at 26, and the journals are indicated at 28.

As shown in FIG. 2, the grinding system includes a cylindrical grinding machine 10, two in-process measuring heads 12 (only one of which is shown in the figure), an automatic sizing device 14, a motor controller 15, a post-processing measuring device 16, a workpiece counter 18, a control device 20, and an auxiliary memory 22. The individual components of the grinding system will be described.

As indicated by thick solid lines with arrows in FIG. 2, a working line extends through the grinding system. A succession of workpieces in the form of crankshafts 26 (one of which is shown in FIG. 1) are transferred along the working line from the upstream side toward the downstream side (from left to right as seen in FIG. 2).

The grinding machine 10 employs an array of coaxial cylindrical grinding wheels 30 as shown in FIGS. 1 and 3, for performing a cylindrical grinding operation on the seven journals 28 of each crankshaft 26. In operation, the grinding wheels 30 and the crankshaft 26 are rotated in contact with each other, to simultaneously grind all of the seven journals 28.

As shown in FIG. 3, the grinding machine 10 has a work table 32 on which the crankshaft 26 as the workpiece is mounted for grinding. The work table 32 is attached to a main frame of the machine 10, and includes a holder (not shown) for rotatably supporting the crankshaft 26, and a drive motor 34 for rotating the crankshaft 26.

The grinding machine 10 also has an infeed table 36 for advancing and retracting the array of grinding wheels 30 toward and away from the work table 32, and a swing table 38 mounted on the infeed table 36. The infeed table 36 is attached to the main frame of the machine 10, and is reciprocable in the direction perpendicular to the axis of the crankshaft 26 on the work table 32. The swing table 38 is rotatable or pivotable (both clockwise and counterclockwise) in a plane parallel to the plane of FIG. 3, about a pivot axis perpendicular to those planes and also perpendicular to an axis of the grinding wheels 30 indicated by one-dot chain line in FIG. 3. The pivot axis is located near one of opposite ends of the shaft on which the wheels 30 are mounted. The infeed table 36 is reciprocated by an infeed motor 40 fixed to the main frame, and the swing table 38 is pivoted by a swing motor 42 fixed to the infeed table 36.

Thus, the angle (hereinafter referred to as "grinding angle" where appropriate) formed by the axes of rotation of the grinding wheels 30 and the crankshaft 26 can be changed by the swing motor 42.

The two in-process measuring heads 12 are attached to the grinding machine 10, to measure the diameters of the first and seventh journals 28 (hereinafter referred to as "end journals" where appropriate) which are nearest to the respective opposite ends of the crankshaft 26, as shown in FIG. 1. Each measuring head 12 is of an electrical micrometer type, having a pair of measuring probes for contact with diametrically opposite portions of the cylindrical surface of the appropriate end journal 28, to measure the diameter of the end journal 28.

The automatic sizing device 14 is electrically connected to the in-process measuring heads 12, as shown in FIGS. 2 and 3, and is principally constituted by a computer which includes a central processing unit (CPU), a read-only memory (ROM), a random-access memory (RAM) and a bus interconnecting these elements. The sizing device 14 is adapted to monitor the diameters of the end journals 28 under grinding by the machine 10, by means of the respective in-process measuring heads 12, and apply output signals to the motor controller 15, depending upon the outputs of the measuring heads 12. Described more particularly, the sizing device 14 monitors the outputs of the measuring heads 12, as schematically indicated in the block diagram of FIG. 35, to determine whether the residual amounts of infeed of the wheels 30 required to grind the end journals 28 to respective nominal diameter values Ao thereof have been reduced to respective preset values (e.g., for rough grinding) or not, or whether the residual amounts of infeed have been reduced to zero or not, namely, whether the two end journals 28 have been ground to the nominal diameter values Ao (to be established by precision or finish grinding). In other words, the sizing device 14 determines whether the output levels of the measuring heads 12 have reached reference values preset in the sizing device 14 for the end journals 28, respectively. The reference values may correspond to the final or nominal outside diameter values of the journals 28, or any desired diameter values larger than the nominal values, which desired diameter values are established by a rough grinding operation, for example. Accordingly, the signals supplied from the sizing device 14 to the motor controller 15 indicate that the end journals 28 have been ground to the nominal diameter values Ao, or the residual amounts of infeed of the wheels 30 have reached the preset values which correspond to outside diameters larger than the nominal values Ao.

The reference values preset in the automatic sizing device 14 for the end journals 28 according to the nominal diameters Ao thereof can be adjusted according to respective compensating values U (Ui*) received from the control device 20 of the compensating apparatus. This adjustment is made to assure that the actual diameters of the ground end journals 28 are exactly equal to the nominal diameter values Ao. The reference values are adjusted with the compensating values U added thereto, or remain unchanged if no compensating values U are received by the sizing device 14. Thus, the sizing device 14 is capable of automatically adjusting the presently effective reference values according to the compensating values U received from the control device 20.

As shown in FIG. 2, a keyboard 50 is connected to the automatic sizing device 14, so that the presently effective reference values of the sizing device 14 can be adjusted manually by the operator, by desired amounts entered through the keyboard 50. The sizing device 14 stores in its RAM the presently effective manually entered compensating amounts and reference values, and transmit these data to the control device 20, when the control device 20 is ready to receive such data.

As shown in FIG. 3, the motor controller 15 is electrically connected to the automatic sizing device 14 and the infeed and swing motors 40, 42. The motor controller 15 controls the infeed and swing motors 40, 42 in response to commands manually entered through the keyboard 50 and signals received from the sizing device 14.

Usually, one cycle of grinding job performed by the grinding machine 10 consists of two or more grinding steps such as a rough grinding, a precision or finish grinding, and a final spark-out operation without an infeeding action of the grinding wheels 30. The rough grinding continues until the residual amounts of infeed of the wheels 30 have been reduced to the preset values, and the precision or finish grinding continues until the diameters of the end journals 28 have become equal to the nominal values Ao, that is, until the reference values set in the sizing device 14 have been reached. Commonly, the preset residual amounts of infeed have been reached at different times for the two end journals 28, and therefore the signals indicative of the completion of the rough grinding for the two end journals 28 are generated from the sizing device 14 at different times. In the rough grinding, therefore, the swing motor 42 as well as the infeed motor 40 is controlled by the motor controller 15 to adjust the grinding angle between the axes of the wheels 30 and crankshaft 26, in order to assure substantially simultaneous completion of the roughing grinding for the two end journals 28. On the other hand, the finish grinding is effected with only the infeed motor 40 operated by the motor controller 50 to infeed the wheels 30, but with the swing motor 42 held off, since the grinding angle is considered to have been properly adjusted during the rough grinding. The finish grinding is terminated with the infeed motor 40 turned off by the sizing device 14 in response to the first received signal indicating that the reference value has been reached for one of the two end journals 28. The finish grinding is followed by the spark-out operation, and the infeed motor 40 is operated in the reverse direction to retract the array of wheels 30 from the crankshaft 26. The grinding angle may be controlled even in the finish grinding.

The post-process measuring device 16 is located on the downstream side of the working line, remote from the grinding machine 10, as shown in FIG. 2. The measuring device 16 has seven post-process measuring heads 44 corresponding to the seven journals 28 of the crankshaft 26. These measuring heads 44, which are of the same type as the in-process measuring heads 12, are adapted to measure the outside diameters of the ground journals 28 of the workpieces W transferred from the grinding machine 10. The measuring device 16 is electrically connected to an input portion of the control device 20.

The workpiece counter 18 is adapted to count the number Y of the pre-measured workpieces, i.e., ground crankshafts 26 which exist in a portion of the working line between the grinding machine 10 and the post-process measuring device 16. The workpiece counter 18 receives the output signal of a first workpiece detecting sensor 46 (e.g. limit switch) for detecting the transfer of each ground crankshaft 26 from the machine 10, and the output signal of a second workpiece detecting sensor 48 (e.g., limit switch) for detecting the transfer of each ground crankshaft 26 into the post-process measuring device 16. The number Y of the pre-measured workpieces is incremented when each ground workpiece is detected by the first sensor 46, and decremented when each pre-measured workpiece is detected by the second sensor 48. The number Y represents the value MS of a so-called "dead time".

The control device 20 is principally constituted by a computer incorporating a central processing unit (CPU), a read-only memory (ROM), a random-access memory (RAM), and a data bus interconnecting these elements. The ROM stores programs to execute a compensating control routine. The control device 20 is also connected to the auxiliary memory 22, which is used to store measured diameter values X represented by the signals from the post-process measuring device 16, compensating values U determined on the basis of the diameter values X, and various other data. The data stored in the auxiliary memory 22 can be used by the operator, after a series of grinding operation, to analyze or diagnose the grinding conditions.

A major portion of the above compensating control routine is illustrated in the flow charts of FIGS. 4–9. Before describing in detail the routine executed by the control device 20 by reference to these flow charts, the function of the present feedback compensating apparatus whose major portion is constituted by the control device 20 will be briefly described.

Figure 35:
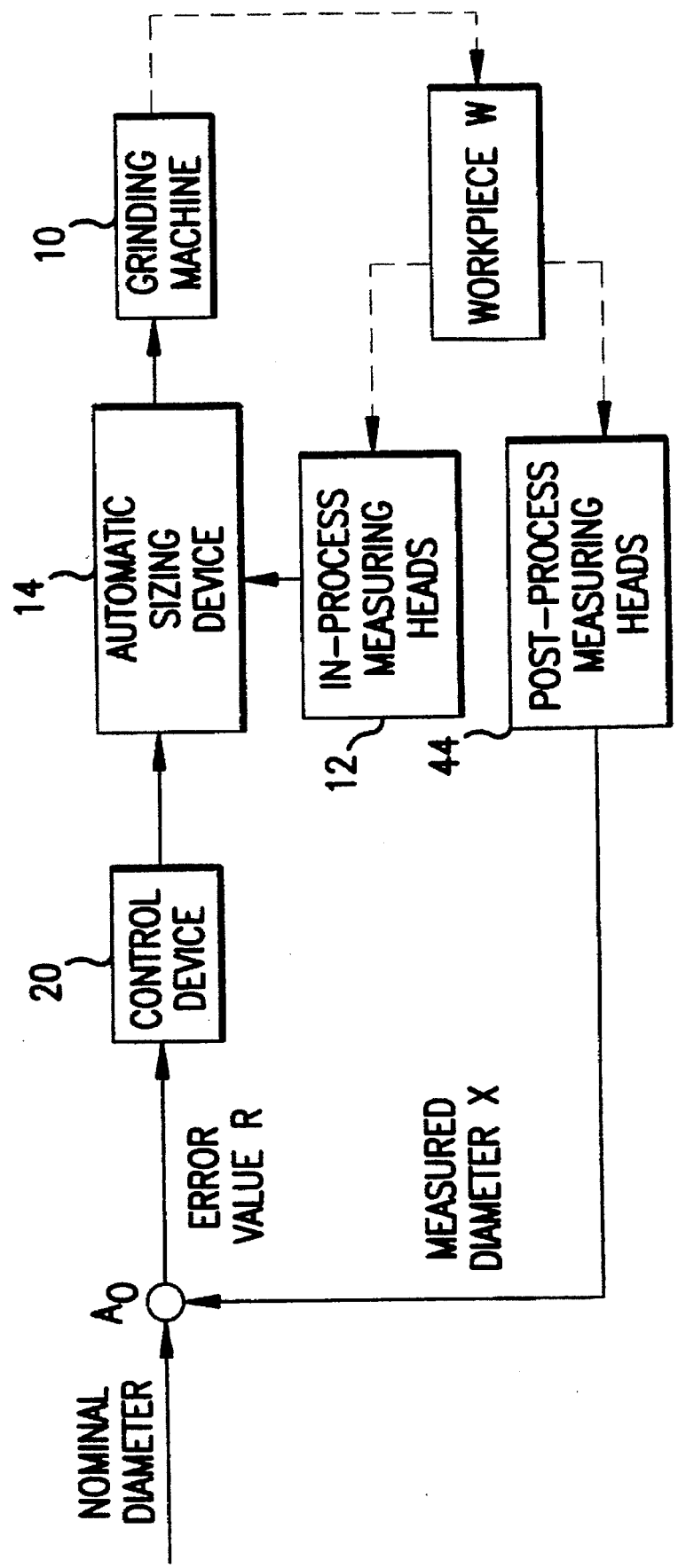
FIG. 35 is a block diagram schematically showing the arrangement of the feedback compensating apparatus of FIG. 2.

As schematically indicated in the block diagram of FIG. 35, the control device 20 is adapted to determine the compensating values U for adjusting or changing the respective reference values with which the outputs of the two in-process measuring heads 12 are compared by the automatic sizing device 14, for controlling the workpieces W to be subsequently ground. The compensating values U are determined on the basis of the diameter values X measured by the post-process measuring heads 44. The present working system in the form of the grinding system is adapted such that there exist a predetermined number of pre-measured workpieces W (crankshafts 26) between the working machine (grinding machine 10 and the post-measuring device 16. Thus, the present feedback control can be considered to be applied to a control system which receives as an input signal the compensating values U, and produces as an output signal the dimensional data representative of the measured diameter values X, and which has the dead time (dead time value MS represented by the number Y of the pre-measured workpieces) between the moments of generation of the input and output signals.

Figure 9A:
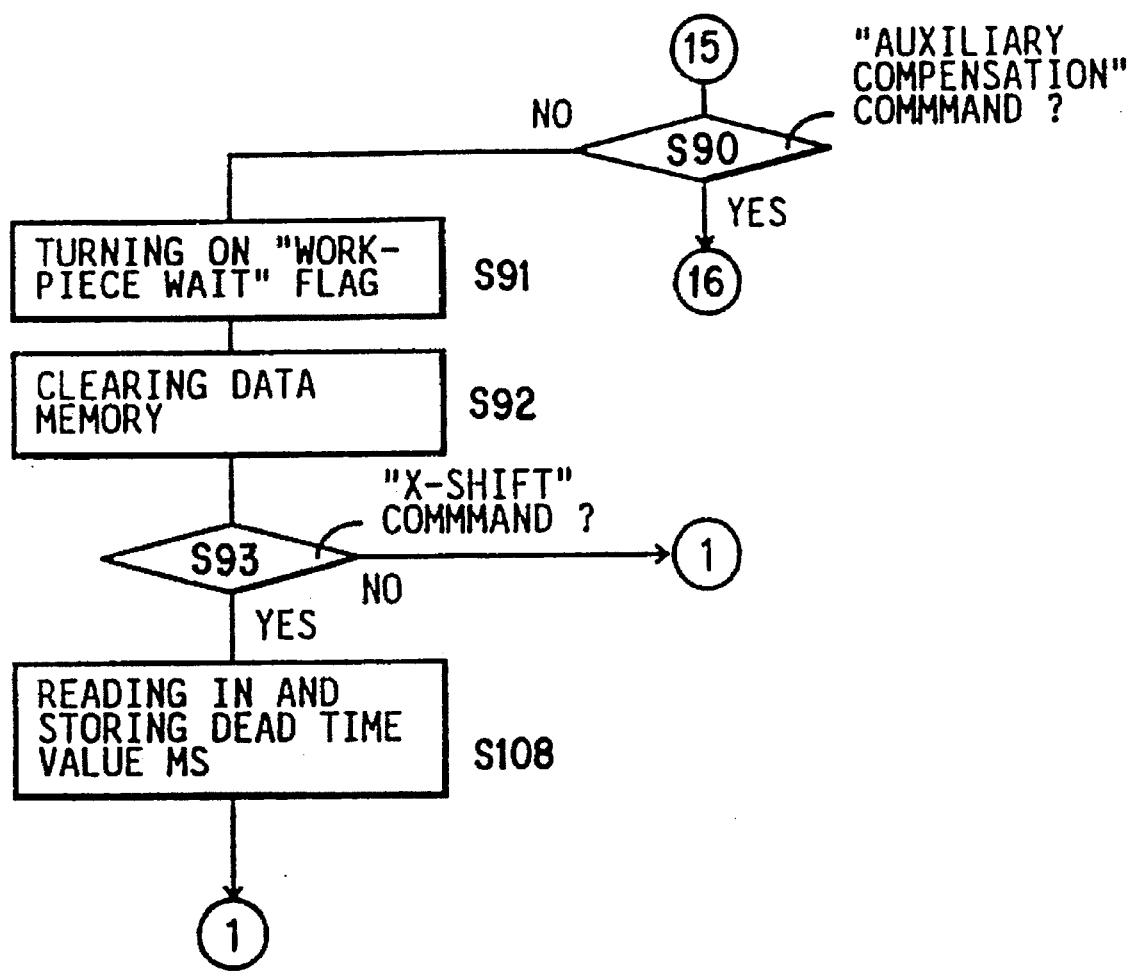
Figure 9B:
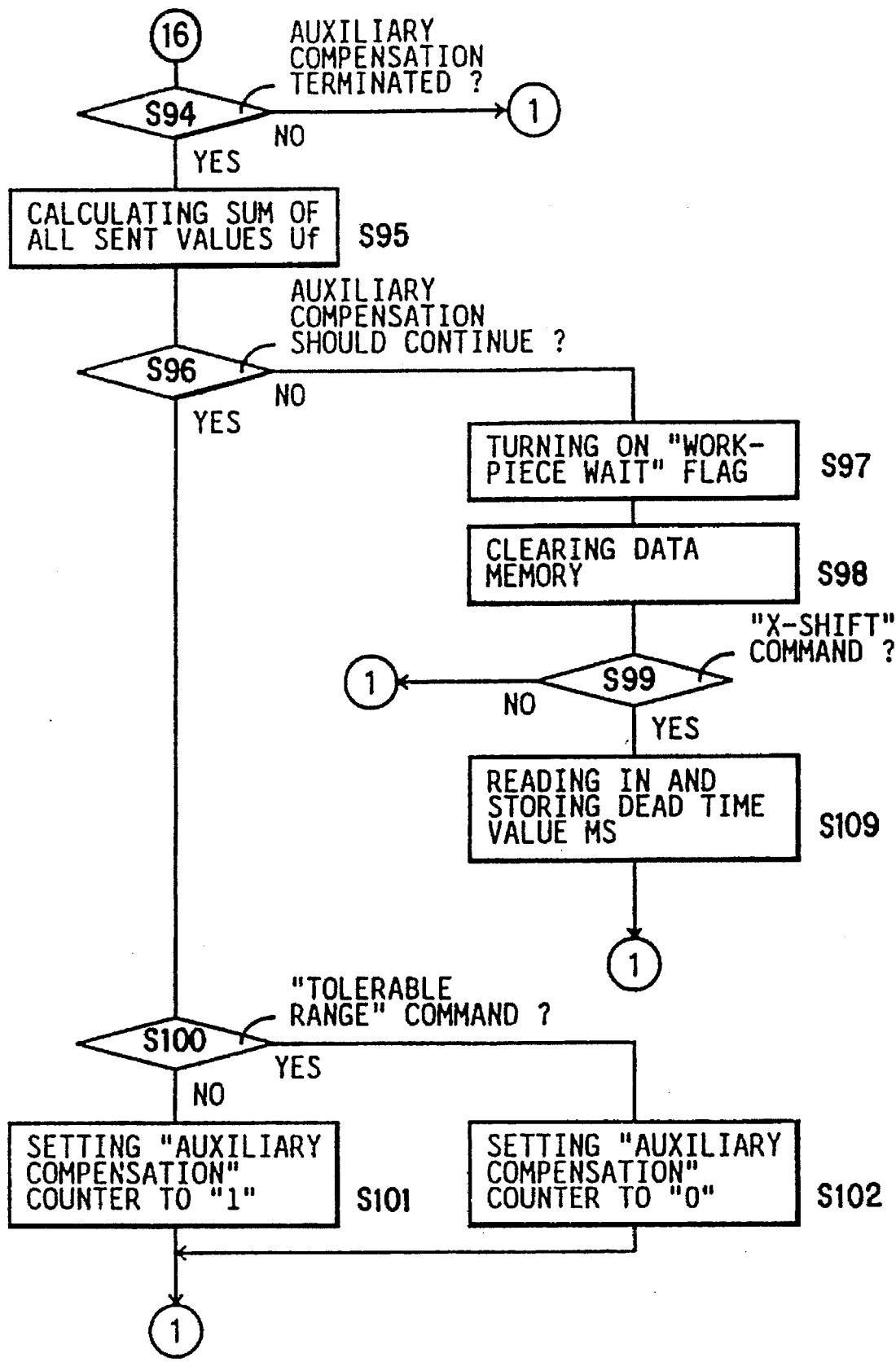
Figure 10:
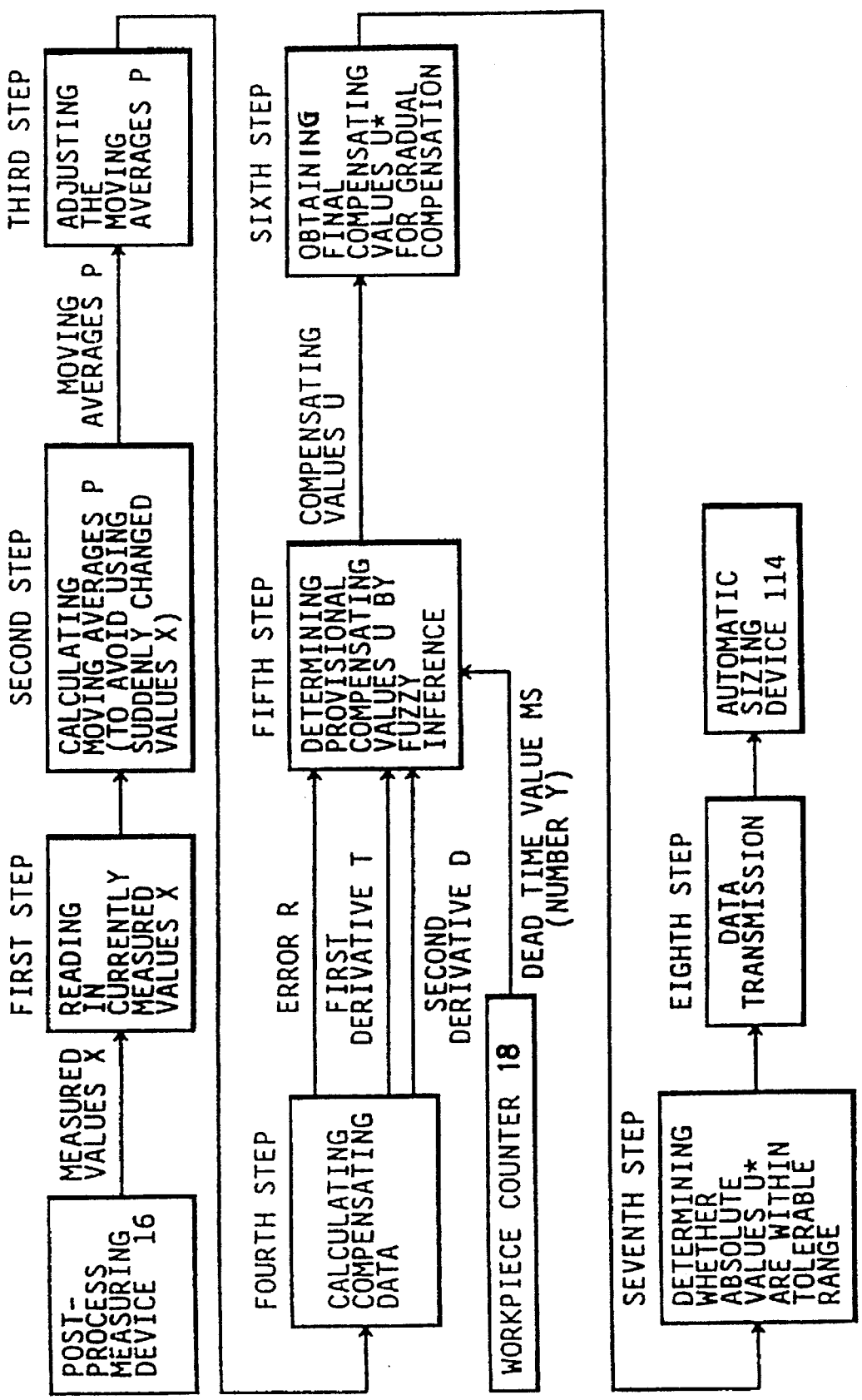
FIG. 10 is a block diagram schematically showing the flows of the compensating routine of FIGS. 4–9.

The concept underlying the compensating control routine illustrated in FIGS. 4–9 will be first described referring to the flow chart of FIG. 10. It is noted that the step numbers used in the flow chart of FIG. 10 do not correspond to the step numbers used in the flow charts of FIGS. 4–9 which will be specifically discussed later in detail.

In the first step indicated in the flow chart of FIG. 10, the control device 20 reads in the diameter values X of the all journals 28 currently measured by the post-process measuring device 16. Then, the second step is implemented to calculate a moving average P of the measured diameter values X of the journals 28 which have been measured and which include the currently measured one. This second step is provided to avoid using a suddenly changed value X. That is, even if the currently obtained diameter value X is considerably different from the last two or more values X, the moving average P obtained in the second step will not be considerably changed from the last obtained moving average values P. The moving averages P for the journals 28 are calculated on the basis of the diameter values X stored in calculation data memories of the RAM of the control device 20 and the currently measured diameter values X received in the first step.

The control flow then goes to the third step to adjust the moving averages P calculated in the second step, as described below. The fourth step is then implemented to calculate, as compensating data, error values R and first and second derivatives T and D of the error values R on the basis of the adjusted moving averages P (stored in the data memory of the RAM). The error value R for each end journal 28 is a difference between the moving average P and the nominal diameter value Ao. The control flow then goes to the fifth step to determine by fuzzy inference the provisional compensating values U for the two end journals 28, on the basis of the compensating data (R, T and D) and the number Y of the pre-measured workpieces (dead time value MS). The sixth step is then implemented to adjust the provisional compensating values U to obtain the final compensating values U* which assures gradual or smooth compensation or adjustment of the reference values of the automatic sizing device 12. Then, the seventh step is implemented to determine whether the absolute value of the final compensating values U* is smaller than a threshold or not, and the eighth step is executed to transmit the compensating values U* to the sizing device 12 if the absolute values U* are not smaller than the threshold.

The control device 20 does not determine the compensating values U* each time the diameters X of the end journals 28 are measured by the post-process measuring device 16. In other words, the control device 20 operates to determine or update the compensating values U* from time to time on an intermittent basis according to a predetermined rule, and the data memory of the RAM of the device 20 is accordingly updated. That is, the compensating value U* is changed from a last value to a present value only after a first one of the workpieces processed by the machine 10 under the working condition adjusted by the last compensating value U* has been measured by the post-process measuring device 16.

Although the control device 20 receives the measured diameter values X of all the seven journals 28 of the crankshaft 26, the values X of only the two end journals 28 (first and seventh journals) are used as a principle to determine the compensating values U or U*.

Figure 36:
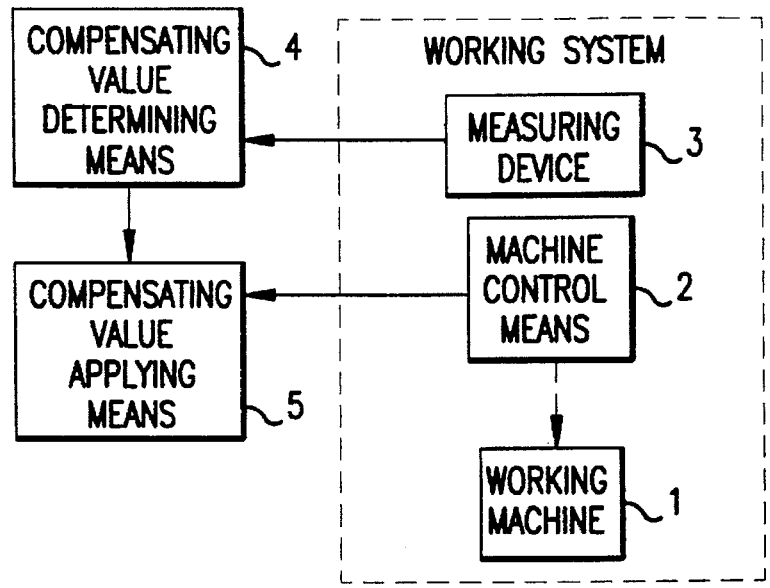
FIG. 36 is a block diagram illustrating essential elements of the feedback compensating apparatus of the present invention.
Figure 37A:
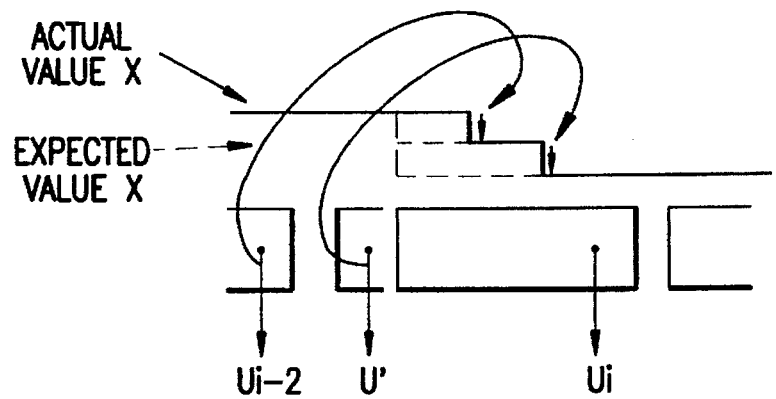
FIGS. 37A and 37B are views schematically showing another embodiment of the present invention.
Figure 37B:
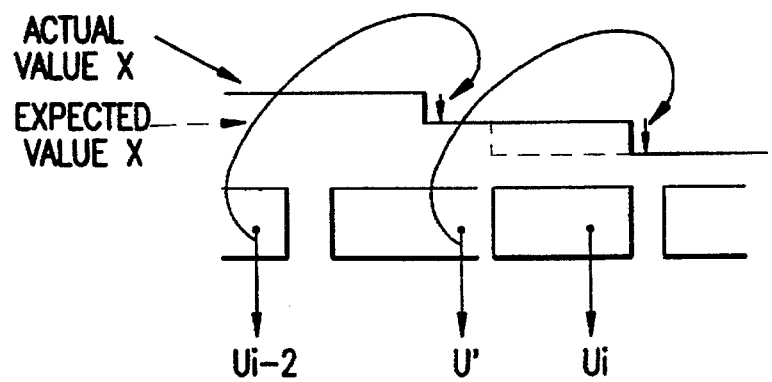

While the flow of the control routine executed by the control device 20 has been briefly described, the features of the individual steps as shown in FIG. 36 will be discussed in detail.

First, the calculation of the moving averages P in the second step of FIG. 10 will be explained.

The diameter values X of the journals 28 measured from time to time by the measuring device 16 may have a considerable variation between successively measured values. Since it is desirable to avoid using a suddenly changed value X, a weighted moving average P is obtained from the present value X received in the first step and at least one previous value X stored in the RAM. Generally, this moving average P is considered to more accurately represent the actual diameter X of the ground journal 28.

The moving average Pi is calculated in the following manner, as a rule. That is, a predetermined number K ($\geq 2$) of the successively measured values X (including the value X obtained in the present cycle) are used to calculate the moving average Pi according to this following equation (1), for example:

$$P_i = \frac{b_{i-4}X_{i-4} + b_{i-3}X_{i-3} + b_{i-2}X_{i-2} + b_{i-1}X_{i-1} + b_iX_i}{b_{i-4} + b_{i-3} + b_{i-2} + b_{i-1} + b_i} \quad (1)$$

where, i=number of the workpieces measured by the measuring device 16 (=number K)

In the present example, the above equation (1) is formulated to calculate the moving average Pi of the five successive values X. That is, the number K is equal to "5", and the number i is also equal to "5".

The values $b_{i-4}$ through $b_i$ are weighting coefficients corresponding to the five values X.

The weighting coefficients b are suitably determined in relation to the frequency of noisy component waves that should be removed from the measured values X by using the moving average (i.e., component waves which cause a relatively large variation of the values X). In the case where the number Y of the pre-measured workpieces existing between the machine 10 and the measuring device 16 is zero "0" or almost constant, the frequency of the noisy component wave is not substantially changed. In this case, the weighting coefficients b can be determined in the following manner:

To begin with, the following equation (2) is prepared such that $\omega_1, \omega_2, \ldots \omega_j, \ldots, \omega_s$ represent angular frequencies of the noisy component waves; to be removed from the values X. The number of the noisy component waves is equal to s.

$$(z^2 - 2z\cos\omega_1 + 1)(z^2 - 2z\cos\omega_2 + 1) \ldots (z^2 - 2z\cos\omega_s + 1) = \quad (2)$$

$$z^{2s} + a_{s-1}z^{2s-1} + \ldots + a_0z^s + \ldots + a_{s-1}z + 1 = 0$$

Then, the values "1" through "$a_0$" selected from the values "1", "$a_{s-1}$", ... "$a_0$", ... "$a_{s-1}$", and "1" are determined as the weighting coefficients $b_{i-1}, b_{i-(s-1)}, \ldots, b_i$.

Figure 11:
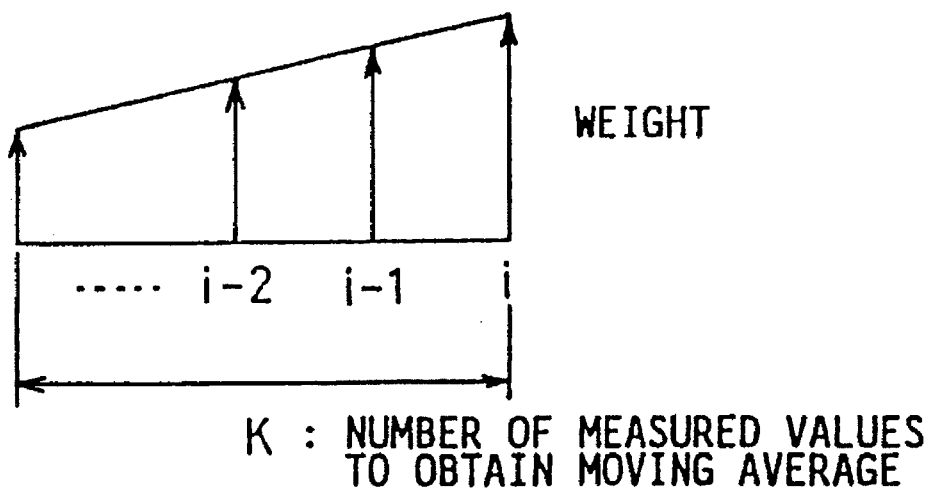
FIG. 11 is a graph indicating weighting coefficients "b" used in second step of FIG. 10.

In the case where the number Y of the pre-measured workpieces is not always substantially constant, it is unavoidable that the frequency of the noisy component waves to be removed from the measured values X by using the moving average P is likely to change more or less. In this case, therefore, it is desirable to determine the weighting coefficients in the following manner. That is, the weighting coefficients b increase substantially linearly in the order in which the corresponding measured values X are measured, as indicated in FIG. 11. According to this method, the weighting coefficient bi for the presently measured value X is the largest. This method makes it possible to eliminate low-frequency noisy component waves over a relatively wide range, from the measured values X, and the calculated moving average P is less likely to be influenced by the noisy component waves.

In the above case, the gradient of the linear increase of the weighting coefficient b is determined so as to best suit a standard condition in which the number Y of the pre-measured workpieces changes. For instance, the coefficients $b_{i-4}, b_{i-3}, b_{i-2}, b_{i-1}$ and $b_i$ are determined to be 1, 2, 3, 4 and 5, respectively. However, this manner of determination of the weighting coefficient b causes the obtained moving average P to vibrate or vary with the measured values X, if the variation amount of the measured values X is relatively large. The variation amount is interpreted to mean a magnitude of periodic variation of the measured values X as the number i of the measured workpieces increases. In this case, the obtained moving average P does not accurately represent the actual tendency of change in the diameter values of the journals 28. If the variation amount of the measured values X is relatively small, the moving average P is likely to be less responsive to the change in the measured values X.

In the light of the above background, the present third embodiment is arranged to automatically change the gradient of increase of the weighting coefficients b as needed, for automatic adaptation to the variation amount of the measured values X.

Figure 12:
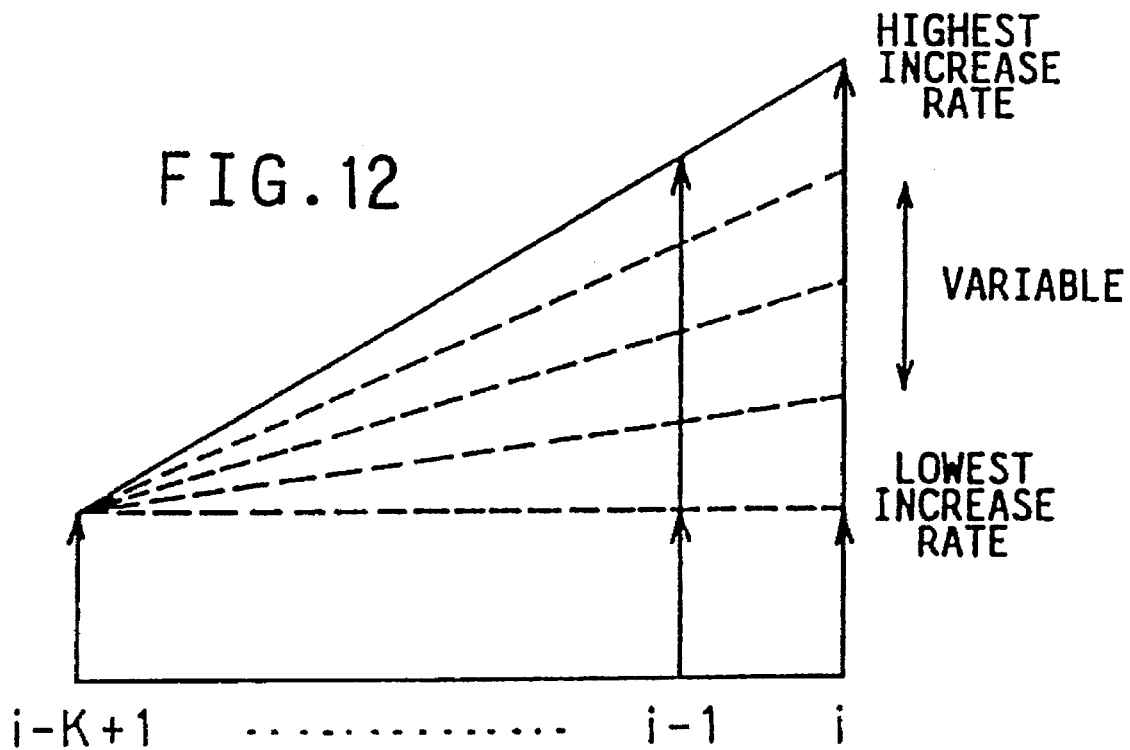
FIG. 12 is a graph schematically indicating a range in which the weighting rate of the weighting coefficients "b" is variable.

Described more specifically, a provisional value of the moving average P is calculated using the last used weighting coefficients b, and differences between the presently calculated provisional value of the moving average P and the individual measured values X used to obtain the provisional value are summed to determine the variation amount (with respect to the last used coefficients b) of the measured values X in question. If the determined variation amount is equal to or smaller than an upper limit A, the provisional value of the moving average P is determined as the final or effective value. If the variation amount is larger than the upper limit A, the weighting coefficients b are incremented or decremented between the highest and lowest increase rates, as schematically shown in FIG. 12, until the variation amount is reduced below the upper limit A. The weighting coefficients b at this time are used as the effective coefficients for calculating the final value of the moving average P. Consequently, when the variation amount of the measured values X is relatively high, the gradient of linear increase of the coefficients b is accordingly small, and the influence of the currently measured value X on the moving average P is reduced, whereby the moving average P becomes less responsive to the currently measured value X. When the variation amount is relatively small, on the other hand, the gradient of linear increase of the coefficients b is accordingly large, and the influence of the currently measured value X on the moving average P is increased, whereby the moving average P becomes more responsive to the currently measured value X.

However, the variation amount of the measured values X may not be reduced below the upper limit A even if the weighting coefficients b are changed between the highest and lowest increase rates as indicated in FIG. 12. In this case, the weighting coefficients b which caused the smallest variation amount during changing of the coefficients b are used as the effective coefficients for calculating the final moving average P.

Figure 13:
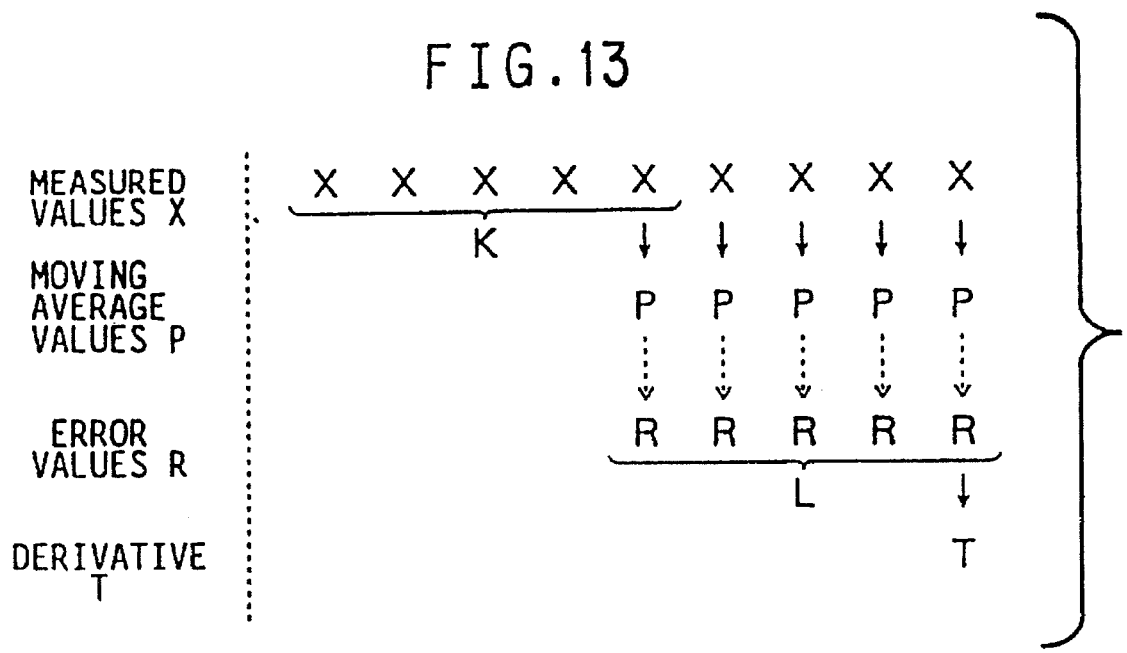
FIG. 13 is a view explaining the number K of measured values X necessary to obtain a moving average P according to a standard method in the feedback compensating apparatus.

While the method of calculating the moving averages P has been described, the method if practiced as described above would not be capable of calculating the moving averages P until the number of the values X which have been measured (the presently measured value and the values stored in the data memory of the RAM of the control device 20) has become equal to "K". In this period, neither the error values R and derivative values T nor the compensating values U can be calculated, and a relatively long time is required to calculate the compensating values U. In FIG. 13 as well as in FIGS. 14 and 15 referred to below, the values indicated in relatively left portions of the figures are obtained prior to the values indicated in relatively right portions of the figures. That is, the number i of the measured workpieces increases in the direction from left to right as seen in FIG. 13.

In the present embodiment, however, the moving averages P are calculated according to a special averaging method different from the normally used method, until the number of the values X which have been measured has become equal to "K" ("5" in the case of FIG. 13).

As the special averaging method, there are available two methods, namely, a substitution method and a sub-averaging method, which will be described.

instance, where the number K is equal to "5" the first four measured values X may be used as the moving averages P. However, this is not desirable for the following reason. Namely, the accuracy of a derivative T calculated on the basis of a certain number of the moving averages P is lowered with an increase in the ratio of the measured values X substituted for the moving averages P, and the accuracy of the compensating value U is accordingly lowered. For instance, if the first four measured values X were used as the first four moving averages P where the number K is equal to "5", the accuracy of the derivative T determined from the first five moving averages P would not be sufficiently reliable.

To solve the above problem, it is preferable to limit the maximum number Z of the measured values X which can be used as the moving averages P. In the specific example of FIG. 14 where the number K is "5", the maximum number Z is equal to "3", and therefore up to three measured values X can be used to calculate the derivative T. In this example, however, the first measured value X cannot be used as the moving average P, and the derivative T cannot be calculated even when the number of the measured values X available has become equal to "5".

Figure 15:
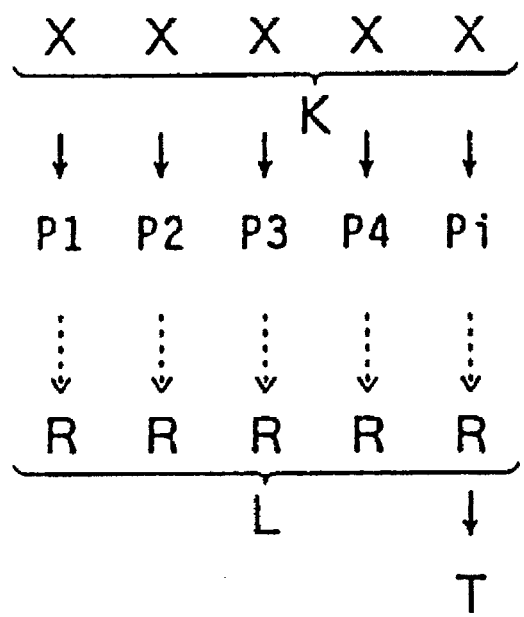
FIG. 15 is a view explaining the number K according to a second special method (sub-averaging method) for obtaining the moving average P in the apparatus.

On the other hand, the sub-averaging method uses auxiliary equations to calculate a weighted moving average from the currently usable measured values X whose number is smaller than "K". For instance, equations to calculate a moving average from three and four measured values X are selectively used depending upon the number of the values X currently available (currently measured value X and value or values X stored in the data memory). The calculation according to this sub-averaging method will be referred to as "sub-averaging mode". An example of this sub-averaging method where K=5 is illustrated in FIG. 15, in which the following four equations (3-1) through (3-4) corresponding to four numbers of the measured values X available are used:

| Number of Values X | | |
|---|---|---|
| 1 | $P_i = X_i$ | (3-1) |
| 2 | $P_i = \dfrac{C_{i-1}X_{i-1} + C_i X_i}{C_{i-1} + C_i}$ | (3-2) |
| 3 | $P_i = \dfrac{d_{i-2}X_{i-2} + d_{i-1}X_{i-1} + d_i X_i}{d_{i-2} + d_{i-1} + d_i}$ | (3-3) |
| 4 | $P_i = \dfrac{e_{i-3}X_{i-3} + e_{i-2}X_{i-2} + e_{i-1}X_{i-1} + e_i X_i}{e_{i-3} + e_{i-2} + e_{i-1} + e_i}$ | (3-4) |

Figure 14:
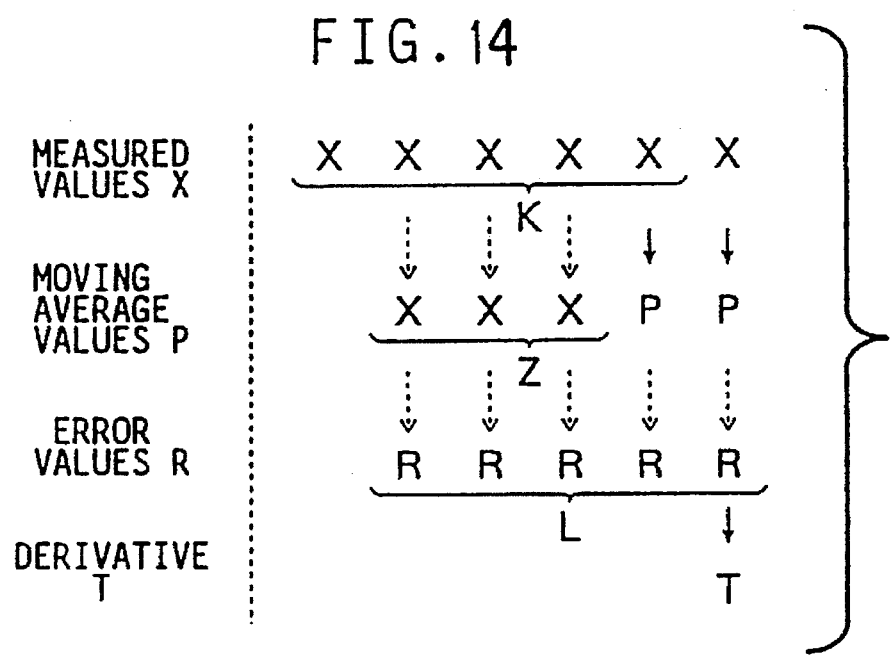
FIG. 14 is a view explaining the number K according to a first special method (substitution averaging method) for obtaining the moving average P in the feedback compensating apparatus.

The substitution method is to substitute the currently measured value X for the moving average P to be obtained in the present cycle, as indicated in FIG. 14, if the calculation of the moving average P is impossible, that is, until the number of the measured values X has become equal to "K". This substitution method is based on the fact that the currently measured value X is by nature close to the moving average P to be obtained according to the normally used method. The calculation of the moving average P according to the substitution method will be referred to as "substitution averaging mode".

The substitution averaging mode for the moving average P is available for all the measured values X, from the first value X to the subsequent values X until the total number of the measured values X has become equal to "K". For In the above example of FIG. 15, the moving average P when only one value X is available can be obtained according to the equation (3-1). Thus, the derivative T can be calculated when the number of the measured values X available has become equal to "K".

In the present embodiment, the function of calculating the moving average P according to the special averaging method (herein referred to as "special averaging function") is enabled or disabled by a SPECIAL AVERAGING command entered by the operator. If this SPECIAL AVERAGING command is present, either the substitution averaging mode or the sub-averaging mode is selected by the operator. Therefore, either a SUBSTITUTION AVERAGING command selecting the substitution averaging mode, or a SUB-AVERAGING command selecting the sub-averaging mode is necessarily present while the SPECIAL AVERAGING command is present.

Then, the adjustment of the moving averages P in the third step of FIG. 10 will be explained.

In the grinding system to which the control device 20 is connected, the array of grinding wheels 30 is controlled on the basis of the diameters of only the two end journals 28 of the already ground crankshafts 26. If the compensating values U to adjust the reference values set in the automatic sizing device 14 are determined on the basis of the measured diameters X of only the two end journals 28, the dimensional accuracy of the ground crankshaft 26 would not be sufficiently uniform or even for all the seven journals 28.

Figure 16:
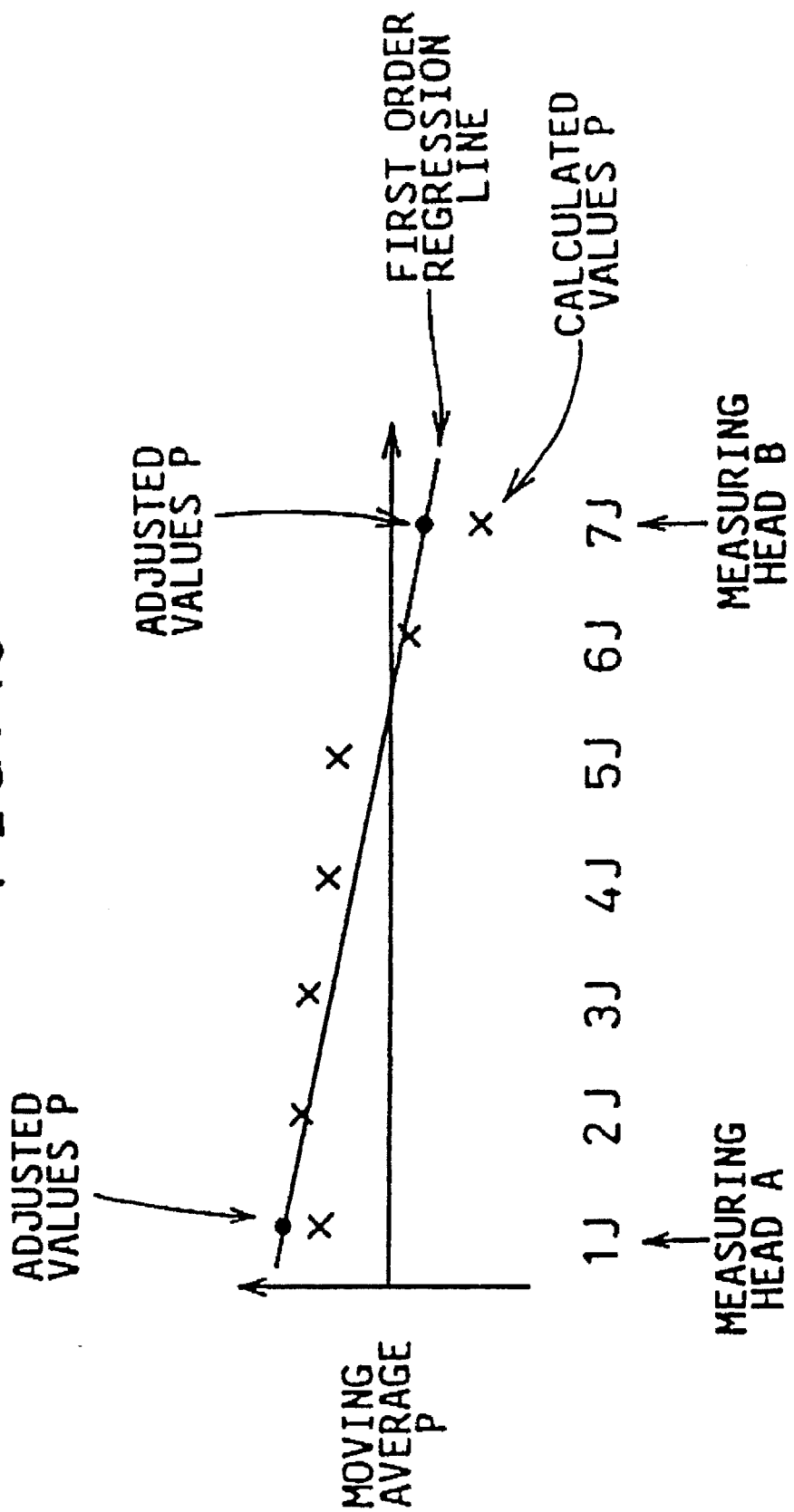
FIG. 16 is a graph schematically showing an operation performed in third step of FIG. 10.

In view of the above drawback, the present third embodiment employs a technique of adjusting the calculated moving averages P of the two end journals 28, on the assumption that the diameters (i.e., moving average values P) of the seven journals 28 at different axial positions 1J through 7J of the crankshaft 26 linearly change as a function of the axial distance of the journals 28 as measured from one of the end journals 28 (first or seventh journal), as schematically indicated in the graph of FIG. 16.

For the above adjustment of the moving averages P of the two end journals 28, the following equation (4) is used, for example:

$$y = \frac{\Sigma(x-x')(P-P')}{\Sigma(x-x')^2} \cdot (x-x') + P' \tag{4}$$

where, x=values (1 through 7) identifying the seven journals 28 x'=average of the seven values x of the seven journals 28 y=adjusted moving average P for each value x

P=calculated moving average P (before the adjustment) for each value x

P'=average of the seven calculated moving averages P

For instance, the adjusted moving average y1 of the first journal 28 is obtained by inserting "1" as the value x in the above equation (4), and the adjusted moving average y7 of the seventh journal 28 is obtained by inserting "7" as the value x.

In the present embodiment, the function of adjusting the calculated moving averages P is enabled or disabled by the operator.

While the present embodiment is adapted to adjust the calculated moving averages P of the end journals 28, the two measured values X used to calculate the moving averages P may be similarly adjusted.

Then, the manner of obtaining the compensating data in the fourth step of FIG. 10 will be explained.

As described above, the compensating data include not only the error values R but also the first and second derivatives T and D. The error value R is one form of the dimensional error of the ground workpiece (crankshaft 26), while the first derivative T is one form of a variable or parameter indicative of the tendency of change in the dimensional error (R). Further, the second derivative D is one form of a variable or parameter indicative of the tendency of change in the tendency of change (T) in the dimensional error.

The parameters T and D are used in addition to the error values R to determine the compensating values U, since the use of the first and second derivatives T and D permits more accurate or exact estimation of the actual grinding condition of the machine 10 and assures accordingly improved accuracy of adjustment of the reference values used by the automatic sizing device 14, as compared with the use of only the error values R.

There will be explained the calculation of the first derivative T.

Figure 17:
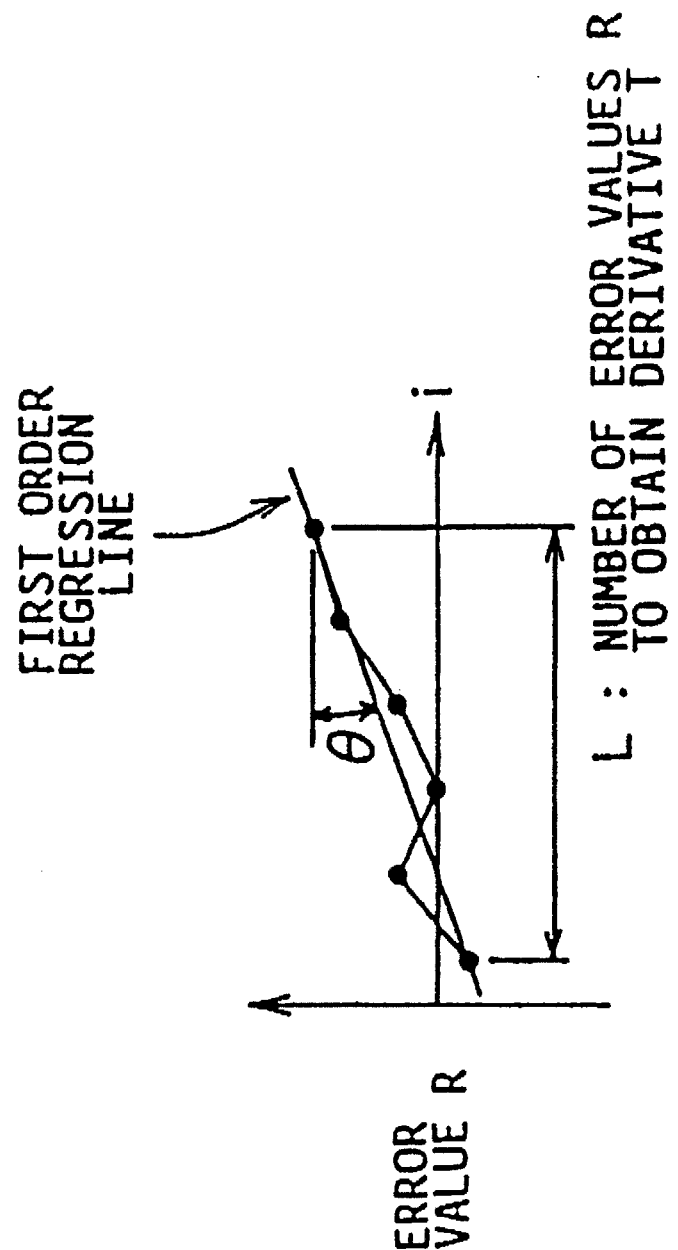
FIG. 17 is a graph schematically showing an operation performed in fourth step of FIG. 10.

As a rule, the first derivative T of the error value R is determined on the basis of a first order regression line with respect to a predetermined number L ($\geq 2$) of the error values R which consist of the presently calculated error value R and at least one previously calculated error value R stored in the data memory. This determination is based on the assumption that the error values R change almost linearly along the regression line, with an increase in the number i of the measured workpieces. As schematically indicated in the graph of FIG. 17, the first derivative T is obtained as the gradient of the regression line, more specifically, as tan θ where the gradient (radian) of the regression line is θ. For example, the first order regression line is obtained according to the following equation (5):

$$y = \frac{\Sigma(x-x')(R-R')}{\Sigma(x-x')^2} \cdot (x-x') + R' \tag{5}$$

where, x=number (i) of the measured workpieces x'=average of values x (whose number is equal to L)

y=adjusted error value R for each value x

R=calculated error value (before the adjustment) for each value x

R'=average of the calculated error values R (whose number is equal to L)

Then, the first derivative T is calculated according to the following formula (6):

$$\frac{\Sigma(x-x')(R-R')}{\Sigma(x-x')^2} \tag{6}$$

As in the calculation of the moving averages P, however, the above method if practiced as described above would not be capable of calculating the derivative T until the number of the error values R available has become equal to "L".

In view of the above, the present embodiment uses auxiliary equations (as used in the calculation of the moving average P) to calculate first order regression lines for the currently available error values R whose number is smaller than "L". For instance, where the number L is equal to "5", equations to determine regression lines where the number L is "1", "2", "3" and "4", respectively, are selectively used depending upon the number of the error values R currently available (currently calculated error value R and error value or values R stored in the data memory). This method of calculating the first derivative T will be referred to as "special differentiation mode".

The above function of the special differentiation mode to obtain the first derivative T is also enabled or disabled by the operator. The function is enabled by a SPECIAL DIFFERENTIATION command entered by the operator.

There will next be described the method of calculating the second derivative D of the error value R.

The calculation of the second derivative D is similar to that of the first derivative T. That is, the second derivative D of the error value R is determined on the basis of a first order regression line with respect to a predetermined number Q ($\geq 2$) of the first derivative values T which consist of the presently calculated value T and at least one previously calculated value T stored in the data memory. This determination is based on the assumption that the first derivative T change almost linearly along the regression line, with an increase in the number i of the measured workpieces. The second derivative T is obtained as the gradient of the regression line, more specifically, as tan θ where the gradient (radian) of the regression line is θ.

However, the use of the second derivative D is not essential, and the mode to use the second derivative D is established by a SECOND DERIVATIVE USE command entered by the operator.

In the present embodiment, a special differentiation mode as is available with respect to the first derivative T as described above is not available with respect to the second derivative D. However, it is possible to provide the special differentiation mode for the second derivative D.

There will be explained the calculation of the provisional compensating value U by fuzzy inference in the fifth step of FIG. 10. In particular, the concept of adjusting the provisional compensating value U depending upon the dead time value MS or number Y of the pre-measured workpieces, and the concept of the fuzzy inference will be discussed in detail.

When the number Y of the pre-measured workpieces (crankshafts 26) existing between the grinding machine 10 and the post-process measuring device 16 changes, it is desirable to change the fuzzy rules used to determine the provisional compensating value U, depending upon the number Y which represents the dead time value MS as discussed above. In the present embodiment, therefore, the fuzzy rules used to obtain the compensating value U may be changed with the dead time value MS taken into consideration, as described later.

However, the function of changing the fuzzy rules indicated above is enabled and disabled by the operator.

Then, the fuzzy inference implemented to calculate the provisional compensating value U will be explained.

In the present embodiment, the following three fuzzy inference modes are available: (1) first mode in which only the error value R and the first derivative T are used as input variables for the fuzzy inference; (2) second mode in which the second derivative D as well as the error value R and the first derivative T is used as a third input variable for the fuzzy inference; and (3) third mode in which the error value R, first derivative T and dead time value MS are used as input variables for the fuzzy inference.

The second mode is established by the SECOND DERIVATIVE USE command as indicated above, and the third mode is established by a DEAD TIME COMPENSATION command. The first mode is established when none of these commands are present.

While the above three fuzzy reference modes will be discussed, only the first mode will be explained in detail by way of example, since the three modes are based on a common fundamental concept. In the first mode, the compensating value U is calculated by fuzzy inference on the basis of only the error value R and first derivative T.

For the control device 20 to effect the fuzzy inference, the read-only memory (ROM) provided therein also stores fuzzy inference data used for determining the compensating value U by fuzzy inference. The fuzzy inference data include: (a) fuzzy inference programs; (b) three groups of membership functions associated with the error value R, first derivative T and compensating value U, respectively; and (c) two groups of fuzzy rules for defining relationships among the error value R, derivative T and compensating value U.

Figure 18:
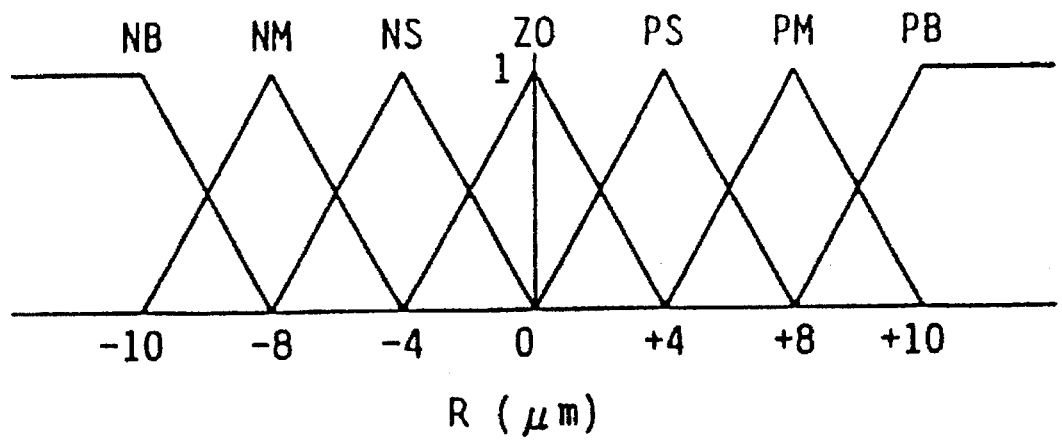
FIG. 18 is a graph indicating stored membership functions associated with a dimensional error R, which are used in fifth step of FIG. 10 for determining a provisional compensating value U by fuzzy inference.

For the error value R, the control device 20 uses seven fuzzy labels NB (negative big), NM (negative medium), NS (negative small), ZO (zero), PS (positive small), PM (positive medium) and PB (positive big), whose values increase in the order of description from a negative value to a positive value. The membership functions of these fuzzy labels are indicated in the graph of FIG. 18.

Figure 19:
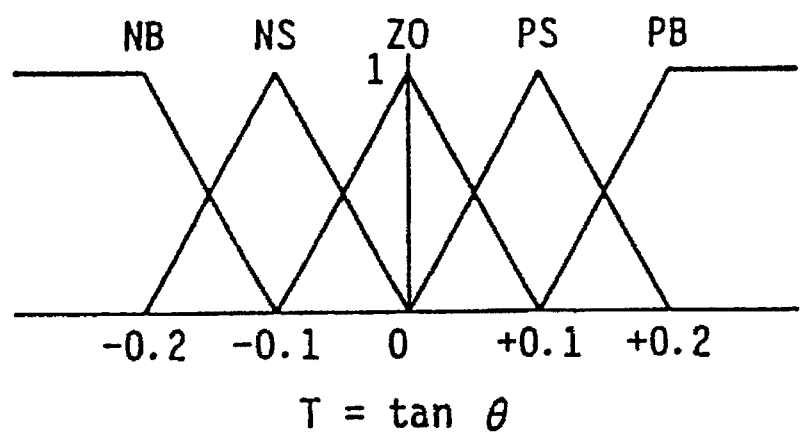
FIG. 19 is a graph indicating stored membership functions associated with a derivative T of the error R, which are also used in fifth step of FIG. 10.

For the first derivative T of the error value R, the control device 20 uses five fuzzy labels NB, NS, ZO, PS and PB, whose values increase in the order of description from a negative value to a positive value. The membership functions of these fuzzy labels are indicated in the graph of FIG. 19.

Figure 20:
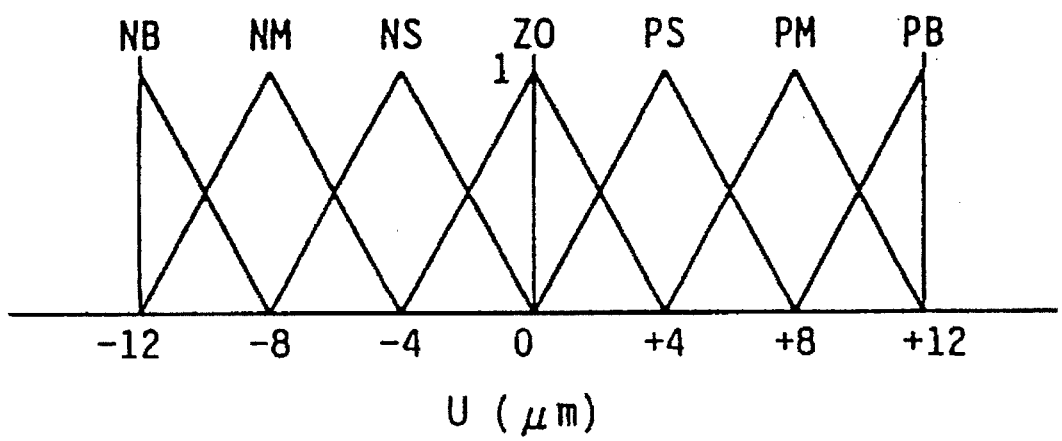
FIG. 20 is a graph indicating stored membership functions associated with the provisional compensating value U, which are used in fifth step of FIG. 10.

For the provisional compensating value U, the control device 20 uses the seven fuzzy labels NB, NM, NS, ZO, PS, PM and PB, as described above with respect to the error value R. The membership functions of these seven fuzzy labels are indicated in FIG. 20. An increase in the compensating value U results in an increase in the reference value set in the automatic sizing device 14, which in turn results in an increase in the outside diameter of the journals 28 of the crankshaft 26. On the other hand, a decrease in the compensating value U results in a decrease in the reference value, which in turn results in a decrease in the outside diameter of the journals 28.

While only one group of fuzzy rules is sufficient to effect fuzzy inference which permits the compensating value U to be determined in some way, the present third embodiment uses the two groups of fuzzy rules, for the reason stated below.

While the measured diameter values X of the ground journals 28 are relatively stable and the variation amount of the measured values X is relatively small, it is desirable to determine the compensating value U so that the determined compensating value U is highly responsive to the changes in the error value R and first derivative T, in order to improve the dimensional accuracy of the ground journals 28. When the measured values X are unstable due to the vibration of the grinding machine 10, for example, with a result of an increase in the variation amount of the measured values X, the compensating value U if determined according to the fuzzy rules adapted for use when the variation amount is small may further deteriorate the vibration level of the measured values X, as a result of the adjustment of the reference value of the automatic sizing device 14 according to the thus determined compensating value U. In the light of this observation, the two groups of fuzzy rules are selectively used depending upon the vibration level of the measured values X. Namely, the first group consists of positive fuzzy rules used when the variation amount is relatively large, so that the compensating value U determined by the positive fuzzy rules is highly responsive to the changes in the error value R and derivative T, while on the other hand the second group consist of negative fuzzy rules used when the variation amount is relatively large, so that the compensating value U determined by the negative fuzzy rules is less responsive to the error value R and derivative T.

The positive fuzzy rules are indicated in TABLE 1, while the negative fuzzy rules are indicated in TABLE 2.

TABLE 1

| | | POSITIVE FUZZY RULES R | | | | | | |
|---|---|---|---|---|---|---|---|---|
| | | NB | NM | NS | ZO | PS | PM | PB |
| T | NB | ZO | ZO | PS | ZO | ZO | ZO | ZO |
| | NS | PB | PM | PS | ZO | ZO | NS | NM |
| | ZO | PB | PM | PS | ZO | NS | NM | NB |
| | PS | PM | PS | ZO | ZO | NS | NM | NB |
| | PB | ZO | ZO | ZO | ZO | NS | ZO | ZO |

An example of the positive fuzzy rules of TABLE 1 is as follows:

IF R=NB and T=NS, THEN U=PB.

TABLE 2

| | | NEGATIVE FUZZY RULES R | | | | | | |
|---|---|---|---|---|---|---|---|---|
| | | NB | NM | NS | ZO | PS | PM | PB |
| T | NB | ZO | ZO | ZO | ZO | ZO | ZO | ZO |
| | NS | PS | PS | PS | ZO | ZO | NS | NM |
| | ZO | PB | PM | PS | ZO | NS | NM | NB |
| | PS | PM | PS | ZO | ZO | NS | NS | NS |
| | PB | ZO | ZO | ZO | ZO | ZO | ZO | ZO |

An example of the negative fuzzy rules of TABLE 2 is as follows:

IF R=NB and T=NS, THEN U=PS

As is apparent from these examples, the positive and negative fuzzy rules are formulated such that the compensating values U determined according to the positive fuzzy rules are generally larger than those determined according to the negative fuzzy rules, even when the input variables R and T are constant.

The present embodiment is designed such that when the control device 20 is initially turned on, the group of positive fuzzy rules is effective.

The present embodiment is also designed such that the positive fuzzy rules are used after the variation amount of the measured values X has been reduced as a result of the use of the negative fuzzy rules which were used because the variation amount had been large. The use of the positive fuzzy rules following the use of the negative fuzzy rules may increase the variation amount of the measured values X shortly after the use of the positive fuzzy rules. On the other hand, however, the use of the negative fuzzy rules for a long time will lower the response speed of the compensating value U with respect to the actual change in the measured values X, leading to deterioration of the dimensional accuracy of the ground journals 28. In this sense, the positive fuzzy rules are used immediately after the variation amount has been reduced below a given limit, to minimize the period of time during which the negative fuzzy rules are used, for the purpose of improving the dimensional accuracy of the ground journals 28.

In the present embodiment, the determination as to whether or not the variation amount of the measured values X is larger than a given threshold, that is, the determination as to whether the positive fuzzy rules or the negative fuzzy rules should be used is effected on the basis of the frequency of application of NB/PB fuzzy rules, which are the positive and negative fuzzy rules which are used when the calculated derivative T is "NB" or "PB". To effect this determination, the RAM of the control device 20 includes a CYCLE counter and an NB/PB counter. The CYCLE counter is used to count the number of cycles of execution of the routine of FIG. 10 (control routine of FIGS. 4–9 which will be described), more precisely, the number of times of the fuzzy inference operations in the fifth step of FIG. 10. The NB/PB counter is used to count the number of application or use of the NB/PB fuzzy rules. The CYCLE counter is incremented each time the fifth step of FIG. 10 is implemented. When the count of the CYCLE counter exceeds a predetermined threshold value B ($\geq 2$), the control device 20 determines whether the count of the NB/PB counter exceeds a predetermined threshold value C (smaller than B). If the count of the NB/PB counter is larger than the value C, the variation amount of the measured values X is determined to be larger than the threshold. The CYCLE counter is reset to "0" when the count exceeds the threshold value B, and the NB/PB counter is reset to "0" when the CYCLE counter is reset.

While the rationale for using the two groups of fuzzy rules and the difference between these two groups of fuzzy rules have been explained, the common design concept of the fuzzy rules will be explained.

The two groups of fuzzy rules are formulated so that the provisional compensating value U decreases with not only an increase in the value of the appropriate fuzzy label for the error value R, but also an increase in the value of the appropriate fuzzy label for the derivative T. That is, the value U decreases as the error value R and derivative T increase.

The above concept is represented in the positive fuzzy rules of TABLE 1, for example, such that when the derivative T is "NS", the compensating value U decreases in the order of "PB", "PM", "PS", "ZO", "ZO", "NS" and "NM" as the error value R increases, and When the error value R is "NM", the value U decreases in the order of "PM", "PM" and "PS" as the derivative T increases in the order of "NS", "ZO" and "PS".

Further, the fuzzy rules are formulated such that the compensating value U changes toward "0" when the diameter value X measured by the post-process measuring device 16 suddenly or abruptly decreases or increases. This arrangement is effective to maintain high dimensional accuracy of the processed workpieces, when the measured value X is abnormally reduced or increased due to a temporary trouble or defect of the in-process measuring device 12. The instant arrangement maintains the currently established reference values of the automatic sizing device 14, with the compensating value U being zeroed, in the event of such temporary trouble with the in-process measuring device 12.

The above arrangement is embodied in the fuzzy rules of TABLE 1, for example, such that the compensating value U is "ZO", when the error value R is "NB" or "NM" and when the derivative T is "NB", or when the error value R is "PM" or "PB" and when the derivative T is "PB".

Next, there will be explained the operation in the sixth step of FIG. 10 to obtain the final compensating values U* for gradual adjustment of the reference values set in the automatic sizing device 14.

As mentioned above, it is generally recognized that the error in the dimension of the ground journals 28 of the crankshafts 26 substantially linearly changes with an increase in the number i of the measured workpieces (crankshafts 26). In this respect, it is desirable to slowly or gradually change the compensating value U for gradually or smoothly adjusting the reference values of the sizing device 12.

Figure 21:
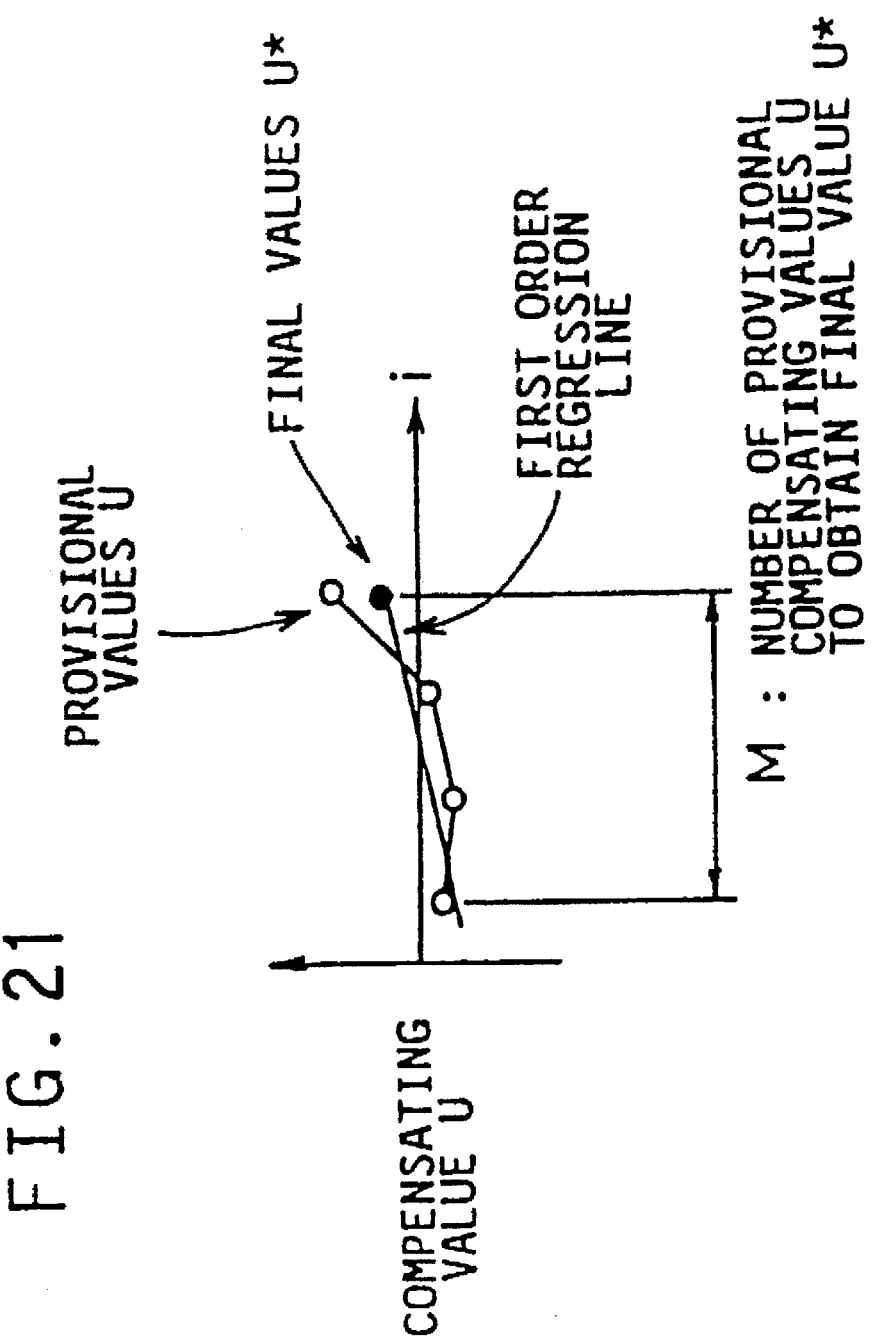
FIG. 21 is a graph schematically showing the operation in sixth step of FIG. 10.

In view of the above, the present embodiment is adapted such that the provisional compensating values U are first calculated as indicated in the graph of FIG. 21, and then the final compensating value U* is calculated on the basis of a first order regression line of a predetermined number M ($\geq 2$) of the calculated provisional compensating values. The regression line is determined on the assumption that the provisional compensating values U (whose number is equal to "M") increase substantially linearly with an increase in the number i of the measured workpieces. The thus obtained final compensating value U* is fed to the automatic sizing device 12.

For the final compensating value U* is calculated according to the following equation (7), for example:

$$y = \frac{\Sigma(x-x')(U-U')}{\Sigma(x-x')^2} \cdot (x-x') + U' \qquad (7)$$

where, x=number i of measured workpieces x'=average of the values x (whose number is equal to "M")

y=final compensating value U* for each value x

U=provisional compensating value U for each value X

U'=average of the provisional compensating values U (whose number is equal to "M")

For instance, the final compensating value U* is obtained by inserting "i" as the value x in the above equation (7).

The above function of adjusting the provisional compensating value U to obtain the final compensating value U* is enabled by a GRADUAL COMPENSATION command entered by the operator.

An example of a series of operations until the final compensating value U* is obtained in the presence of the GRADUAL COMPENSATION command is schematically illustrated in FIG. 22. In this figure, the values indicated in relatively left portions of the figure are obtained prior to the values indicated in relatively right portions of the figures. That is, the number i of the measured workpieces increases in the direction from left to right as seen in FIG. 22. It will be apparent from the figure that a first final compensating value U* is obtained when the number of measured values X stored in the data memory has become equal to (K+L+M−2), provided the routine of FIG. 10 is initiated without any measured values X stored in the data memory. Thus, a predetermined number of measured values X is required to obtain the first final compensating value U*.

The feature of the seventh step of FIG. 10 will then be described.

Figure 23:
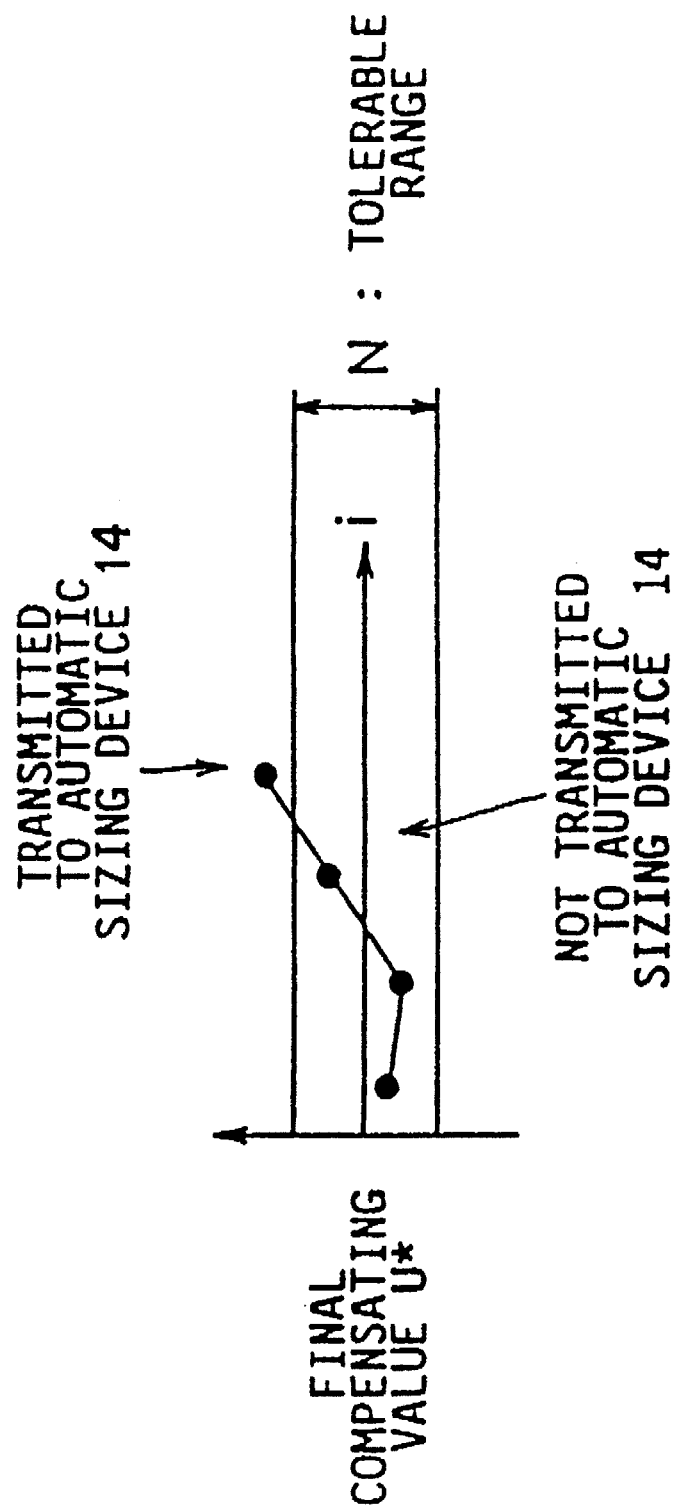
FIG. 23 is a view schematically showing an operation performed in seventh step of FIG. 10.

The thus obtained final compensating value U* for gradual adjustment of the reference values of the sizing device 14 is transmitted to the sizing device 14 in the eighth step of FIG. 10. However, the transmission in this eighth step is omitted if the absolute value of the final compensating values U* is smaller than a threshold. That is, the eighth step is preceded by the seventh step to determine whether the final compensating value U* falls within a tolerable range indicated by N in the graph of FIG. 23.

There will next be explained the intermittent determination of the compensating value U briefly mentioned above.

The reference values used in the automatic sizing device 14 for controlling the grinding condition of the machine 10 for the end journals 28 of the crankshaft 26 can be continuously adjusted by the compensating value U which is updated each time the diameter values X of the journals 28 are measured by the post-process measuring device 16. However, this continuous adjustment of the reference values or the continuous updating of the compensating value U gives rise to a problem that the compensating value U should be determined for each and every one of the workpieces measured by the measuring device 16. This leads to a considerable increase in the work load on the control device 20.

To solve the above problem, the present third embodiment is adapted to effect so-called "intermittent compensation" as described below.

Figure 24:
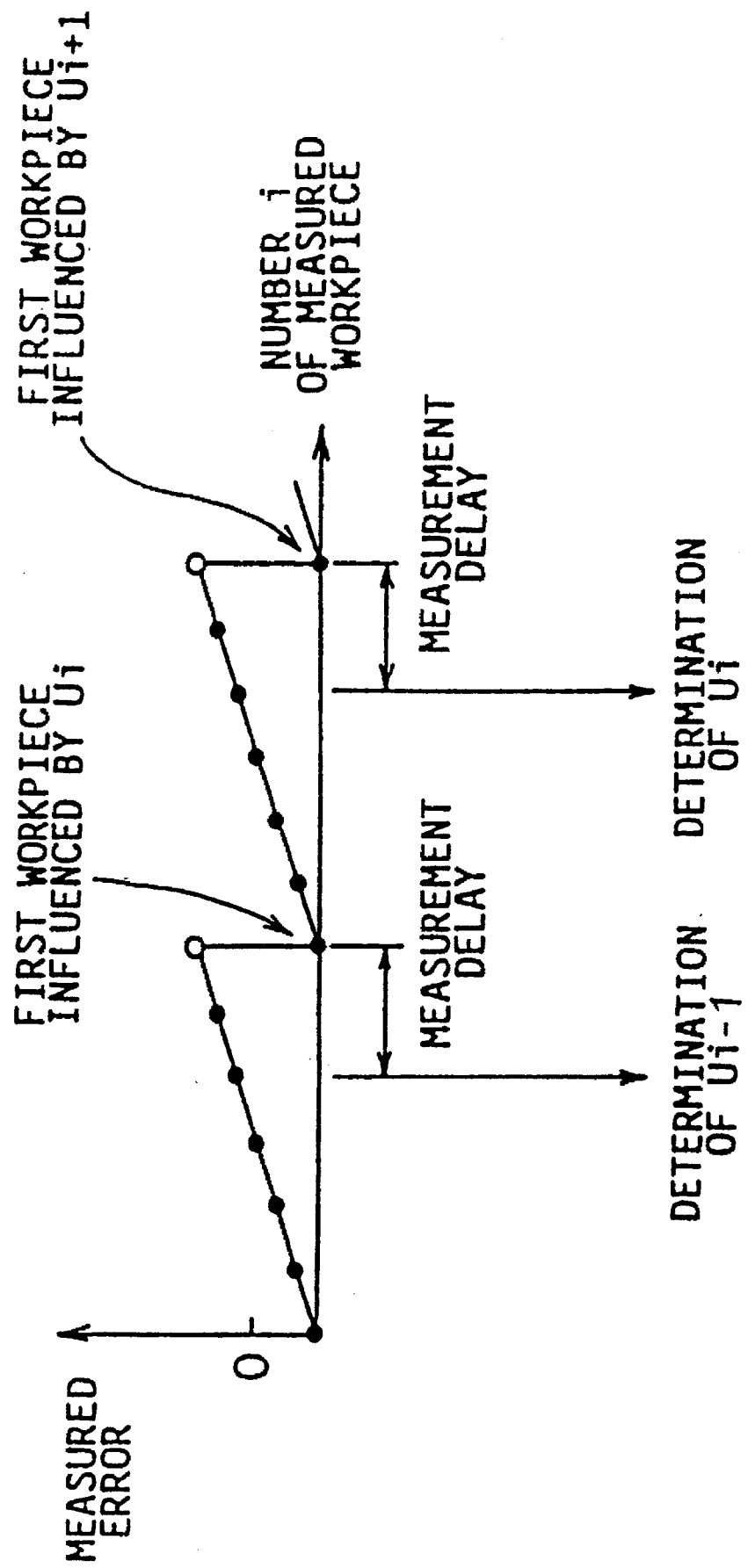
FIG. 24 is a graph schematically indicating "intermittent compensation" implemented in the apparatus.

The concept of the intermittent compensation is schematically illustrated in the graph of FIG. 24, which shows a variation in the measured error (dimensional error R) of the outside diameter of the journal 28 when a plurality of workpieces (crankshafts 26) are present as "pre-measured workpieces" between the grinding machine 10 and the measuring device 16. In the graph, the number Y of the pre-measured workpieces (corresponding to the dead time value MS explained above) is indicated as "measurement delay", and Ui−1 and Ui represent the last and present compensating values U. It will be understood that an influence of the last compensating value Ui−1 appears on the dimensional error R which is measured when a time corresponding to the measurement delay has passed after the moment of determination of the last compensating value Ui−1. Similarly, an influence of the present compensating value Ui appears on the dimensional error measured when the measurement delay time has passed after the determination of the value Ui. The graph of FIG. 24 is based on the assumption that the dimensional error of the workpieces increases substantially linearly with an increase in the number i of the measured workpieces, where the workpieces are ground successively while the reference values used by the sizing device 14 for the two end journals 28 are held constant. One reason for the increase in the dimensional error with the number i is an increase in the amount of wear of the working tools or grinding wheels 30 used by the working machine or grinding machine 10. The above assumption also applies to the graphs of FIGS. 25–28 referred to later.

For the intermittent compensation, there are available the following two modes as described below.

I. FIRST INTERMITTENT COMPENSATION MODE

As described above, the automatic sizing device 14 is connected to the grinding system in which a given number Y of pre-measured workpieces are present between the grinding machine 10 and the post-process measuring device 16. Hence, a workpiece ground with the reference values adjusted by the preceding compensating value U−1 is not necessarily measured by the measuring device 16 immediately after the completion of the grinding operation on that workpiece. In other words, the workpiece in question may be measured after some number of the previously ground workpieces have been measured by the device 16. Accordingly, to reflect the last compensating value Ui−1 on the present compensating value Ui, it is desirable that the present compensating value Ui is determined only after at least one workpiece ground according to the last compensating value Ui−1 has been measured.

Figure 25:
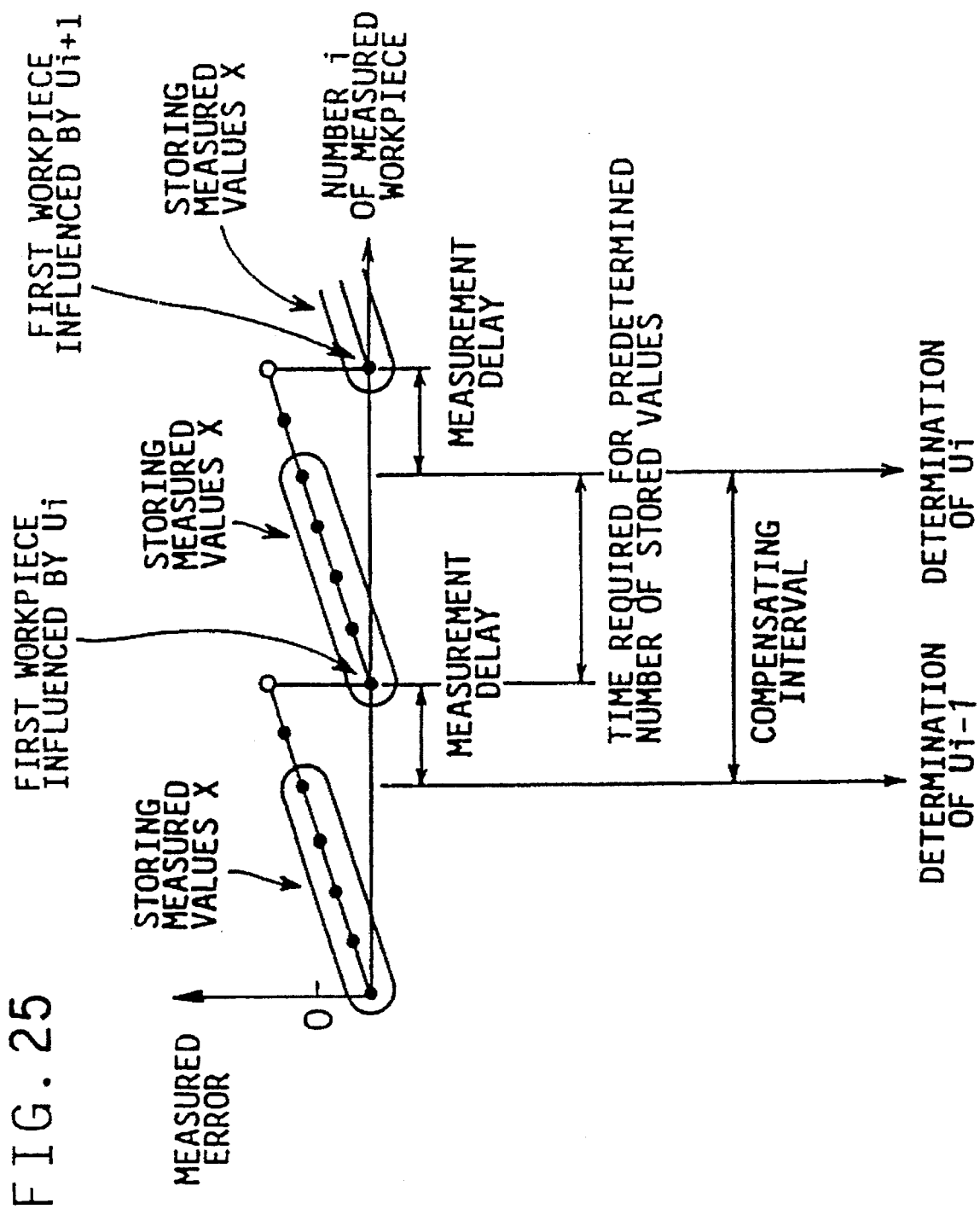
FIG. 25 is a graph schematically showing a first method of the "intermittent compensation" of FIG. 24.

With the above aspect taken into account, the first intermittent compensating mode is adapted, as schematically illustrated in the graph of FIG. 25, so as to store diameter values X successively measured by the device 16, and determine the present compensating value Ui when the number of the stored measured values X has reached a predetermined number (≧2). The value Ui is determined on the basis of the predetermined number of the stored values X. When or after the first workpiece subjected to the thus determined compensating value Ui has been measured by the device 16, the data memory to store measured values X is cleared, and the values X measured thereafter (which may include the value X of the first workpiece indicated above) are successively stored to determine the next compensating value Ui+1.

In one form of the first intermittent compensation mode, there exists a compensating interval or cycle between the moments of determination and transmission of the last and present compensating values Ui−1 and Ui. During this compensating interval, the compensating value U is not updated, and the corresponding reference value used in the sizing device 14 remains unchanged. This form of compensation is based on the concept that there exists a proportional relationship between the number i of the measured workpiece and the dimensional error R of the workpieces. According to this concept, the present compensating value Ui is determined, or the compensating value U is updated so that the dimensional errors R of the workpieces influenced by the present or updated compensating value Ui are eventually zeroed as a whole.

However, the above form of the first intermittent compensating mode suffers from a drawback that the moment of determination of the compensating value Ui is determined solely by the number of the stored measured values X, irrespective of an actual change in the measured values X. This may lead to inadequate timing of adjustment of the reference value of the sizing device 14.

To solve the above drawback, a second form of the first intermittent compensating mode is adapted such that if the determined compensating value Ui is substantially zero or falls within a tolerable range as described above by reference to FIG. 23, the compensating value Ui is not sent to the sizing device 14, and the determination is deferred until some additional measured values X have been stored. This form of intermittent compensation assures timely adjustment of the reference value of the sizing device 14 when the compensating value Ui is outside the tolerable range, that is, when the dimensional error R has considerably changed.

However, the above second form of the first intermittent compensating mode is not capable of adjusting the reference value of the sizing device 14 with high response to a change in the measured values X which takes place shortly after the determination and transmission of the last compensating value Ui−1, namely, during an initial portion of the compensating interval or cycle indicated above. Such a change is reflected on the measured values X subsequently stored in the data memory, and therefore reflected on the present compensating value Ui. Thus, a change in the dimensional error R shortly after the determination of the last compensating value Ui−1 cannot be dealt with until the preset compensating value Ui is determined and transmitted to the sizing device 14. Therefore, the dimensional error R cannot be reduced toward zero with sufficiently high response.

Figure 26:
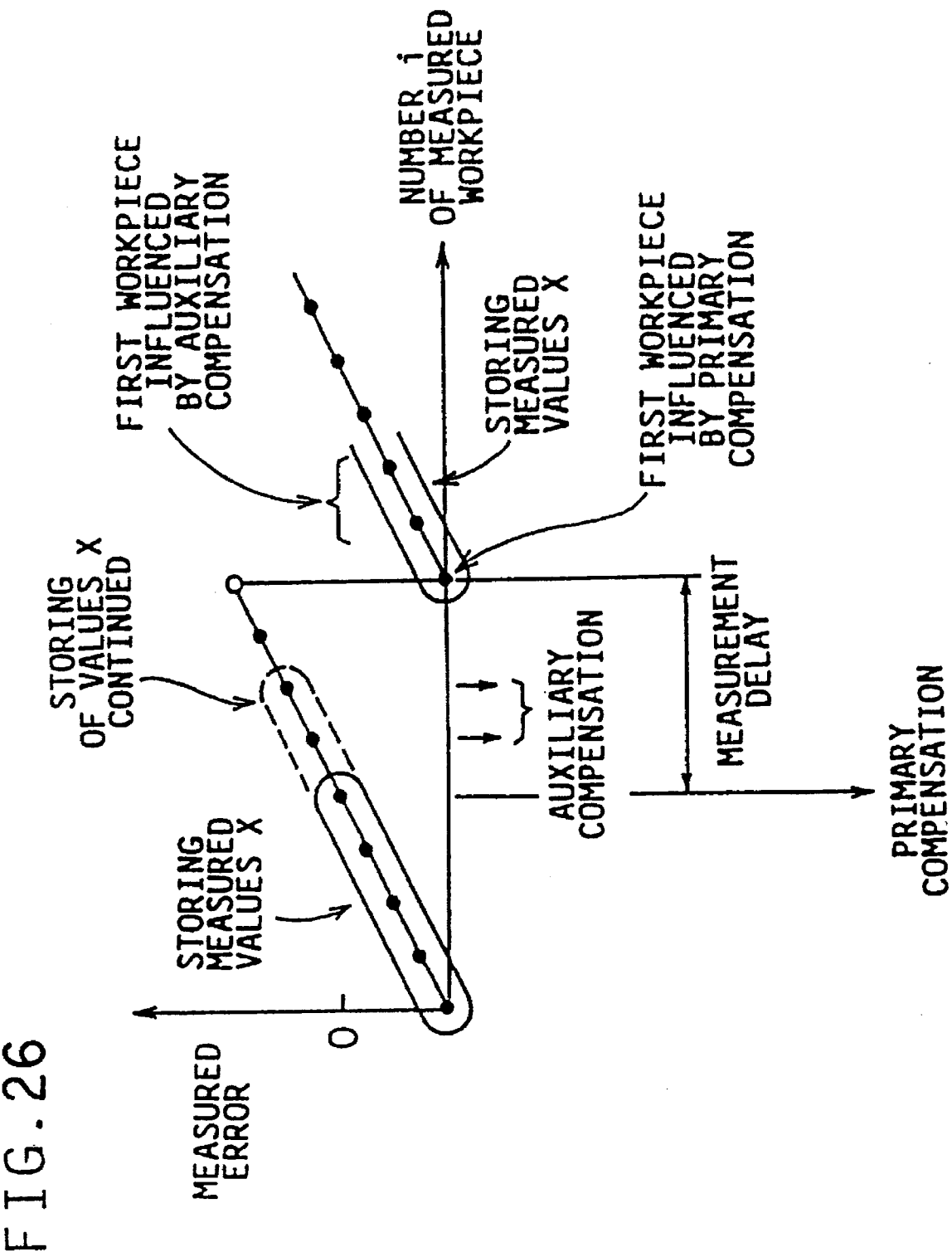
FIG. 26 is a graph schematically showing one form of the first method of FIG. 25.
Figure 27:
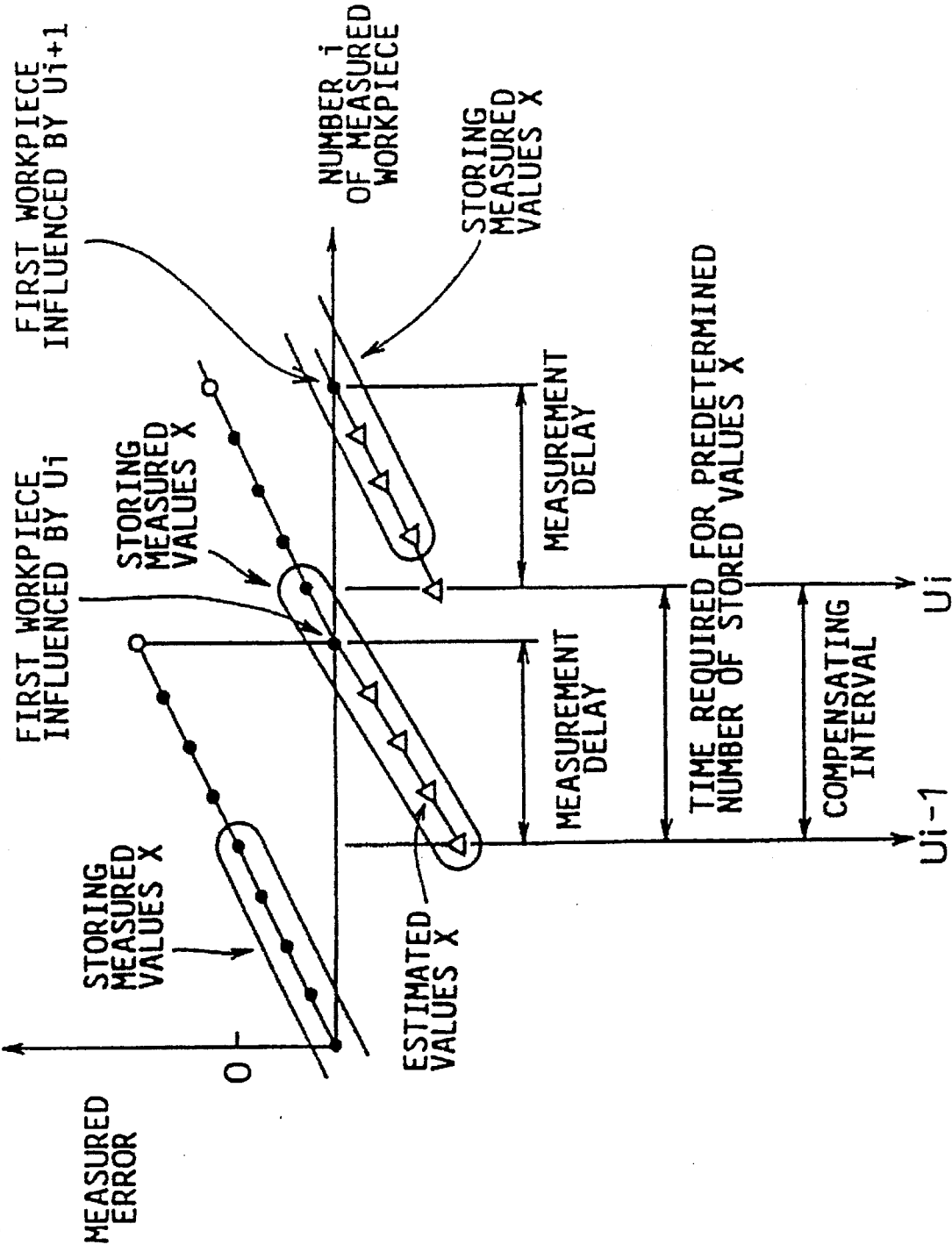
FIG. 27 is a graph schematically showing a second method of the "intermittent compensation" of FIG. 24.

The above drawback may be removed according to a third form of the first intermittent compensating mode, in which primary compensation (i.e., determination of Ui as indicated in FIG. 26) according to the above second form is followed by auxiliary compensation, as schematically illustrated in the graph of FIG. 27. The auxiliary compensation is effective to deal with a change in the measured values X which occurs shortly after the completion of the primary compensation. The auxiliary compensation is highly responsive to such change.

To achieve the primary compensation, the diameter values X measured by the measuring device 16 are successively stored in the data memory, and a provisional compensating value Up is determined when the number of the stored measured values X has become equal to a predetermined value. The provisional value Up determined on the basis of the predetermined number of the stored values X is used as a final compensating value Uf.

The auxiliary compensation following the primary compensation is adapted to continue storing the measured values X, and determine a provisional compensating value Up as in the primary compensation, on the basis of a predetermined number ($\geq 2$) of the measured values X when each ground workpiece is measured by the measuring device 16, during a period between a moment after the primary compensation is completed (e.g., immediately after the primary compensation is completed) and a moment before or when the measurement of the workpiece which immediately precedes the first workpiece subjected to or influenced by the primary compensation is completed. For example, the auxiliary compensation is commenced immediately after the primary compensation is completed, and is continued until the workpiece immediately preceding the first workpiece influenced by the primary compensation has been measured. The determined provisional compensating value Up of the auxiliary compensation is subtracted from the final compensating value Uf of the primary compensation, and the thus obtained difference is used as a final compensating value Uf of the auxiliary compensation.

In the auxiliary compensation, therefore, the provisional compensating value Up as determined in the same manner as in the primary compensation is not sent to the automatic sizing device 14. Instead, the difference of the provisional values Up of the primary and auxiliary compensations is applied to the sizing device 14, for the reason described below.

As explained above, the provisional value Up of the auxiliary compensation is based on the values X measured before the first workpiece influenced by the primary compensation is measured by the measuring device 16. Hence, if the provisional value Up of the auxiliary compensation were applied, this would be added to the final compensating value Uf of the primary compensation, and the reference values for the workpieces already influenced by the primary compensation would be again influenced or adjusted by the provisional compensating value Up of the auxiliary compensation, without considering an influence of the primary compensation. Accordingly, only the difference of the provisional compensation value Up of the auxiliary compensation from the final compensation Uf of the primary compensation is used as the final compensating value Uf of each auxiliary compensation, which is applied to the sizing device 14 before the first workpiece influenced by the primary compensation has been measured. While two or more auxiliary compensation cycles may follow the primary compensation in each one of intermittent compensating cycles, the provisional value Up obtained in each auxiliary compensating cycle is compared with the final compensating value Uf of the primary compensation to determine the final compensating value Uf of each auxiliary compensation cycle.

In the third form of the first intermittent compensating mode in which the auxiliary compensation follows the primary compensation, the auxiliary compensation cycle following the primary compensation in each intermittent compensating cycle may be repeated up to a moment immediately before the commencement of the next primary compensation. This arrangement gives a considerable work load to the control device 20.

The above problem may be solved by providing a suitable maximum number S to which the number of the auxiliary compensation cycles to be repeated following each primary compensation is limited. That is, the series of auxiliary compensation is terminated when the counted number of the auxiliary compensation cycles repeated or the counted number of the final compensating values Uf determined has reached a predetermined value. In this arrangement, the moment of termination of the auxiliary compensation is fixed with respect to the moment of termination of the corresponding primary compensation, and an unexpected change in the measured values X may occur after the termination of the auxiliary compensation and before the commencement of the next intermittent compensation cycle (next primary compensation). Therefore, the arrangement is not necessarily satisfactory to adequately deal with such change in the measured values X.

The above drawback may be solved by an arrangement in which the final compensating value Uf obtained in the first auxiliary compensation cycle is not applied to the automatic sizing device 14 if the value Uf falls within a tolerable range, as described above by reference to FIG. 23 with respect to the standard or normal compensation (equivalent to the primary compensation). Namely, the final compensating value Uf determined in a subsequent auxiliary compensation cycle is sent to the sizing device 14 to effect the auxiliary compensation, if the value Uf in question is a considerably large value outside the tolerable range.

The above arrangement is still unsatisfactory in some situations, in terms of the timing of the primary and auxiliary compensations relative to the time of a change in the measured values X. In this respect, the arrangement in question may be improved if modified as follows. In the modified form, the number of the final compensating values Uf obtained in a series of auxiliary compensation cycles executed following each primary compensation is counted, and the final compensating values Uf of the primary compensation and the series of auxiliary compensation cycles are summed up when the counted number has become equal to a predetermined value. If the sum is not substantially zero or not sufficiently close to zero, the auxiliary compensation is terminated. If the sum is sufficiently close to zero, this indicates that the series of auxiliary compensation cycles so far would not be considered adequate in terms of the timing of implementation. In this event, the counter to count the number of the values Uf of the auxiliary compensation cycles is reset, and further auxiliary compensation cycles are implemented.

When the first intermittent compensating mode is selected in the present embodiment, the control device 20 is placed in one of two operating states, namely, a first state in which only the primary compensation is effected as indicated in FIG. 25, and a second state in which both the primary compensation and the auxiliary compensation are effected as indicated in FIG. 26. The first and second states are selectively established by a command entered by the operator. Namely, the second state is established by an AUXILIARY COMPENSATION command, and the first state is established when the AUXILIARY COMPENSATION command is not present.

Further, the auxiliary compensation cycle is either executed once or repeated two or more times following each primary compensation, depending upon a command also entered by the operator.

When the auxiliary compensation cycle is repeated, the tolerable range as described above may or may not be provided to determine whether the final compensating value Uf obtained in the first auxiliary compensation cycle should be sent to the sizing device 14 or not. The tolerable range is provided when a TOLERABLE RANGE command entered by the operator is present, and not provided when an AUXILIARY COMPENSATION CYCLING command also entered by the operator is present. In the latter case, the auxiliary compensation cycle is repeated a predetermined number of times, and the compensating value Uf determined in each cycle is sent to the sizing device 14, irrespective of whether the value Uf is within the tolerable range or not.

II. SECOND INTERMITTENT COMPENSATING MODE

In the first intermittent compensation mode, the values X used for the compensation (primary compensation) are not measured and stored immediately after the determination of the compensating value Ui, until the first workpiece influenced by the compensating value Ui has been measured by the measuring device 16, if there is a measurement delay corresponding to the number Y of the pre-measured workpieces between the grinding machine 10 and the measuring device 16. Consequently, the compensating interval between the moments of determination of the last and present compensating values Ui−1 and Ui is a sum of the measurement delay time (dead time value MS) and the time required to obtain a predetermined number of measured values X. Therefore, the compensating interval tends to be relatively long, particularly where the grinding system is adapted to have a relatively large number of pre-measured workpieces between the machine 10 and the measuring device 16.

The second intermittent compensating mode is provided to solve the above drawback of the first intermittent compensating mode. In the present second mode, as schematically illustrated in the graph of FIG. 27, each automatic compensating interval or cycle begins with the commencement of the storing of the measured values X and ends with the determination of the present automatic compensating value Ui. During each automatic compensating interval or cycle, the last automatic compensating value Ui−1 is added to the diameter value X of each workpiece W which is measured by the post-process measuring device 16 during an X-shift period that ends at the moment when or shortly before or after the measurement of the workpiece immediately preceding the first workpiece influenced by the last compensating value Ui−1 is completed. Namely, it is assumed that the first workpiece influenced by the last compensating value Ui−1 is measured during each automatic compensating cycle. Each sum of the last compensating value U−1 and the actually measured value X, which is obtained during the X-shift period is used as an estimated value X which is stored in the memory. That is, these estimated values X are the diameter values X of the workpieces which are expected if those workpieces were ground under the influence of the last compensating value Ui−1 and measured by the measuring device 16. In other words, each time the workpiece is measured during the X-shift period, a value X of that workpiece if ground under the influence of the last compensating value Ui−1 is estimated on the basis of the last compensating value Ui−1 and the actually measured value X. Thus, the actually measured values X are adjusted or shifted by the amount equal to the last compensating value Ui−1, and the adjusted values X are stored as the estimated values in the memory for determining the present compensating value Ui. After the first workpiece W influenced by the last compensating value Ui−1 is measured, the shifting value is zeroed, that is, the actually measured values X are stored without shifting by the last compensating value Ui−1. This shifting of the actually measured values X will be described in detail by reference to the flow chart of FIG. 30.

Figure 28:
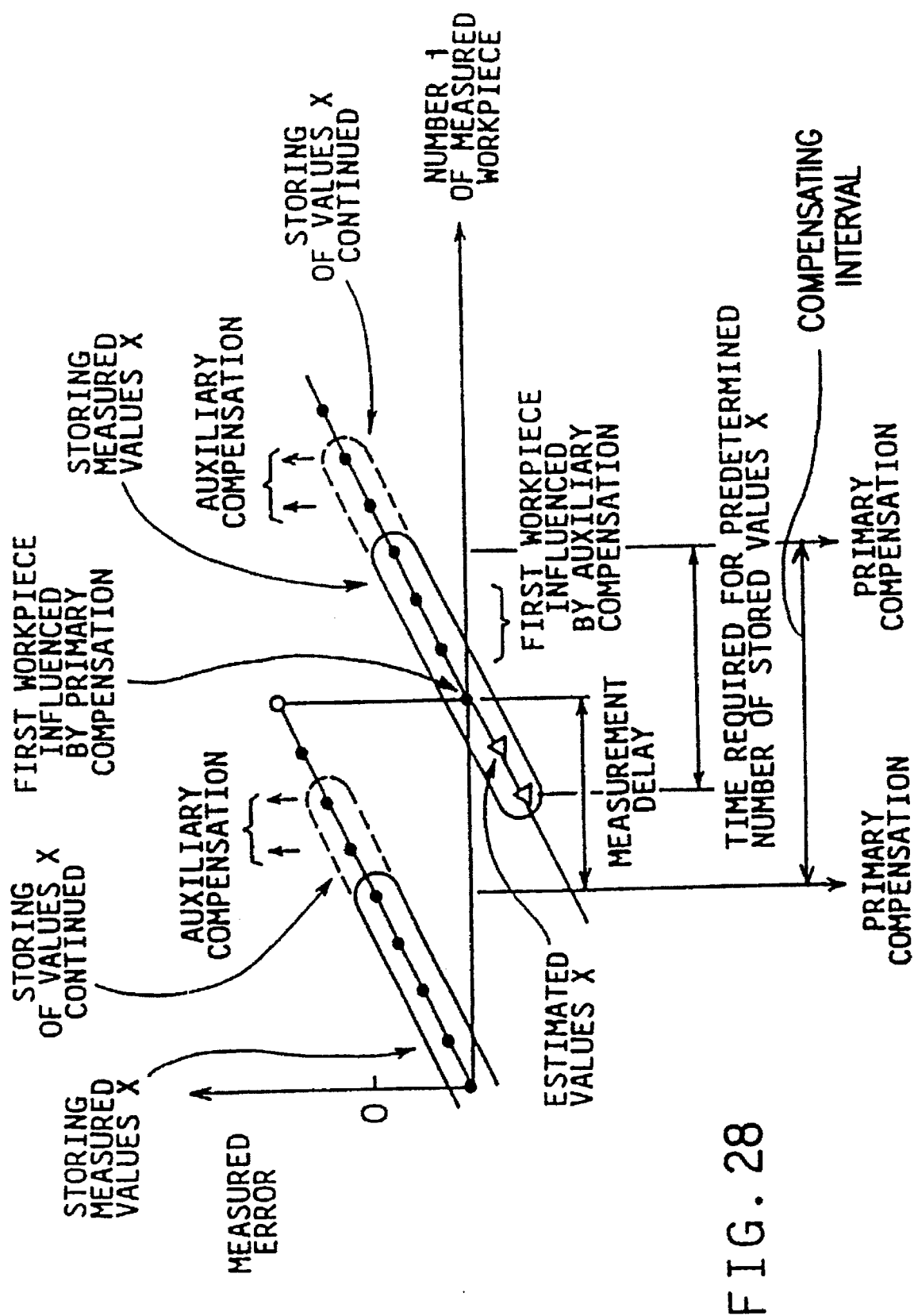
FIG. 28 is a graph schematically showing one form of the second method of FIG. 27.

In this second intermittent compensating mode, too, auxiliary compensation as described with respect to the first intermittent compensation mode is available following each primary compensation, as indicated in the graph of FIG. 28. The number of the auxiliary compensation cycles may be suitably determined. Further, the tolerable range may or may not be used for the primary and auxiliary compensation cycles.

The first and second intermittent compensating modes are selectively established. Namely, the second mode is selected when an X-SHIFT command entered by the operator is present. When this X-SHIFT command is not present, the first mode is selected.

In the present embodiment, the RAM of the control device 20 has first and second calculation data memories which are used in the first and second intermittent compensating modes, respectively. These two calculation data memories are cleared at different times, as described below in detail.

There will next be described a relationship between the automatic adjustment or compensation of the reference values of the automatic sizing device 14 by the control device 20, and the manual adjustment or compensation through the keyboard 50 by the operator.

The control device 20 controls the automatic sizing device 14 such that the manual adjustment of the sizing device 14 if commanded by the operator is predominant over the automatic adjustment. In each automatic compensating cycle which begins with the commencement of storage of the measured values X and ends with the determination and transmission of the compensating value U, the control device 20 makes a decision as to whether manual adjustment of the sizing device 14 is commanded or required. This decision is made in steps S10 and S20 in the flow chart of FIG. 4B, when the post-process measuring device 16 does not have any measured values X, that is, immediately after all measured values X have been supplied from the post-process measuring device 16 to the control device 20, and in steps S67, S76 and S83 in the flow chart of FIG. 8A, 8B and 8C, immediately after the compensating value U has been determined by the control device 20 and immediately before the value U is sent to the automatic sizing device 14. If the manual adjustment is commanded, the manual compensating value entered through the keyboard 50 is sent from the automatic sizing device 14 to the control device 20.

The present embodiment of the feedback compensating apparatus is adapted such that upon commanding of a manual adjustment of the automatic sizing device 14 during automatic compensation by the control device 20, the measured values X of the workpieces stored before the generation of a manual compensation column and are also taken into account or effectively utilized for the determination of the present compensating value Ui by the control device 20. That is, the automatic adjustment of the sizing device 14 by the control device 20 will not be interrupted or terminated even after the manual compensation command is generated, and the automatic adjustment is performed in the manner as described below.

Figure 29A:
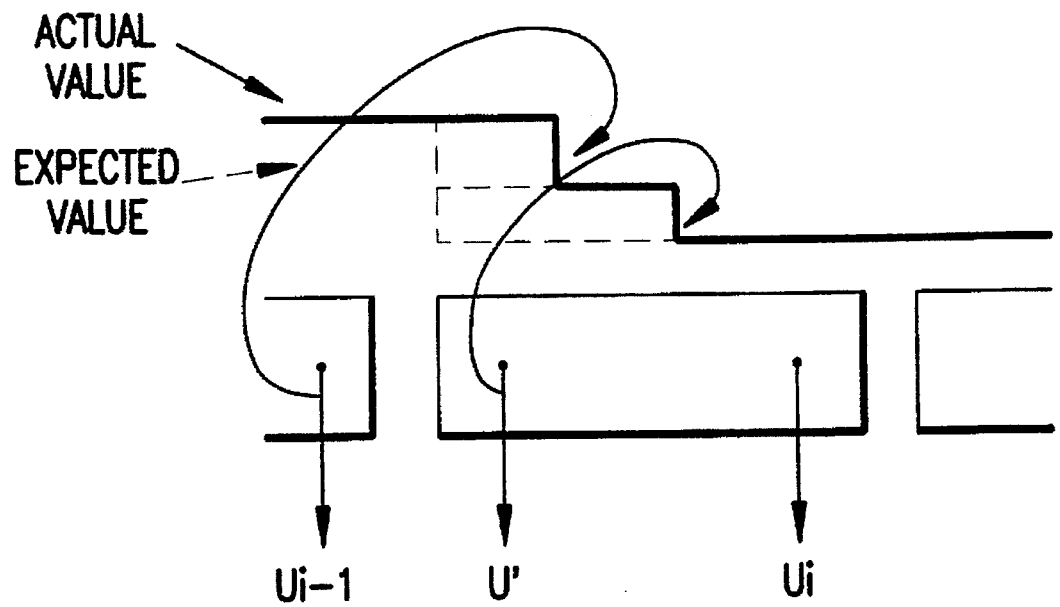
FIGS. 29A and 29B are views explaining one feature of the apparatus.
Figure 29B:
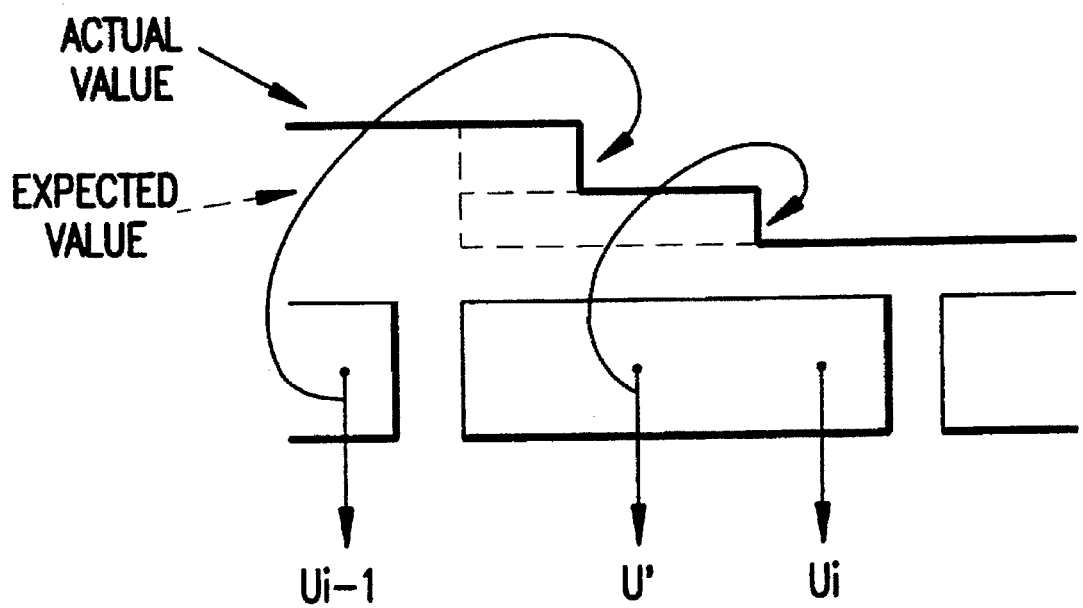

There are two different cases in terms of a time relationship between the moment of generation of a manual compensation command during an automatic compensating cycle and the moment at which an influence of the last automatic compensating value Ui–1 first appears on the actually measured value X of the workpiece during the same automatic compensating cycle. The two cases are illustrated in FIGS. 29A and 29B wherein each rectangular block represents an automatic compensating interval or cycle. In the first case of FIG. 29A, the influence of the last automatic compensating value Ui–1 first appears on the actually measured value X after a manual compensation command (whose value is indicated at U') is generated, and then an influence of the manual compensating value UR' appears on the actually measured value X. In the second case of FIG. 29B, the influence of the last automatic compensating value Ui–1 appears on the actually measured value X before generation of the manual compensation command, and the influence of the manual compensating value UR' appears thereafter.

When a manual compensating command is generated during a given automatic compensating cycle, the measured values X of the workpieces which have been stored in the control device 20 are adjusted or shifted. Described in detail, while the X-shift command as described above is present, estimated values X are obtained by adding the last automatic compensating value Ui–1 (which determines the current working condition of the machine 10) to the measured values already stored in the control device 20, irrespective of whether a manual compensation command is present or not. When a manual compensation command is generated, the estimated values X are further adjusted or shifted by the amount equal to the manual compensating value U'. Namely, the already measured and stored values X are shifted or changed by the total amount equal to the sum of the last or currently effective automatic compensating value Ui–1 and the manual compensating value U'.

In the case of FIG. 29A, upon generation of a manual compensation command, the manual compensating value UR' is added to each of the estimated values X which have been obtained and stored prior to the generation of the manual compensation command. Since each estimated value X is equal to the sum of the actually measured and stored value X and the last automatic compensating value Ui–1, the addition of the manual compensating value UR' to the already stored estimated value X results in the finally shifted or adjusted value X (updated estimated value) which is equal to the sum of the actually measured value X, last automatic compensating value Ui–1 and manual compensating value U'.

In the second case of FIG. 29B, too, the manual compensating value UR' is added to each of the values X which have been already stored prior to the generation of the value U'. More specifically, the manual compensating value U' is added to each estimated value X (=measured value X+last automatic compensating value Ui+1) which is obtained during the period which ends when the influence of the last automatic compensating value Ui–1 appears on the actually measured value X. Further, the manual compensating value U' is added to each value X which is measured during the period which ends when the manual compensation command is generated. In this respect, it is noted that the actually measured values X obtained in the former period do not reflect the influence of the last automatic compensating value Ui–1 and are therefore adjusted or shifted by the amount equal to (Ui–1)+UR' to obtain the final estimated values X. On the other hand, the actually measured values X obtained in the latter period reflect the influence of the automatic compensating value Ui–1, and are shifted by the amount equal to UR' to obtain the final estimated values X.

Figure 31:
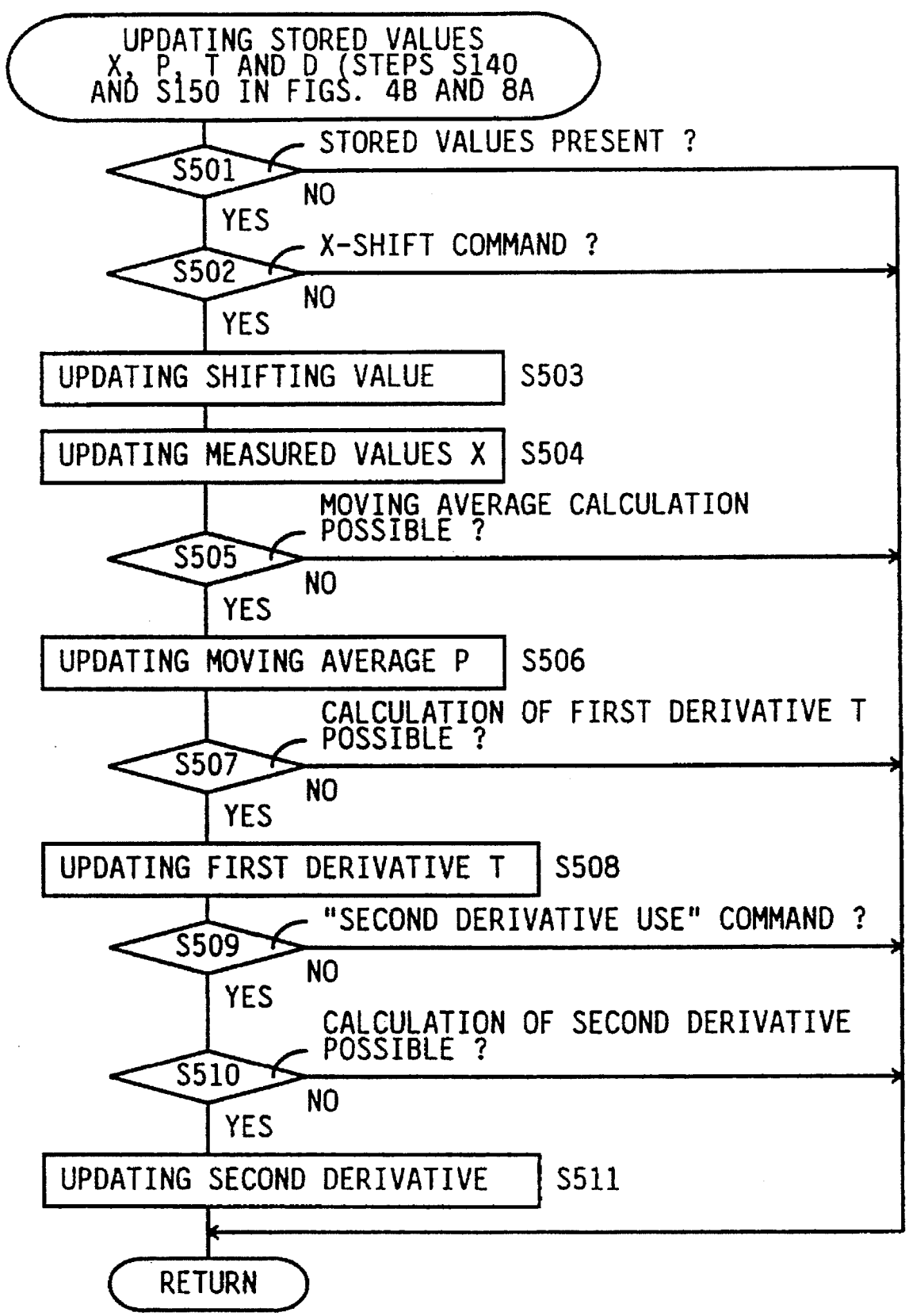
FIG. 31 is a flow chart illustrating the details of step S140 of FIG. 4B and step S150 of FIG. 8A.

As a result of the adjustment or shifting of the actually measured values X as described above, the already stored moving average values P and first and second derivatives T and D are accordingly adjusted in a routine as illustrated in the flow chart of FIG. 31 which will be described.

After the actually measured and stored values X have been adjusted or shifted upon generation of the manual compensation command as described above, the measured values X obtained from time to time during the remaining period of the automatic compensating cycle are processed as described below.

In the first case of FIG. 29A, estimated values X are obtained by: (a) adding the last automatic compensating value Ui−1 and manual compensating value UR' to the actually measured values X, during a period between the generation of the manual compensation command and the moment at which the influence of the last automatic compensating value Ui−1 first appears on the measured value X; and (b) adding only the manual compensating value U' to the actually measured values X, during a period between the moment at which the influence of the value Ui−1 first appears on the measured value X and the moment at which the influence of the manual compensating value U' first appears on the measured value X. After the influence of the manual compensating value U' first appears on the actually measured value X, the actually measured values X are stored in the second calculation data memory of the control device 20 without any adjustment.

In the second case of FIG. 29B, estimated values X are obtained by adding only the manual compensating value U' to the actually measured values X, during a period between the generation of the manual compensation command and the moment at which the influence of the manual compensating value U' first appears on the actually measured value X. After the influence of the value U' appears on the actually measured value X, the actually measured values X are stored without any adjustment.

Figure 30:
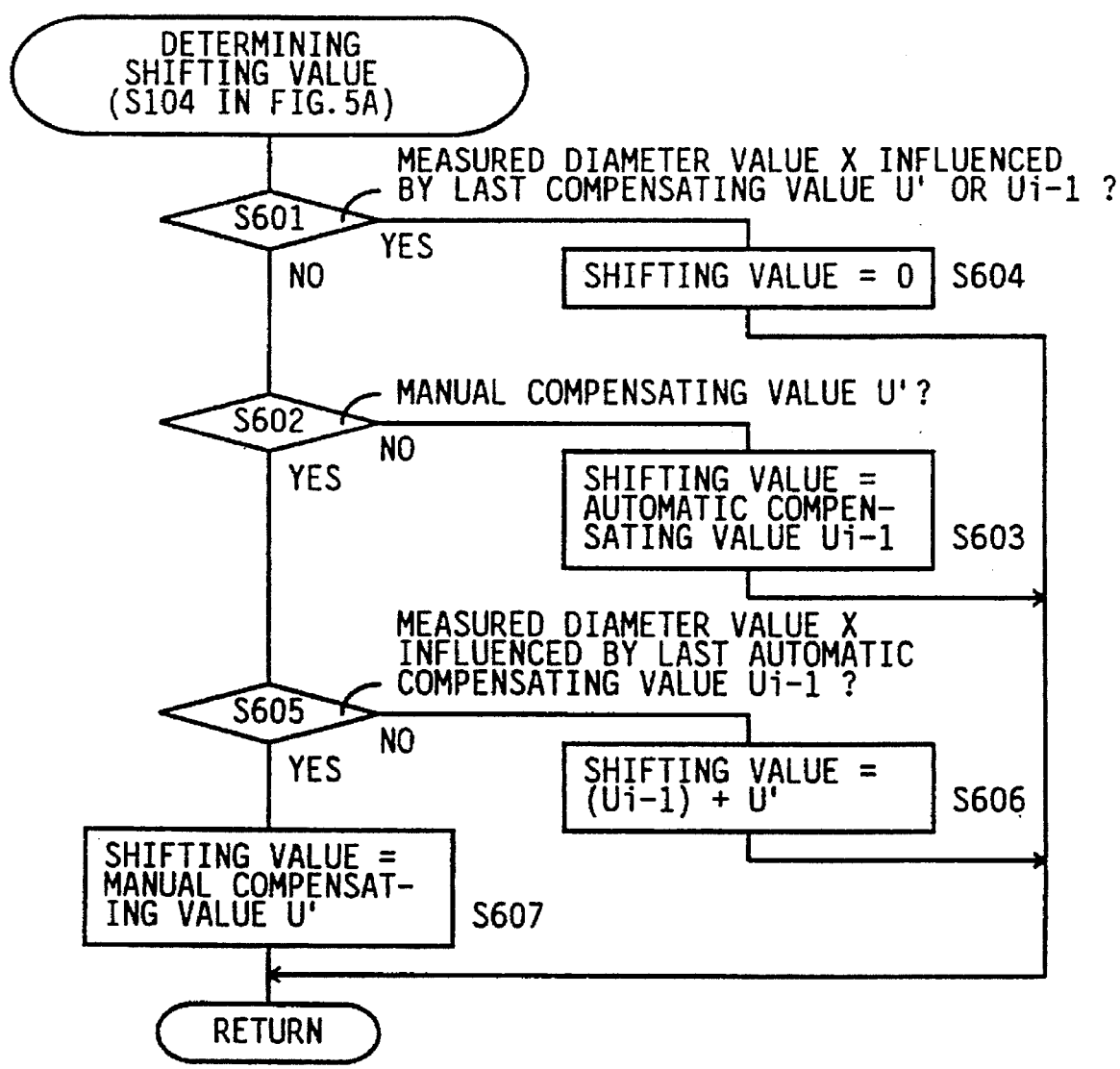
FIG. 30 is a flow chart illustrating the details of step S104 of FIG. 5A.

The adjustment of the actually measured values X after the generation of the manual compensation command is performed in a routine as illustrated in the flow chart of FIG. 30.

The first and second calculation data memories of the RAM of the control device 20 for storing data in the first and second intermittent compensation modes are cleared at different times as described below.

The first calculation data memory used in the first intermittent compensation mode is cleared each time a manual compensation value is entered through the keyboard 50 or an automatic compensation value is transmitted from the control device 20 to the automatic sizing device 14. Further, the data memory is cleared during a period between the moment of transmission of the last automatic compensating value U and the moment of completion of the measurement of the first workpiece influenced by the last automatic compensating value, that is, while the WORKPIECE WAIT flag is held ON. On the other hand, the second calculation data memory used in the second intermittent compensating mode is cleared when a first manual compensating value is entered, but not each time a manual compensating value is entered. This data memory is cleared each time an automatic compensating value is transmitted from the control device 20, and is not cleared while the WORKPIECE WAIT flag is ON.

Generally, the reference values preset in the automatic sizing device 14 which correspond to the nominal diameter values of the journals 28 of the workpiece W (crankshaft 26) are adjusted on a regular basis or upon replacement of worn pairs of contact probes of the measuring heads 12 of the in-process measuring device 12 with new ones. This adjustment or calibration is made on the basis of output signals of the in-process measuring heads 12 when a master workpiece whose journals 28 have the nominal diameter values is measured by the measuring heads 12. For instance, the electrical characteristics of the automatic sizing device 14 are adjusted with the contact probes of the measuring heads 12 held in contact with the master workpiece, so that the automatic sizing device 14 generates a signal to terminate the grinding operation on the workpiece W. Usually, the tendency of change in the dimensions of the workpieces 26 ground by the grinding machine 10 differs before and after the calibration of the automatic sizing device 14. To confirm the tendency of the dimensional change of the workpieces after the calibration of the device 14, a test grinding operation is performed on some number of workpieces, and the dimensions of the test-ground workpieces are checked at a checking station provided between the machine 10 and the post-process measuring device 16. The reference values of the automatic sizing device 14 are manually adjusted on the basis of the dimensions of the test-ground workpieces. In view of this manual adjustment, the first calculation data memory used in the first intermittent compensation mode is adapted to be cleared each time a manual compensating value is entered through the keyboard 50, and the automatic compensation in this mode is interrupted until an influence of the manual compensating value appears on the workpiece actually measured by the post-process measuring device 16.

However, a manual compensating value is not always entered after the calibration of the automatic sizing device 14. That is, manual compensation of the device 14 may be found unnecessary after the test grinding operation. In this case, the first calculation data memory is not cleared even after the calibration of the device 14. For improving the accuracy of automatic compensation of the device 14, therefore, it is desirable to clear the data memory also when the device 14 is not manually adjusted after its calibration. To this end, the control device 20 should receive from the automatic sizing device 14 information indicative of the calibration of the device 14 as well as the manual compensating value U'.

While the features of the compensating routine of FIG. 10 for feed-back adjusting the automatic sizing device 14 have been briefly explained, the compensating routine will be discussed in detail referring to the flow charts of FIGS. 4–9.

Figure 4A:
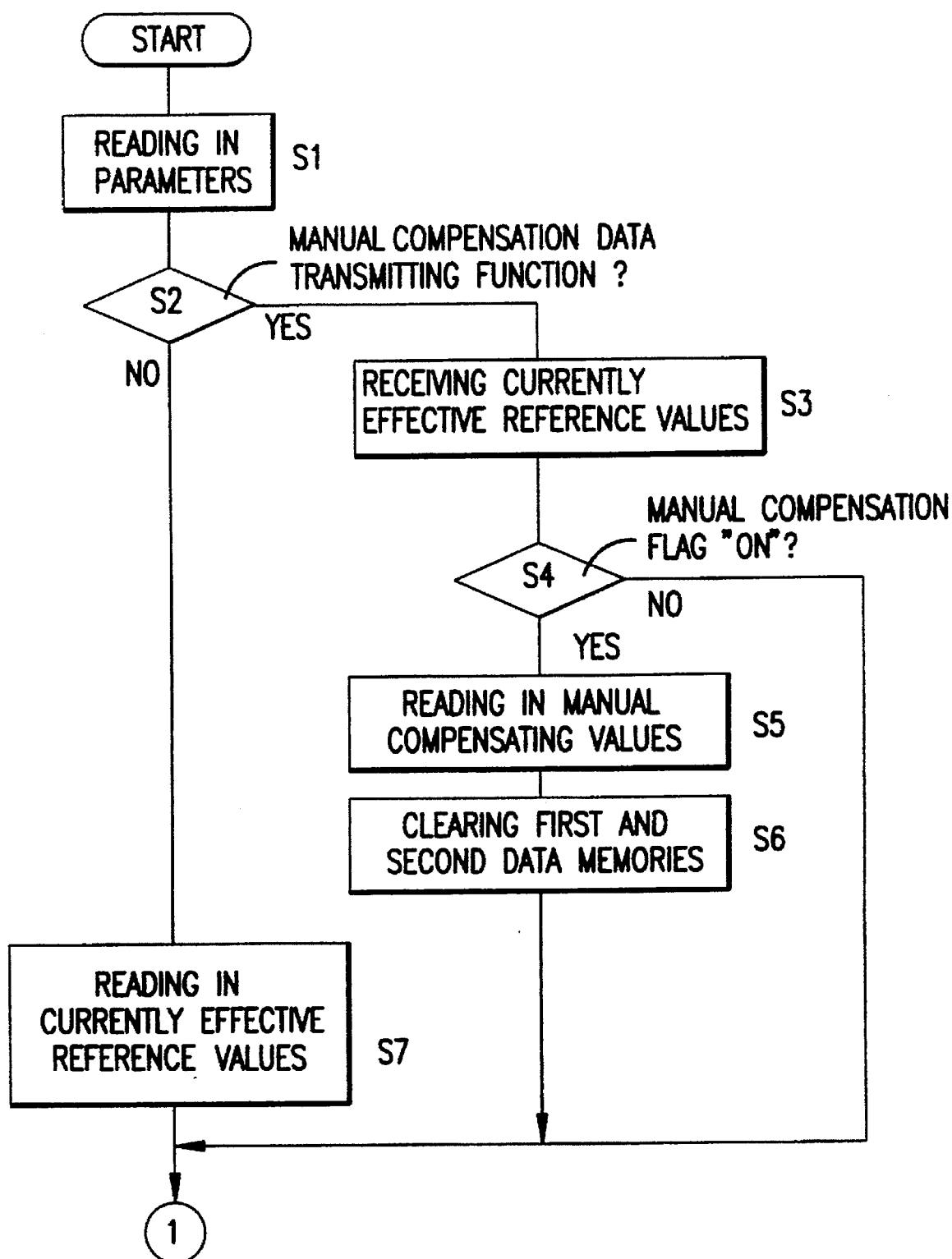
FIGS. 4A and 4B are flow charts illustrating a portion of a compensating routine executed by a computer of a control device used for the grinding system of FIG. 3, for adjusting the grinding condition.

Initially, step S1 of FIG. 4A is implemented to read in from the auxiliary memory 22 various manually entered parameters in the form of numerical values and control commands necessary to execute the compensating routine. The numerical values include initial values of the weighting coefficients b for obtaining the moving average P; a value representative of the maximum number Z of the measured values X usable as the moving average values P to obtain one first derivative value T in the "substitution averaging method"; and a value representative of the maximum number S of repetition (which will be described) of the auxiliary compensation cycles following the primary compensation. The commands represented by the manually entered parameters include the SPECIAL AVERAGING command, X-SHIFT command, GRADUAL COMPENSATION command, SPECIAL DIFFERENTIATION command, AUXILIARY COMPENSATION command, and other commands entered by the operator.

Step S1 is followed by S2 to determine whether the automatic sizing device 14 has the function of transmitting from its RAM to the control device 20 currently effective manual compensating values entered through the keyboard 50, and the reference values of the sizing device 14 as adjusted by these manual compensating values. As explained above, the reference values indicate the in-feed amounts of the grinding wheels 30 with respect to the two end journals 28. If the grinding system in question does not have this function, the manual compensating values and the related reference values are stored only in the RAM of the device 14, and the device 14 is not capable of transmitting these data to the control device 20.

For illustrative purpose, it is assumed that the sizing device 14 in this present embodiment has the above function. Therefore, an affirmative decision (YES) is obtained in step S2, and the control flow goes to step S3 in which the control device 20 is enabled to receive from the sizing device 14 data or signals indicative of the currently effective manually adjusted reference values for the two end journals 28. The received data are stored in the RAM of the control device 20, and also in the auxiliary memory 22.

Step S3 is followed by step S4 to determine whether any manual compensating values have been entered through the keyboard 50 or not. This determination is effected based on the state of a MANUAL COMPENSATION flag provided in the RAM of the sizing device 14. If a negative decision (NO) is obtained in step S4, the control flow goes directly to step S8 of FIG. 4B which will be described. If an affirmative decision (YES) is obtained in step S4, step S5 is implemented to receive currently effective manual compensating values (for the two end journals 28) transmitted from the sizing device 14. The received data are stored in the RAM of the control device 20 and the auxiliary memory 22. Step S5 is followed by step S6 to clear the two calculation data memories of the control device 20 for the first and second intermittent compensation modes. Then, the control flow goes to step S8.

If the sizing device 14 were not provided with the function of transmitting the manual compensating data to the control device 20, a negative decision (NO) is obtained in step S2, and step S7 is implemented whereby the control device 20 is enabled to read in from the RAM of the sizing device 14 the currently effective reference values. These reference values are stored in the RAM of the control device 20 and in the auxiliary memory 22.

There will be described the purposes of the control device 20 of storing the currently effective manual compensating values and the corresponding reference values currently set in the automatic sizing device 14.

The purpose of the control device 20 to store the currently effective reference values will be first described.

As explained above, the control device 20 is adapted to automatically determine the automatic compensating values U by which the currently effective reference values of the sizing device 14 are adjusted or changed. On the other hand, the sizing device 14 adjusts the reference values according to the compensating values U received from the control device 20. However, the sizing device 14 has a permissible range of the reference values. That is, the sizing device 14 cannot operate to control the grinding machine 10 and is adapted to be stopped, if the reference values are outside the permissible range. Therefore, the control device 20 is adapted to inhibit the application or transmission of the automatic compensating values U to the sizing device 14, if the reference values as adjusted by the compensating values U do not fall within the permissible range. To this end, the control device 20 should know the currently effective reference values of the sizing device 14 as determined by the manually entered compensating values. The operation to inhibit the transmission of the automatic compensating values U is performed according to a suitable routine, which is not shown as the understanding of this routine is not essential to understand the principle of the present invention.

Then, the purpose of the control device 20 to store the manually entered compensating values will be described.

As described above, when the X-SHIFT command is entered by the operator, the values X which would reflect the reference value as adjusted by the last compensating value Ui−1 are estimated on the basis of the values X of the workpieces which are measured by the measuring device 16 after the application of the last compensating value Ui−1 but which have not been influenced by the last compensating value Ui−1. As also described above, the estimated values X are obtained by adding the last automatic compensating value Ui−1 to the actually measured values X. When a manual compensating value is entered by the operator, however, the estimated values X are obtained by adding the manual compensating value to the actually measured values X, so that the estimated values X reflect the manual compensating value. For this purpose, the control device 20 should have the data representative of the currently effective manual compensating value.

Irrespective of whether or not the sizing device 14 has the function of positively transmitting the manual compensation data to the control device 20, step S8 is implemented to determine whether there are any values X which have been measured by the device 16 and which have not yet been sent to the control device 20. In this respect, it is noted that each workpiece (crankshaft 26) has the seven journals 28 whose diameter values X are measured by the measuring device 16. If no such measured values X are present, a negative decision (NO) is obtained in step S8, and step S9 is implemented.

Step S9 is identical with step S2 described above. If an affirmative decision (YES) is obtained in step S9, the control flow goes to step S10 identical with step S4 described above, to determine whether manual compensating values have been entered or not. If no manual compensating values have been entered, a negative decision (NO) is obtained in step S10, and step S11 is implemented to determine whether any parameters have been entered by the operator. If a negative decision (NO) is obtained in step S11, the control flow returns to step S8. If an affirmative decision (YES) is obtained in step S11, step S12 is implemented to read in the entered parameter or parameters, and step S13 is implemented to replace the already stored parameters with the newly entered parameter or parameters. Step S14 is then implemented to clear the first and second first and second calculation data memories, and the control flow returns to step S8.

If an affirmative decision (YES) is obtained in step S10, the control flow goes to step S15 identical with step S5, to receive and store the entered manual compensating values. Step S15 is followed by step S16 to turn on a WORKPIECE WAIT flag, and step S17 to clear the first calculation data memory. Then, the control flow returns to step S140.

Step S140 is provided to adjust or shift the diameter values X, moving average values P and first and second derivative values T and D which have been stored prior to the generation of a manual compensation command (prior to the entry of a manual compensating value U'). This adjustment is performed according to a routine illustrated in the flow chart of FIG. 31. The routine is initiated with step S501 to determine whether any values are stored in the second calculation data memory for the second intermittent compensation mode. If no values are stored, a negative decision (NO) is obtained in step S501, and the control flow returns to step S8 of FIG. 4B. If an affirmative decision (YES) is obtained in step S501, the control flow goes to step S502 and the following steps as described later in detail.

If the sizing device 14 does not have the function of transmitting the manual compensation data to the control device 20, a negative decision (NO) is obtained in step S9, and step S18 is implemented to read in and store the currently effective reference values of the sizing device 14. Step S18 is followed by step S19 to read in the reference values stored in the auxiliary memory 22. Then, step S20 is implemented to determine whether the currently effective reference values are different from the reference values stored in the auxiliary memory 22, namely, whether the reference values of the sizing device 14 have been changed or not. Thus, a change in the currently effective reference values of the device 14 can be detected by the control device 20, even if the device 14 is not capable of transmitting the manual compensation data to the control device 20. If the currently effective reference values of the device 14 are the same as the reference values stored in the memory 22, a negative decision (NO) is obtained in step S20, and the control flow goes directly to step S21. If the currently effective reference values have been changed, an affirmative decision (YES) is obtained in step S20, and step S21 is implemented to turn ON the WORKPIECE WAIT flag. Step S21 is followed by step S22 to clear the first calculation data memory for the first intermittent compensation mode. Then, the control flow goes to step S11.

If any measured value X has not been sent from the measuring device 16 to the control device 20, an affirmative decision (YES) is obtained in step S8, and step S23 is implemented to read in the measured diameter values X of the seven journals 28 and store them in the first and second calculation data memories of the control device 20. The measured values X are also stored in the auxiliary memory 22. Subsequently, the control flow goes to step S24 of FIG. 5A.

In step S24, the control device 20 determines whether the X-SHIFT command to select the second intermittent compensation mode of FIG. 27 has been entered by the operator. This determination can be made depending upon the parameters entered by the operator.

If the X-SHIFT command is not present, that is, if the first intermittent compensating mode is selected, a negative decision (NO) is obtained in step S24, and step S25 is implemented to determine whether the WORKPIECE WAIT flag is set at "ON". In this case, the first calculation data memory of the RAM of the control device 20 is used.

If the WORKPIECE WAIT flag is "ON", this means that the post-process measuring device 16 has not completed the measurement of the first workpiece influenced by the currently effective manual or automatic compensating value. If this flag is "OFF", this means that the first workpiece indicated above has been measured by the measuring device 16. This flag is provided in the RAM of the control device 20, and is set to "ON" when the control device 20 is initially turned on with power applied. According to a suitable routine (not shown), the flag is turned "OFF" each time the first workpiece influenced by the currently effective compensating value has been measured. The flag is turned "ON" each time the manual compensation or the intermittent adjustment of the automatic compensating value U is made according to the present compensating routine. If the WORKPIECE WAIT flag is "OFF", a negative decision (NO) is obtained in step S25, whereby the control flow goes to step S26.

In step S26, the control device 20 reads out the stored measured values X from the first calculation data memory. Step S26 is followed by step S27 in FIG. 5B to determine whether the calculation of the moving average P is possible or not, namely, whether the number of the measured values X (for each journal 28) is equal to "K" or larger. Please refer to FIG. 22. If the number of the measured values X is smaller than "K", a negative decision (NO) is obtained in step S27, and step S28 is implemented to determine whether the SPECIAL AVERAGING command for the moving average P is present or not. If the command is not present, the control returns to step S8. In this case, the automatic compensating value U is determined to be "0".

If an affirmative decision (YES) is obtained in step S28 with the SPECIAL AVERAGING command being present, step S29 is performed to determine whether the SUB-AVERAGING command for the moving average P is present or not. If not, a negative decision (NO) is obtained in step S29, and the control flow goes to step S30. While the SPECIAL AVERAGING command is present, either the SUB-AVERAGING command for the sub-averaging calculation of the moving average P or the SUBSTITUTION AVERAGING command for the substitution averaging calculation of the moving average P should be present. Therefore, if the SUB-AVERAGING command is not present, this means that the SUBSTITUTION AVERAGING command is present.

In step S30, the control device 20 determines whether the substitution averaging is possible or not, namely, whether the number of the measured values X stored in the calculation data memory is smaller than the difference (K–Z), where K represents the number of the measured values X used to calculate the moving average P according to the standard or normal averaging method, while Z represents the maximum number of the measured values X that can be used as the moving average P to obtain the first derivative T, as indicated in FIG. 14. If the number of the stored measured values X is smaller than (K–Z), the substitution averaging to use the measured value X as the moving average P is not possible, or is inhibited. If not, the substitution averaging is possible or permitted. In the former case, the control flow returns to step S8. An affirmative decision (YES) is eventually obtained in step S30 as the present routine is repeatedly executed (as the number of the stored measured values X increases), whereby step S31 is implemented to determine the last measured value X as the moving average P. Step S31 is followed by step S32 to store the value X as the moving average P in the first calculation data memory and the auxiliary memory 22. Then, the control goes to step S37.

If the SUB-AVERAGING command is present, an affirmative decision (YES) is obtained in step S29, step S33 is implemented to calculate the moving average P according to the sub-averaging method. Step S33 is followed by step S34 to store the calculated moving average P in the first calculation data memory and the auxiliary memory 22. Step S34 is also followed by step S37.

When the number of the measured values X stored in the first calculation data memory has reached the predetermined value "K" as the present routine is repeated, an affirmative decision (YES) is obtained in step S27, and step S35 is implemented to calculate the moving average P for each of the two end journals 28 according to the standard method.

The operation to calculate the moving average P in step S35 of FIG. 5B will be described in detail, by reference to the flow chart of FIG. 32.

Initially, step S201 is implemented to read in the weighting coefficients b from the RAM. Step S201 is followed by step S202 to calculate a moving average P for each end journal 28 on the basis of the measured values X stored in the calculation data memory and the weighting coefficients b, according to the above equation (1).

Then, the control flow goes to step S203 to calculate differences between the stored measured values X (used for calculating the moving average P) and the calculated moving average P, and calculate a sum of these differences, for determining the sum as the variation amount of the measured values X. In this step S203, the variation amount is stored in the RAM, in relation to the associated weighting coefficients b and moving average P. Step S203 is followed by step S204 to determine whether the determined variation amount is larger than a threshold value A or not. If not, a negative decision (NO) is obtained in step S204, and step S205 is implemented to determine the moving average P (calculated in step S202) as an effective moving average P. Step S205 is followed by step S206 to store the weighting coefficients b in the RAM, so that these coefficients b are used for the calculation of the next moving average P. The routine of FIG. 32 is ended with step S206.

Figure 38:
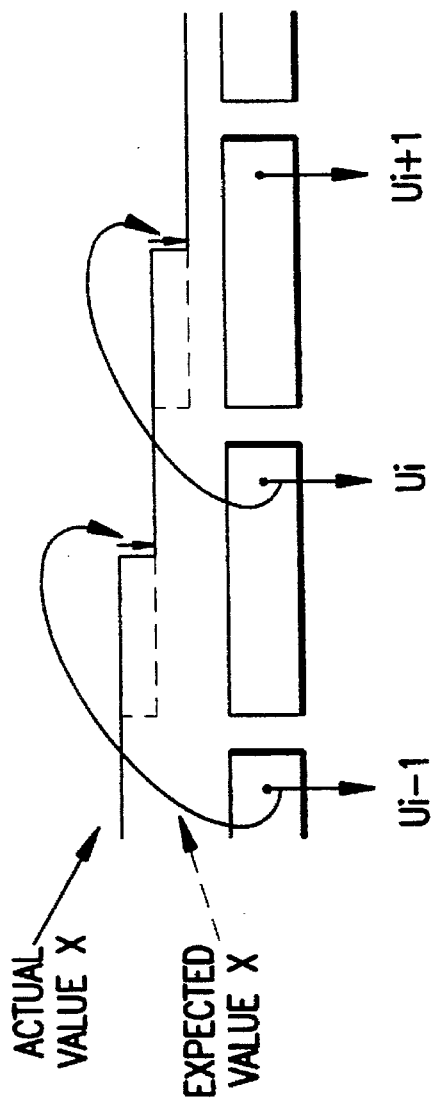
FIG. 38 is a view schematically indicating a principle of a prior feedback compensating apparatus developed by one of the present applicants et al.
Figure 39:
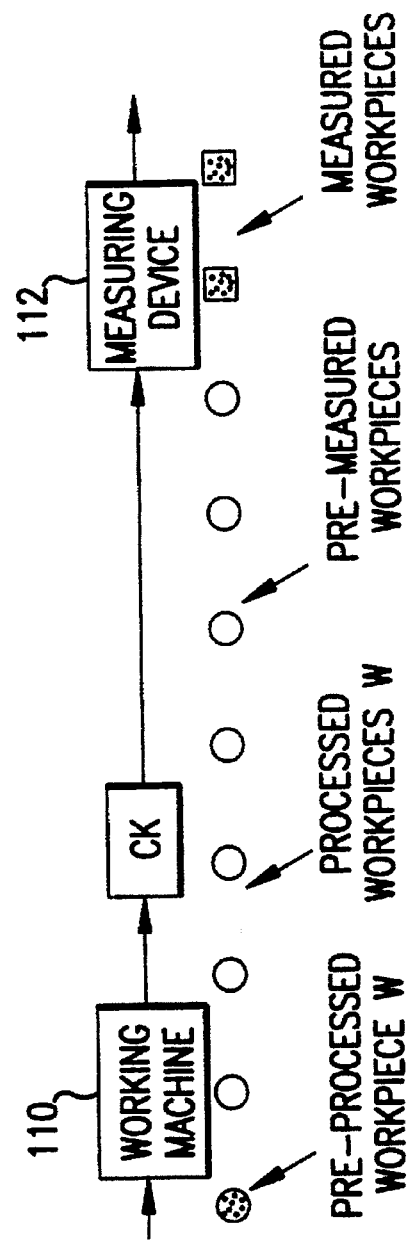
FIG. 39 is a view explaining a workpiece checking station disposed between a working machine and a workpiece measuring device.
Figure 40:
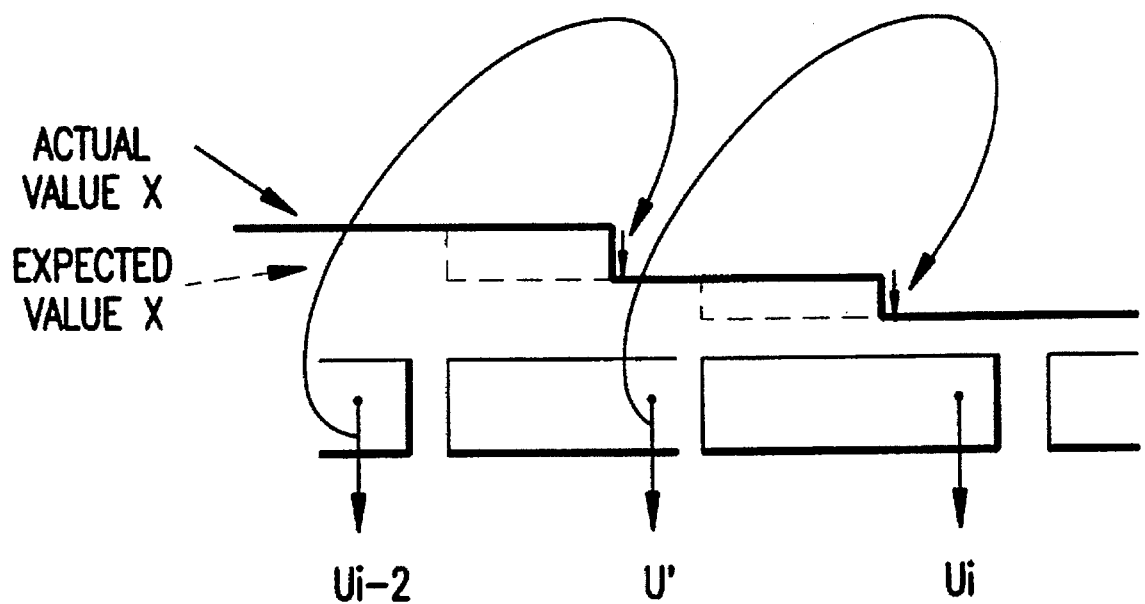
FIG. 40 is a view schematically indicating a principle of another prior feedback compensating apparatus developed by the inventors indicated above with respect to FIG. 38.
Figure 41:
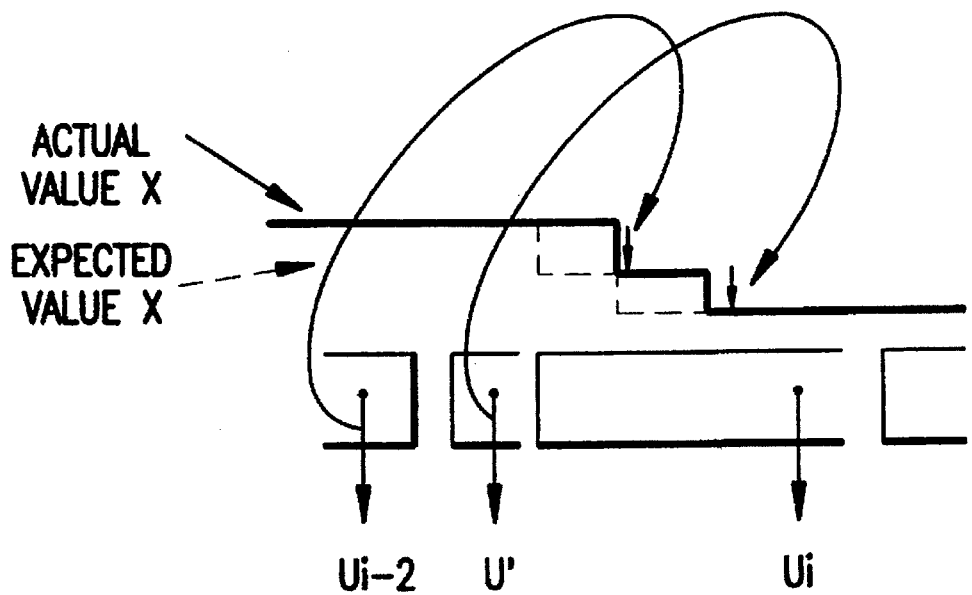
FIG. 41 is a view explaining a drawback of the prior apparatus of FIG. 40.

If the vibration level determined in step S203 is higher than the threshold value A, an affirmative decision (YES) is obtained in step S204, and the control flow goes to step S207 to change the increase rate or gradient of the weighting coefficients b according to a suitable rule. Then, step S208 is implemented to determine whether the increase rate has been changed throughout the range defined by the highest and lowest rates as indicated in the graph of FIG. 38. If not, the control flow returns to step S202.

In steps S202 and S203, the moving average P and the vibration level are calculated using the weighting coefficients b determined in step S207 according to the changed increase rate or gradient. Steps S202–S208 are repeatedly implemented until a negative decision (NO) is obtained in step S204, namely, until the vibration level is lowered to the threshold value A, as a result of change in the increase rate of the weighting coefficients b. Further, as long as the variation amount is larger than the threshold value A, steps S202–S208 are repeated until the increase rate of the weighting coefficients b has been changed throughout the range between the highest and lowest values, that is, until an affirmative decision (YES) is obtained in step S208.

If the affirmative decision (YES) is obtained in step S208, step S209 is implemented to search for the smallest one of the variation amounts stored in the RAM in step S203 (during repeated implementation of steps S202–S208). The moving average P corresponding to the smallest variation amount is determined as the effective moving average P. In the following step S206, the weighting coefficients b corresponding to the effective moving average P (smallest variation amount) are stored in the RAM so that these coefficients b are used for calculating the next moving average P.

Figure 32:
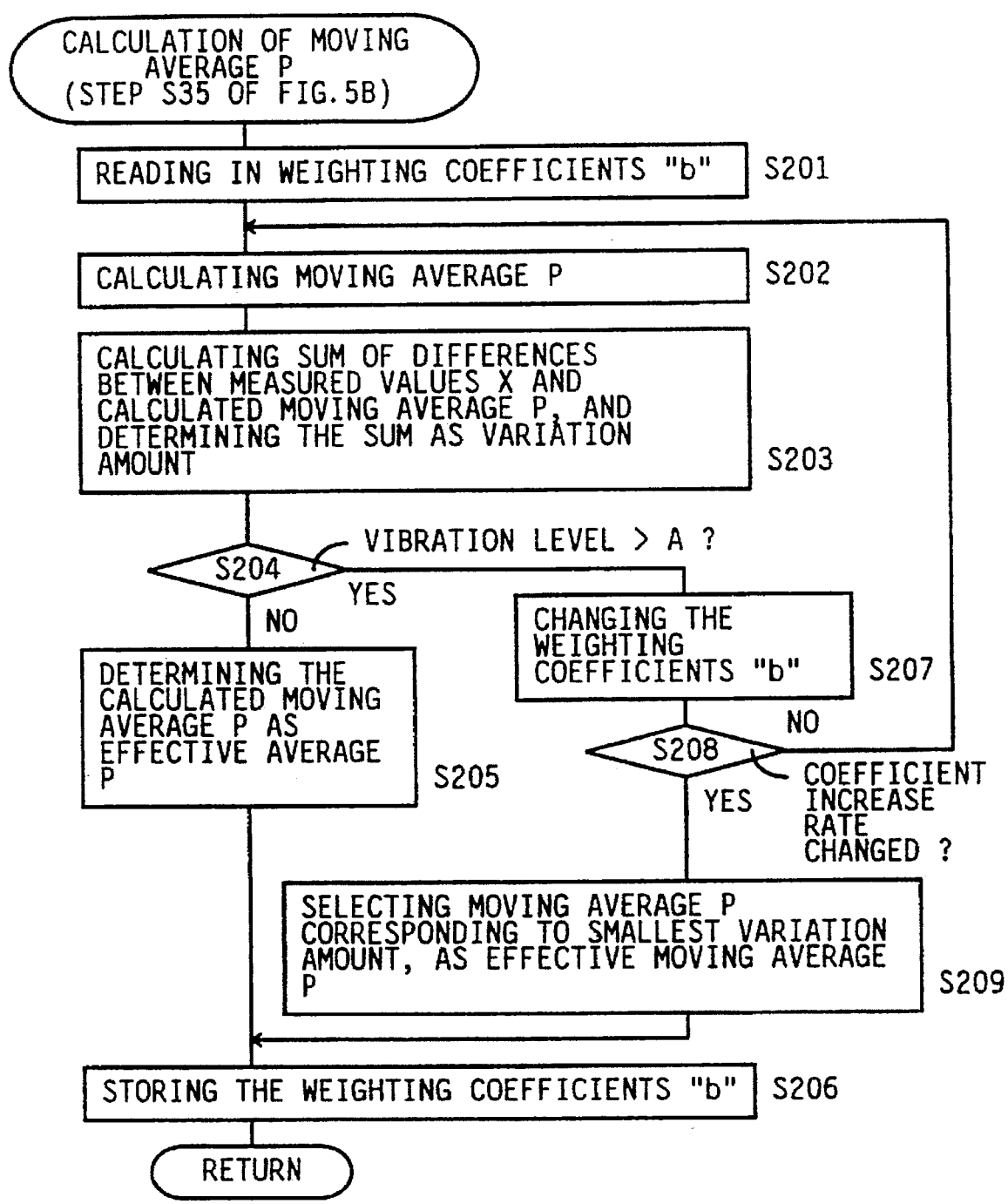
FIG. 32 is a flow chart illustrating the details of step S35 of FIG. 5B.

The moving average P calculated in step S35 of FIG. 5B which has been described by reference to FIG. 32 is stored in the following step S36, in the first calculation data memory of the control device 20 and in the auxiliary memory 22. Step S36 is followed by step S37.

Step S37 is provided to determine whether or not the MOVING AVERAGE ADJUSTMENT command is present for adjusting the calculated moving average P. If this command is not present, the control flow goes to step S39 of FIG. 6A. If the command is present, step S38 is implemented to adjust the moving average P for each of the two end journals 28 of the workpiece as described above with respect to the third step of FIG. 20. The thus adjusted moving average P is stored in the first calculation data memory, and the control goes to step S39 of FIG. 6A.

Step S39 is provided to calculate the error value R which is equal to the moving average P minus the nominal diameter Ao of the journal 28. Step S39 is followed by step S40 in which the calculated error value R is stored in the first calculation data memory and in the auxiliary memory 22.

Step S40 is followed by step S41 to determine whether the calculation of the first derivative T is possible or not, namely, whether the number of the moving average values P stored in the first calculation data memory is equal to "L" or larger. If the number of the stored moving average values P is smaller than "L", a negative decision (NO) is obtained in step S41, and the control flow goes to step S42 to determine whether the SPECIAL DIFFERENTIATION command is present or not. If this command is absent, the control flow returns to step S8, and one cycle of the present routine is terminated. If the command is present, step S43 is implemented to determine whether the calculation of the first derivative T according to the special differentiation method is possible or not, namely, whether two or more moving average values are stored in the first calculation data memory or not. If a negative decision (NO) is obtained in step S43, the control flow returns to step S8. If an affirmative decision (YES) is obtained in step S43, step S44 is implemented to calculate the first derivative T according to the special differentiation method. Step S44 is followed by step S45 to store the calculated first derivative T in the first calculation data memory of the control device 20 and in the auxiliary memory 22. Then, the control flow goes to step S48 of FIG. 6B.

When the number of the stored moving average values P has increased to "L" as a result of repeated execution of the present routine, an affirmative decision (YES) is obtained in step S41, and step S46 is implemented to calculate the first derivative T according to the standard method, using the predetermined number L of the moving average values P. Then, step S47 is implemented to store the calculated first derivative in the calculation data memory and auxiliary memory 22. Step S47 is followed by step S48.

Step S48 is provided to determine whether the SECOND DERIVATIVE USE command which requires the use of the second derivative D to calculate the compensating value U is present or not. If this command is present, an affirmative decision (YES) is obtained in step S48, and step S49 is effected to determine whether the calculation of the second derivative D is possible or not, namely, whether the number of the first derivative values T stored in the first calculation data memory is equal to "Q" or larger. If the number of the stored first derivative values T is smaller than "Q", a negative decision (NO) is obtained in step S49, and the control flow returns to step S8, whereby one cycle of the present routine is terminated. When the number of the stored first derivative values T has increased to the predetermined value "Q" as a result of repeated execution of the present routine, an affirmative decision (YES) is obtained in step S49, and the control flow goes to step S50 to calculate the second derivative D, and S51 to store the calculated second derivative D in the first calculation data memory and auxiliary memory 22. The control then goes to step S55.

If the SECOND DERIVATIVE USE command is not present, a negative decision (NO) is obtained in step S48, and the control flow goes to step S52 to determine whether there is present the DEAD TIME COMPENSATION command which requires the compensating value U to be determined depending upon the dead time value MS which corresponds to the number Y of the pre-measured workpieces existing between the machine 10 and the post-process measuring device 16. If this command is absent, a negative decision (NO) is obtained in step S52, and the control goes directly to step S55. If the command is present, step S53 is implemented to read in the dead time value MS from the workpiece counter 18. Then, step S54 is implemented to store the dead time value MS in the first calculation data memory and auxiliary memory 22.

Figure 6A:
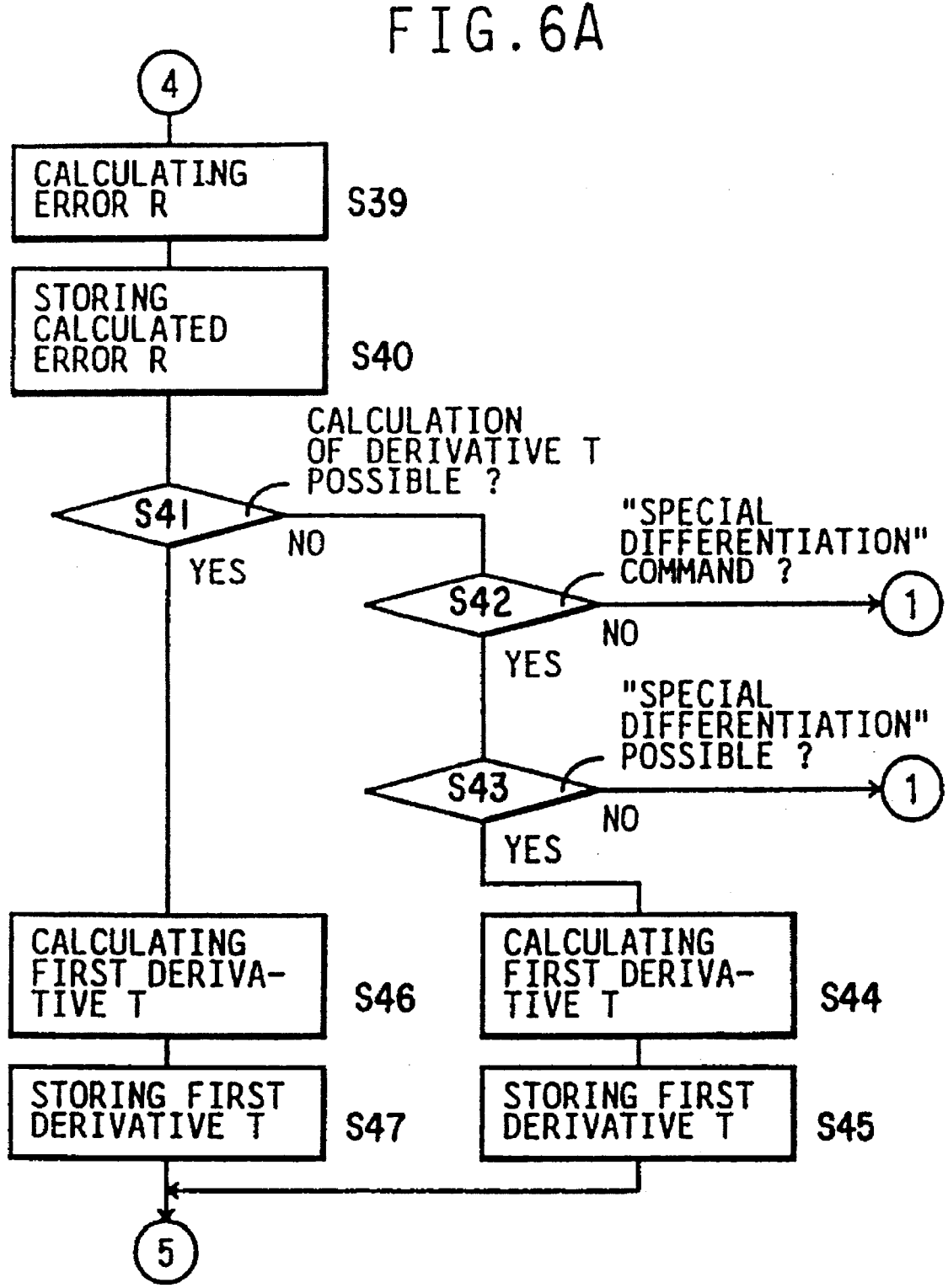
FIGS. 6A, 6B, 7, 8A, 8B, 8C, 9A and 9B are flow charts illustrating other portions of the compensating routine.
Figure 6B:
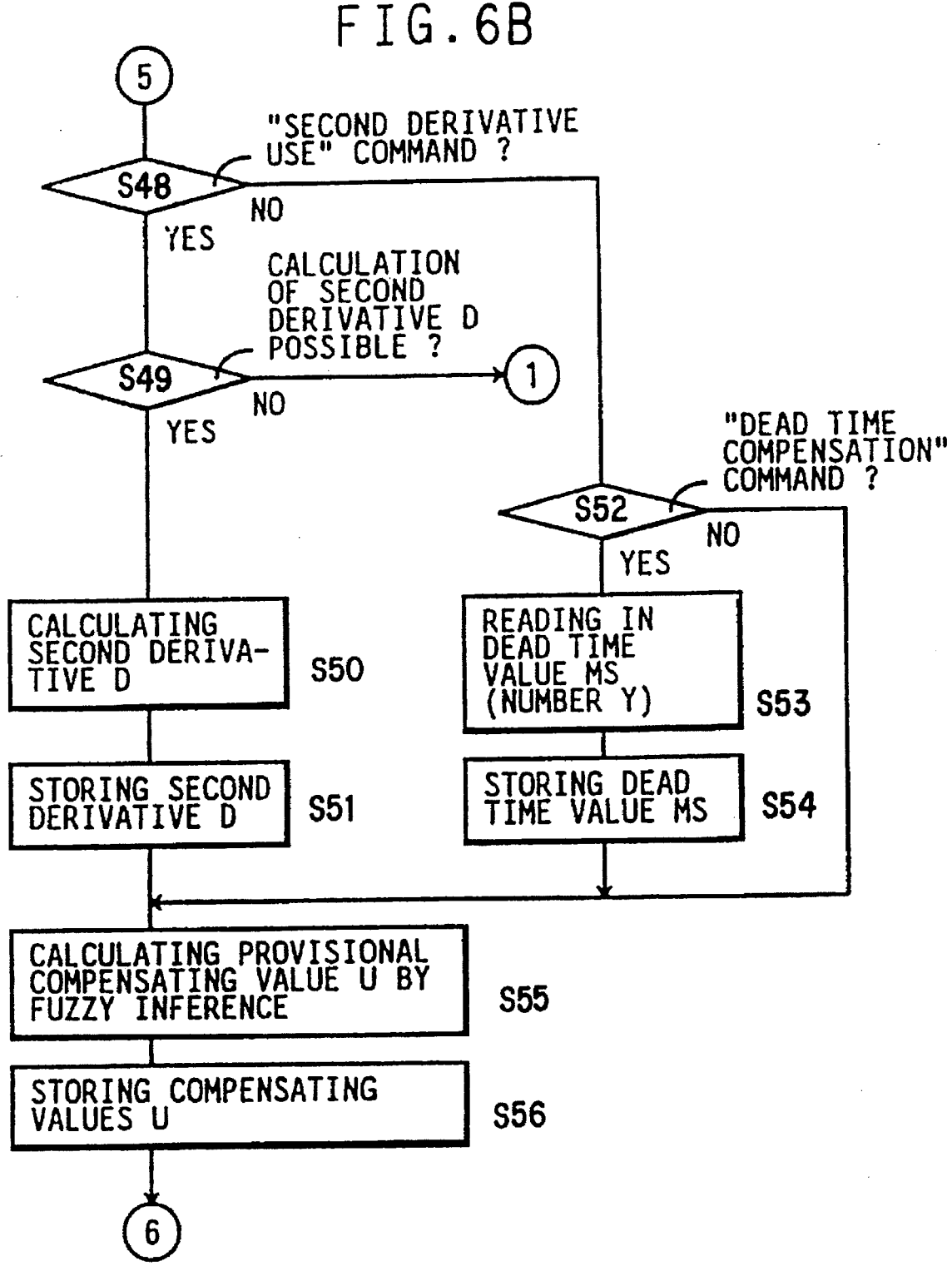
Figure 7:
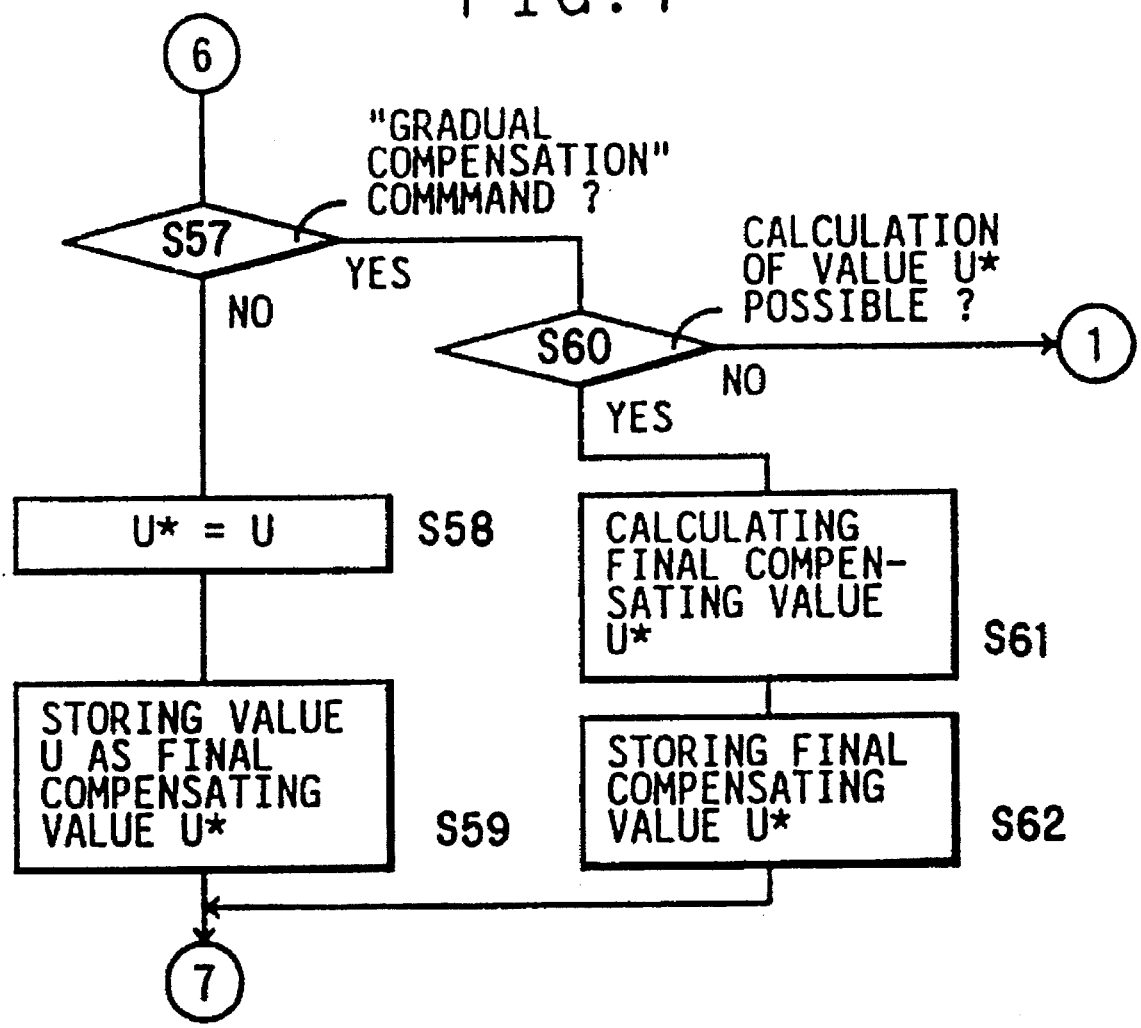
Figure 33:
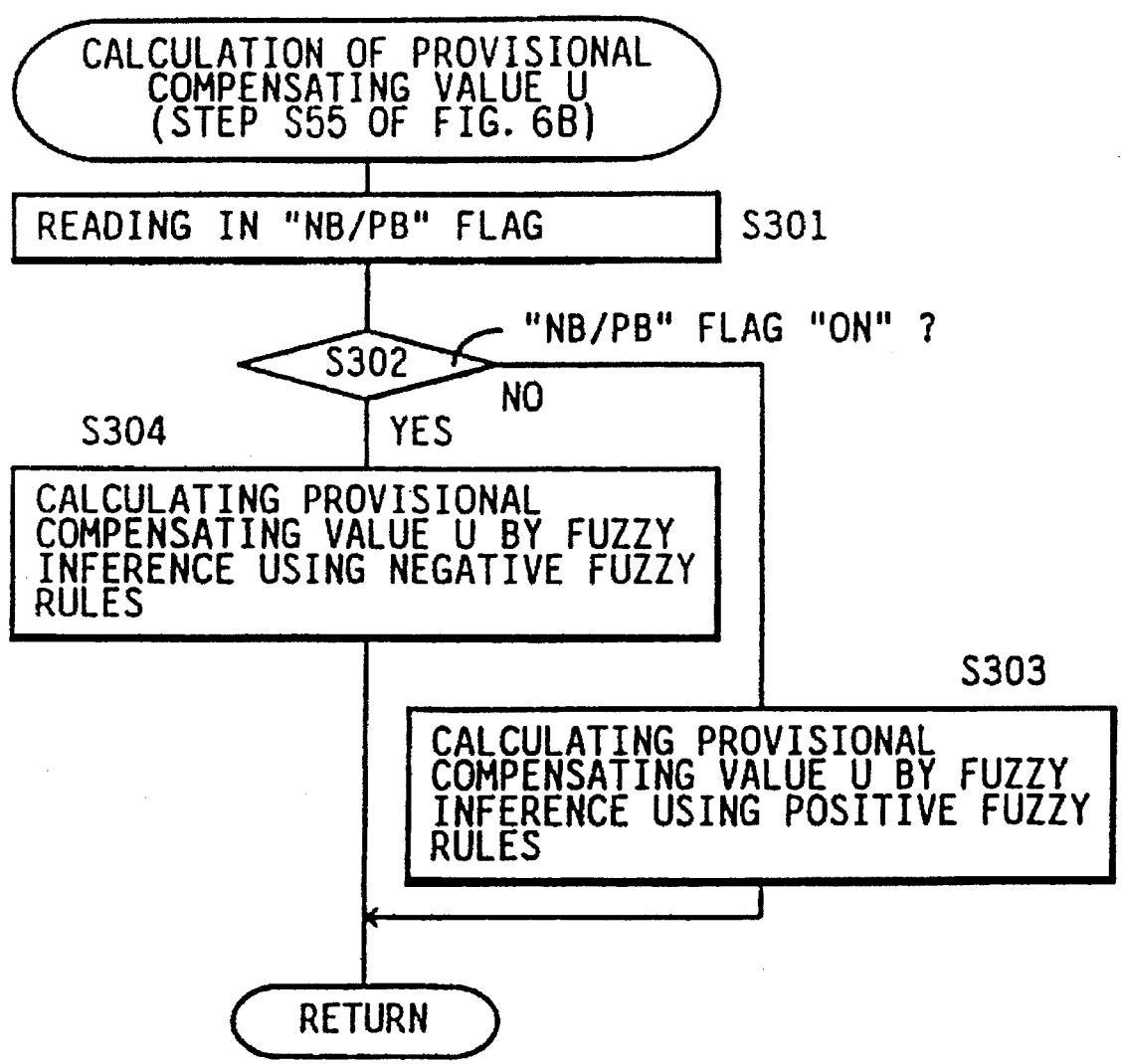
FIG. 33 is a flow chart illustrating the details of step S55 of FIG. 6B.

Referring to the flow chart of FIG. 33, the fuzzy inference operation to calculate the provisional compensating value U in step S55 of FIG. 6B will be described in detail.

Initially, step S301 is implemented to read in an NB/PB flag from the RAM of the control device 20. When this NB/PB flag is set at "OFF", it indicates that the vibration level of the measured values X is sufficiently low. When the NB/PB flag is set at "ON", it indicates that the vibration level is higher than an upper limit. The NB/PB flag is reset to "OFF" when the control device 20 is turned on, and updated in steps S65 and S70 which will be described by reference to the flow chart of FIG. 34. Step S301 is followed by step S302 to determine whether the NB/PB flag is set at "ON" or not. If the flag is currently set at "OFF", a negative decision (NO) is obtained in step S302, and the control flow goes to step S303 to calculate the provisional compensating value U by fuzzy inference using the positive fuzzy rules as indicated in TABLE 9 by way of example. Thus, the operation in step S55 of FIG. 6B is terminated.

If the NB/PB flag is set at "ON", an affirmative decision (YES) is obtained in step S302, and step S304 is executed to calculate the provisional compensating value U by fuzzy inference using the negative fuzzy rules as indicated in TABLE 10 by way of example. Thus, the operation in step S55 is terminated.

In the present embodiment, the fuzzy rules used for the fuzzy inference are changed from the positive fuzzy rules to the negative fuzzy rules immediately after the NB/PB flag is changed from "OFF" to "ON", and from the negative fuzzy rules to the positive fuzzy rules immediately after the NB/PB flag is changed from "ON" to "OFF". However, it is possible to consider the hysteresis of the NB/PB flag, in determining the timing at which the positive and negative fuzzy rules are interchanged. Four instance, the control device 20 is adapted to inhibit the use of the negative fuzzy rules even when the NB/PB flag has been changed from "OFF" to "ON", and allow the use of the negative fuzzy rules only after the number of cycles in which the NB/PB flag is set at "ON" has reached a predetermined value. This arrangement is effective to avoid unstable determination of the provisional compensating value U due to frequent interchange between the positive and negative fuzzy rules and consequent hunting of the measured values X.

Step S55 is followed by step S56 to store the calculated provisional compensating value U in the first calculation data memory and auxiliary memory 22. Step S56 is followed by step S57 of FIG. 7.

Step S57 is provided to determine whether the GRADUAL COMPENSATION command which requires the calculated provisional compensating value U to be adjusted into the final compensating value U* is present or not. If this command is not present, a negative decision (NO) is obtained in step S57, and step S58 is implemented to determine the provisional compensating value U as the final compensating value U*. Then, step S59 is implemented to store the final compensating value U* in the auxiliary memory 22. If the GRADUAL COMPENSATION command is present, an affirmative decision (YES) is obtained in step S57, and step S60 is implemented to determine whether the calculation of the final compensating value U* is possible or not, namely, whether the number of the provisional compensating values U stored in the first calculation data memory is equal to "M" or larger. If a negative decision (NO) is obtained in step S60, the control flow returns to step S8, and one cycle of the present routine is terminated. When the number of the stored provisional compensating values U has reached the predetermined value "M" as a result of repeated execution of the present routine, an affirmative decision (YES) is obtained in step S60, whereby step S61 is implemented to calculate the final compensating value U* on the basis of the predetermined number M of the stored provisional compensating value U. Step S61 is followed by step S62 to store the calculated final compensating value U* in the first calculation data memory and auxiliary memory 22.

Figure 8A:
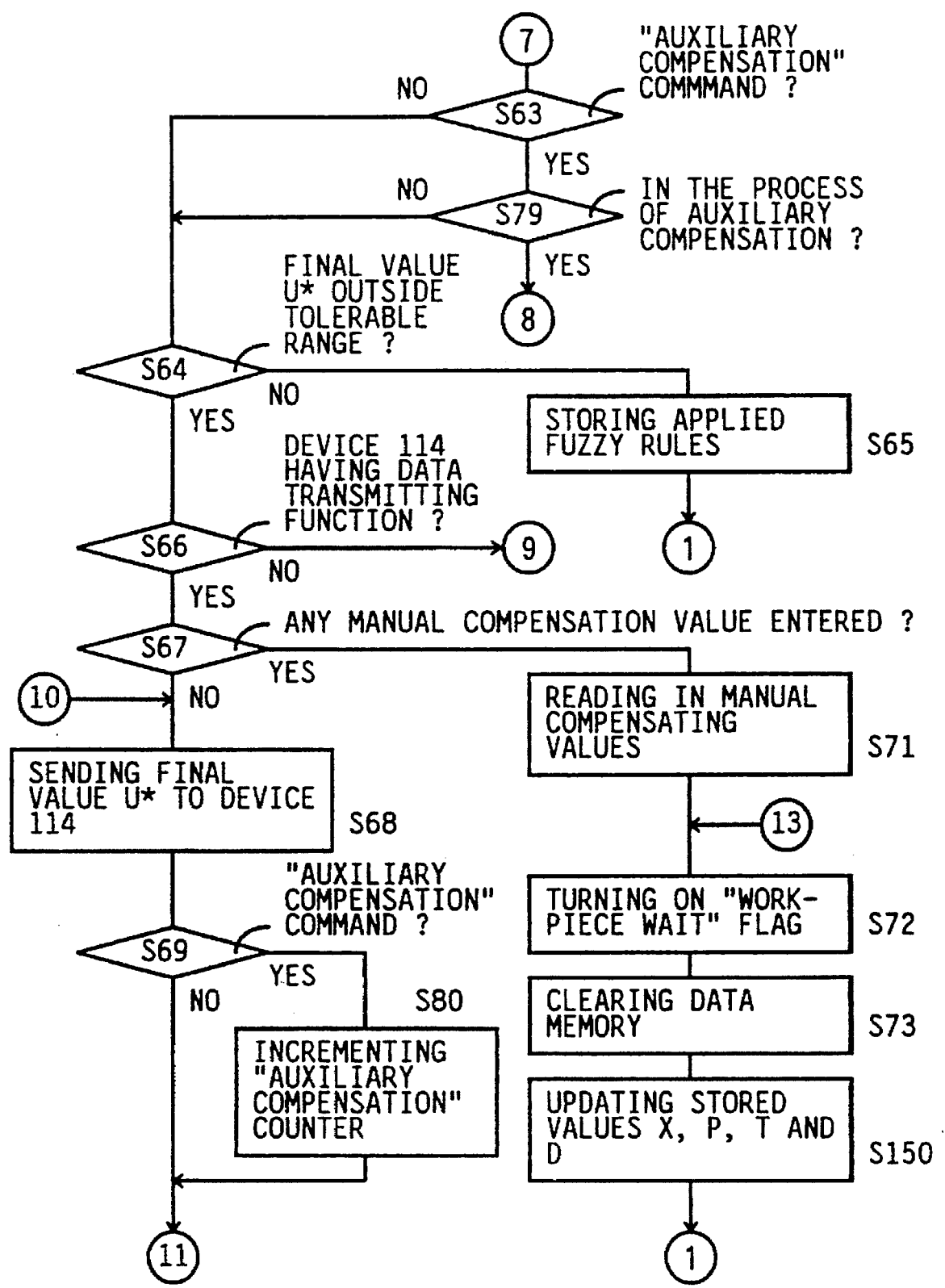

Steps S59 and S62 are followed by step S63 of FIG. 8A to determine whether there is present the AUXILIARY COMPENSATION command which requires the auxiliary compensation in addition to the primary compensation, as illustrated in FIG. 26 by way of example. If this command is absent, a negative decision (NO) is obtained in step S63, and the control flow goes to step S64 to determine whether the final compensating value U* stored in step S59 or S62 should be transmitted to the automatic sizing device 14 or not, namely, whether the final compensating value U* is outside the tolerable range or not. If the value U* falls within the tolerable range, a negative decision (NO) is obtained in step S64, and step S65 is implemented to store in the auxiliary memory 22 data representative of the fuzzy rule which was applied in step S55 of FIG. 6B to calculate the provisional compensating value U. Then, the control returns to step S8, and one cycle of the present routine is terminated.

If the final compensating value U* is outside the tolerance range, an affirmative decision (YES) is obtained in step S64, and step S66 is implemented to determine whether the automatic sizing device 14 has the function of transmitting the manual compensation data to the control device 20 or not. If the device 14 has the function, an affirmative decision (YES) is obtained in step S66, and the control flow goes to step S67 to determine whether any manual compensating value or values to adjust the reference value or values (for one or both of the two end journals 28) has/have been entered through the keyboard 50 or not. If no manual compensating value has been manually entered into the sizing device 14, a negative decision (NO) is obtained in step S67, and step S68 is implemented to transmit the final compensating value U* to the sizing device 14. The value U* remains stored in the auxiliary memory 22. Then, the control flow goes to step S69 to determine whether the AUXILIARY COMPENSATION command is present or not. Since the negative decision (NO) is obtained in step S63, the negative decision is also obtained in this step S69, whereby step S70 of FIG. 8C is implemented to store the applied fuzzy rule in the auxiliary memory 22, as in step S65.

Referring to the flow chart of FIG. 34, the operation to be performed in steps S65 of FIG. 8A and 70 of FIG. 8C will be described in detail.

Initially, step S401 is executed to read in the current count of the NB/PB counter which is adapted to count the number of application of the NB/PB fuzzy rules. Step S401 is followed by step S402 to determine whether the fuzzy rule applied in step S55 of FIG. 6B is any one of NB/PB fuzzy rules which are defined above with respect to the fifth step of FIG. 10. If the fuzzy rule applied in step S55 is not any NB/PB fuzzy rule, a negative decision (NO) is obtained in step S402, and the control goes to step S404, skipping step S403. If the fuzzy rule applied in step S55 is any one of the NB/PB fuzzy rules, an affirmative decision (YES) is obtained in step S402, and step. S403 is implemented to increment the NB/PB counter. Step S403 is followed by step S404. This step S404 is provided to read in the count of the CYCLE counter adapted to count the number of cycles of the present routine of FIG. 34. Step S404 is followed by step S405 to increment the CYCLE counter. Then, the control flow goes to step S406 to determine whether the current count of the CYCLE counter is larger than a predetermined threshold value "B" or not. If not, a negative decision (NO) is obtained in step S406, and the control flow goes to step S407 to store the current counts of the NB/PB and CYCLE counters in the RAM of the control device, and then to step S408 to store the applied fuzzy rule in the auxiliary memory 22.

Figure 34:
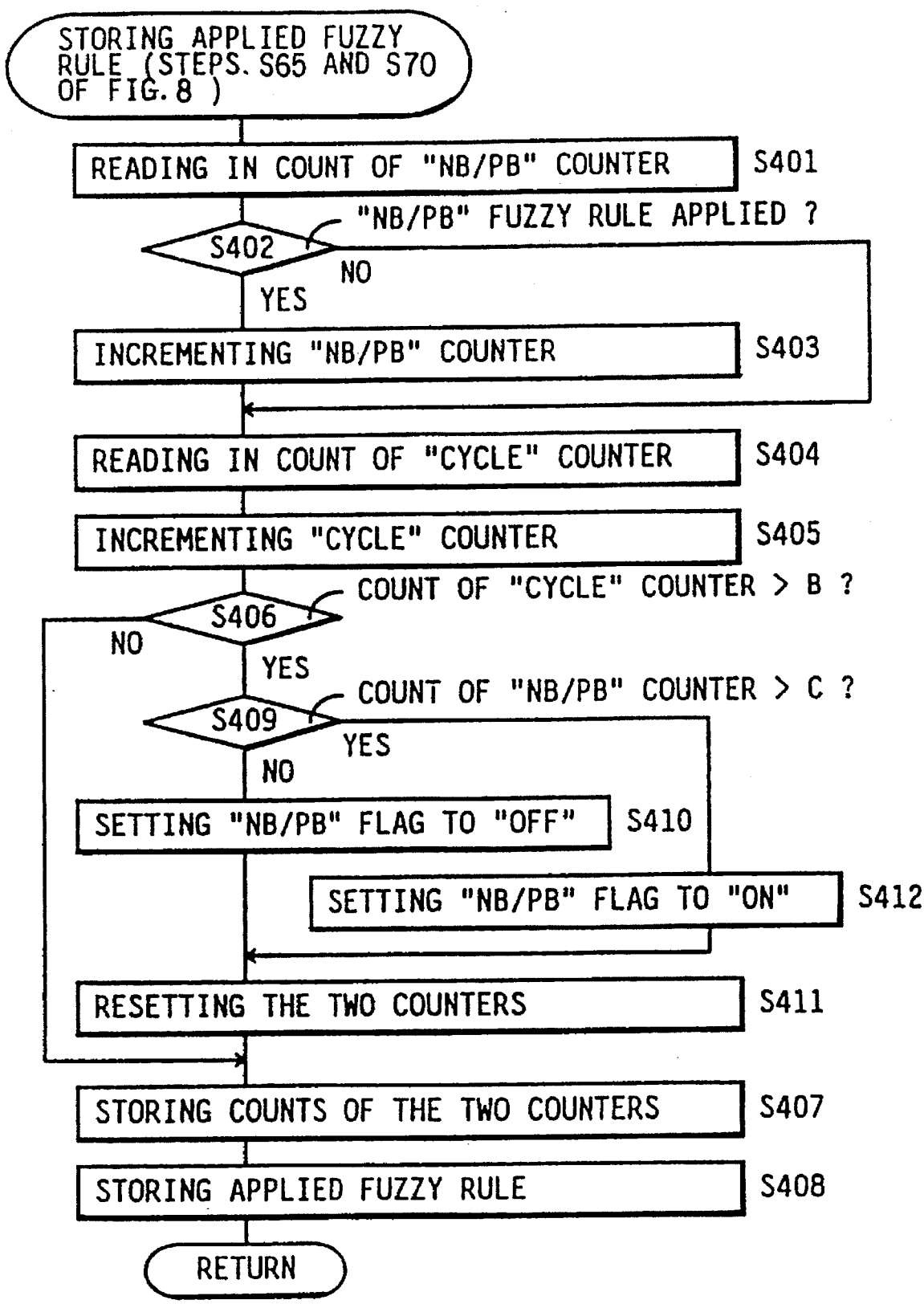
FIG. 34 is a flow chart illustrating the details of step S65 of FIG. 8A and step S70 of FIG. 8C.

When the count of the CYCLE counter has increased to the predetermined threshold value "B" as a result of repeated execution of the routine of FIG. 34, an affirmative decision (YES) is obtained in step S406, and the control goes to step S409 to determine whether the current count of the NB/PB counter is larger than a predetermined threshold value "C" or not. If the count is not larger than "C" a negative decision (NO) is obtained in step S409, and step S410 is implemented to set the NB/PB flag to "OFF" (change the flag from "ON" to "OFF" or maintain the flag at "OFF"). Step S410 is followed by step S411 to reset the NB/PB and CYCLE counters to "0". Then, the control goes to steps S407 and S408. If the count of the NB/PB counter exceeds "C", an affirmative decision (YES) is obtained in step S409, and step S412 is implemented to set the NB/PB flag to "ON" (change the flag from "OFF" to "ON" or maintain the flag at "ON"). Step S412 is followed by steps S411 and the subsequent steps.

If any manual compensating values have been entered into the sizing device 14, an affirmative decision (YES) is obtained in step S67 of FIG. 8A, and the control flow goes to step S71 to receive the currently effective manual compensating values and the corresponding reference values from the sizing device 14, and store these data. Then, steps S72 and S73 are implemented to turn the WORKPIECE WAIT flag to "ON", and clear only the first calculation data memory. The control then returns to step S150.

Step S150 is identical with step S140. These steps are implemented according to a routine illustrated in the flow chart of FIG. 31. This routine is initiated with step S501 to determine whether the measured values X are stored in the second calculation data memory for the second intermittent compensation mode. If an affirmative decision (YES) is obtained in step S501, the control flow goes to step S502 to determine whether the X-SHIFT command is present. If a negative decision (NO) is obtained in step S502, the control flow returns to step S8.

Figure 8B:
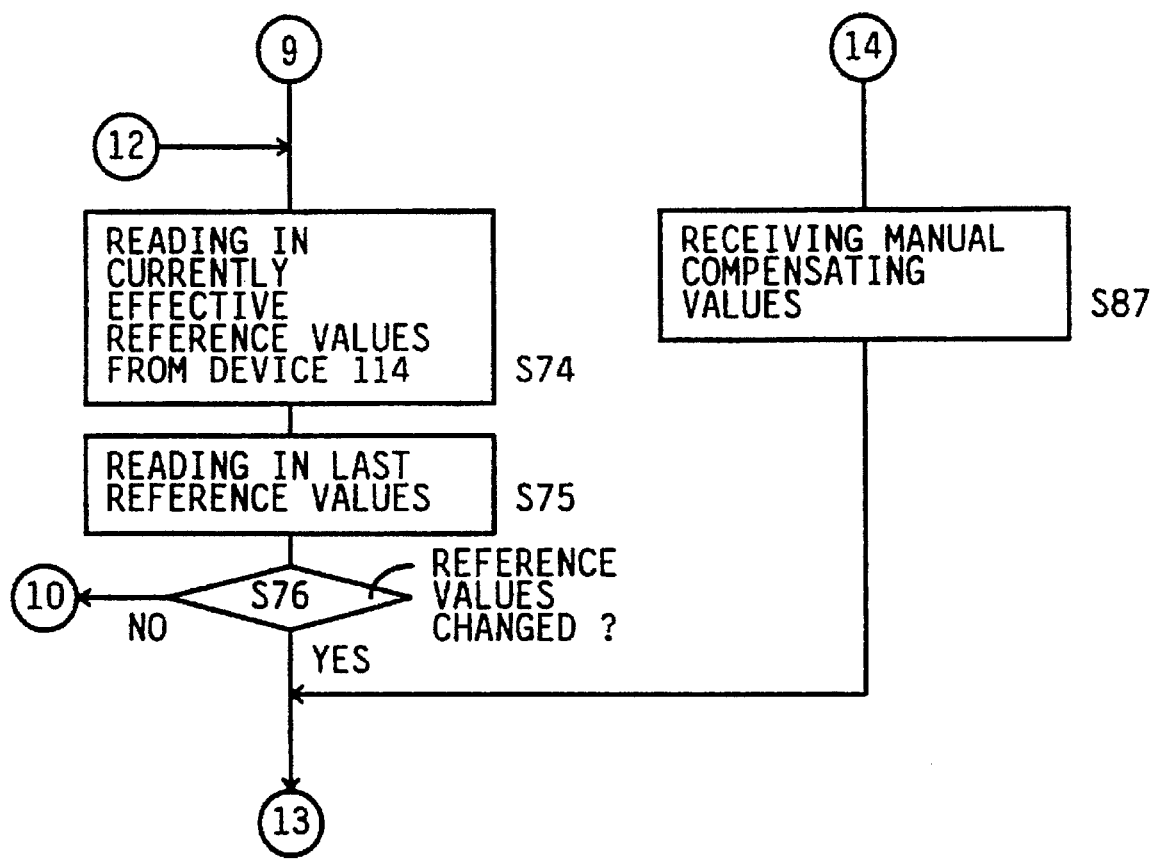
Figure 8C:
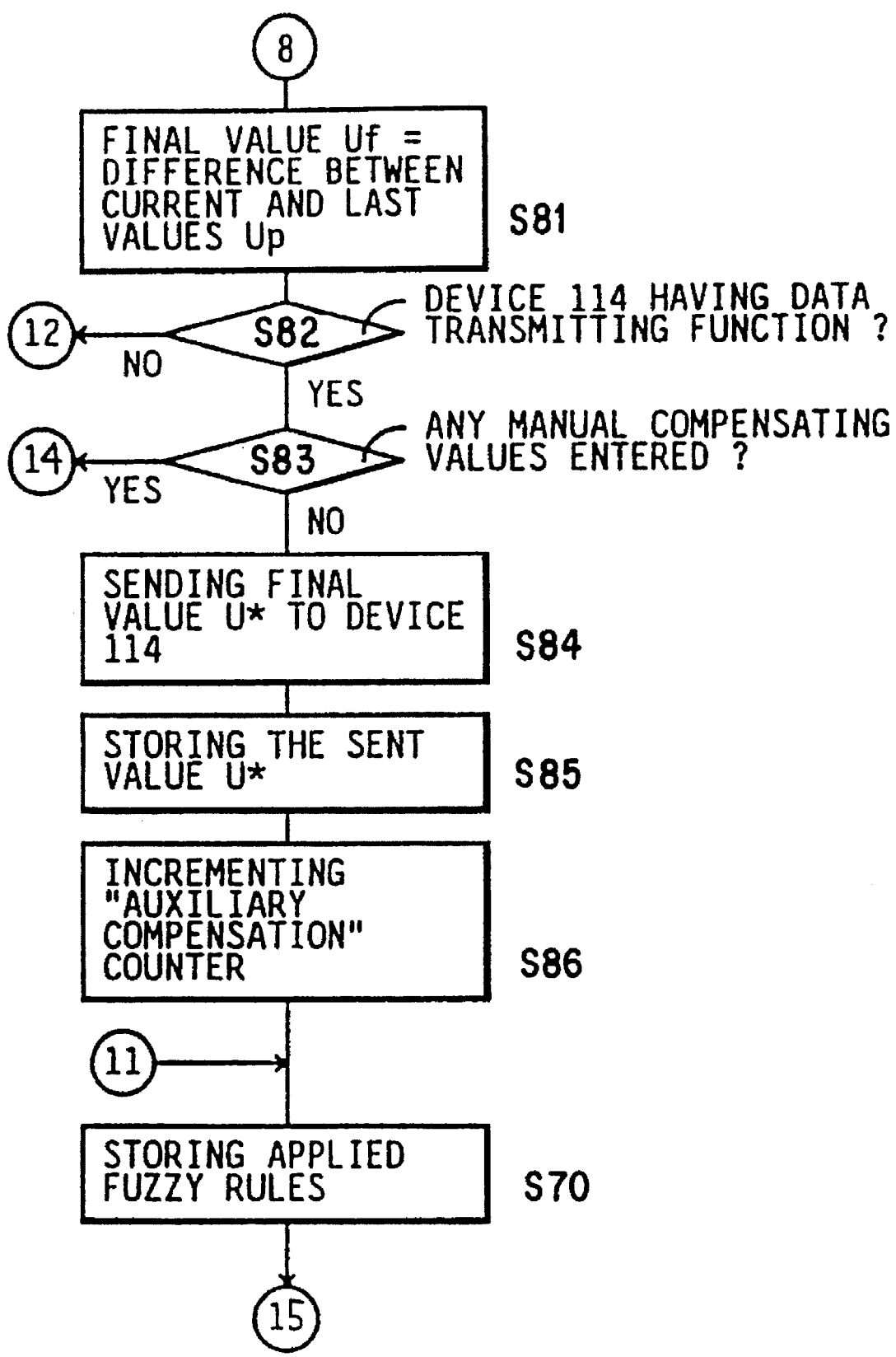

If the sizing device 14 does not have the function of transmitting the manual compensation data to the control device 20, a negative decision (NO) is obtained in step S66, and step S74 of FIG. 8B is implemented to read in the currently effective reference values set in the sizing device 14, and store these reference values in the RAM of the control device 20 and in the auxiliary memory 22. Step S74 is followed by step S75 to read in from the RAM the last reference values. Then, step S76 is implemented to determine whether the effective reference values have been changed in the sizing device 14 which does not have the data transmitting function. If a negative decision (NO) is obtained in step S76, the step S68 described above is effected. If an affirmative decision (YES) is obtained in step S76, the control flow goes to step S72 to turn "ON" the WORKPIECE WAIT flag, and to step S73 to clear the first calculation data memory. Then, the control returns to step S8.

If the AUXILIARY COMPENSATION command is present, an affirmative decision (YES) is obtained in step S63 of FIG. 8A, and step S79 is executed to determine whether the auxiliary compensation is in progress, namely, whether the current count of an AUXILIARY COMPEN-SATION counter to count the number of the auxiliary compensation cycles is equal to "1" or larger. If the count of this counter is currently "0", a negative decision (NO) is obtained in step S79, the control flow goes to step S64 and the following steps, which include step S68 to perform the primary compensation as described above, and step S69 determine whether the AUXILIARY COMPENSATION command is present. Since this command is present, the AUXILIARY COMPENSATION counter is incremented in step S80 following step S69.

If the count of the AUXILIARY COMPENSATION counter is "1" or more, an affirmative decision (YES) is obtained in step S79, the control flow goes to step S81 and the following steps of FIG. 8C to effect the auxiliary compensation. In step S81, a difference between the present and last final compensating values U* is obtained as an automatic compensating value to be transmitted to the sizing device 14. That is, the present and last final compensating values U* correspond to the present and last provisional compensating values Up described above with respect to the auxiliary compensation in the first intermittent compensation mode. Further, the automatic compensating value to be transmitted to the sizing device 14 corresponds to the final compensating value Uf described above in connection with the provisional value Up. Step S81 is followed by step S82 to determine whether the sizing device 114 has the function of transmitting the manual compensation data to the control device 20 or not. If the device 14 has the function, an affirmative decision (YES) is obtained in step S82, step S83 is implemented to determine whether any manual compensating values have been entered in the sizing device 14 or not. If a negative decision (NO) is obtained in step S83, step S84 is implemented to transmit the automatic compensating value Uf obtained in step S81 to the sizing device 14. Step S84 is followed by step S85 to store in the auxiliary memory 22 the compensating value Uf transmitted to the sizing device 14. Then, step S86 is effected to increment the AUXILIARY COMPENSATION counter. Step S86 is followed by step S70 described above. If any manual compensating values have been entered, an affirmative decision (YES) is obtained in step S83, the control flow goes to step S87 of FIG. 8B to receive the manual compensating values from the sizing device 14, and to step S72 to turn "ON" the WORKPIECE WAIT flag. Then, step S73 is effected to clear the first calculation data memory. Step S73 is followed by step S150 described above. The control then returns to step S8.

If the sizing device 14 does not have the function of transmitting the manual compensating data to the control device 20, a negative decision is obtained in step S82, step S74 and the following steps of FIG. 8B are executed to transmit the automatic compensating values Uf to the sizing device 14 if the negative decision (NO) is obtained in step S76. In this case, the affirmative decision (YES) is obtained in step S69, and the AUXILIARY COMPENSATION counter is incremented in step S80.

Step S70 is followed by step S90 of FIG. 9A to determine whether the AUXILIARY COMPENSATION command is present or not. If a negative decision (NO) is obtained in step S90, steps S91 and S92 are implemented to turn "ON" the WORKPIECE WAIT flag, and clear the first and second calculation data memories. Step S92 is followed by step S93 to determine whether the X-SHIFT command is present or not. If this command is absent, the control returns to step S8.

If the AUXILIARY COMPENSATION command is present, an affirmative decision (YES) is obtained in step S90, the control flow goes to step S94 of FIG. 9B to determine whether the auxiliary compensation cycles should be terminated or not, namely, whether the count of the AUXILIARY COMPENSATION counter has become equal to the predetermined maximum number "S" (which was read in from the auxiliary memory 22 in step S1 of FIG. 4A). If the count is smaller than "S", the control returns to step S8.

When the count of the AUXILIARY COMPENSATION counter has become equal to "S" as a result of repeated execution of the present routine, an affirmative decision (YES) is obtained in step S94, and the control flow goes to step S95 to calculate a sum of at least the compensating values Uf of repeated auxiliary compensation cycles which follow the primary compensation. Step S95 is followed by step S96 to determine whether the auxiliary compensation cycling should be continued or not, namely, whether the sum obtained in step S95 is substantially "0" or not. If the sum is not substantially "0", a negative decision (NO) is obtained in step S96, and steps S97 and S98 are implemented to turn "ON" the WORKPIECE WAIT flag, and clear the first and second calculation data memories. Step S98 is followed by step S99 to determine whether the X-SHIFT command is present or not. If a negative decision (NO) is obtained in step S99, the control returns to step S8.

If the sum obtained in step S95 is substantially "0", an affirmative decision (YES) is obtained in step S96, and the control flow goes to step S100 to determine whether the TOLERABLE RANGE command is present or not. If the TOLERABLE RANGE command is not present, but the AUXILIARY COMPENSATION CYCLE command is present, a negative decision (NO) is obtained in step S100, and step S101 is implemented to set the AUXILIARY COMPENSATION counter to "1". Then, the control returns to step S8. In this case, therefore, the affirmative decision (YES) is obtained in step S79 of FIG. 8A in the next execution cycle of the present routine, and the control flow goes to step S81 and the following steps of FIG. 84C.

If the TOLERABLE RANGE command is present, an affirmative decision (YES) is obtained in step S100 of FIG. 9B, and step S102 is implemented to set the AUXILIARY COMPENSATION counter to "0". Then, the control returns to step S8. In this case, the negative decision (NO) is obtained in step S79 in the next execution cycle of the present routine, and the control flow goes to step S64 and the following steps of FIG. 8A.

Figure 4B:
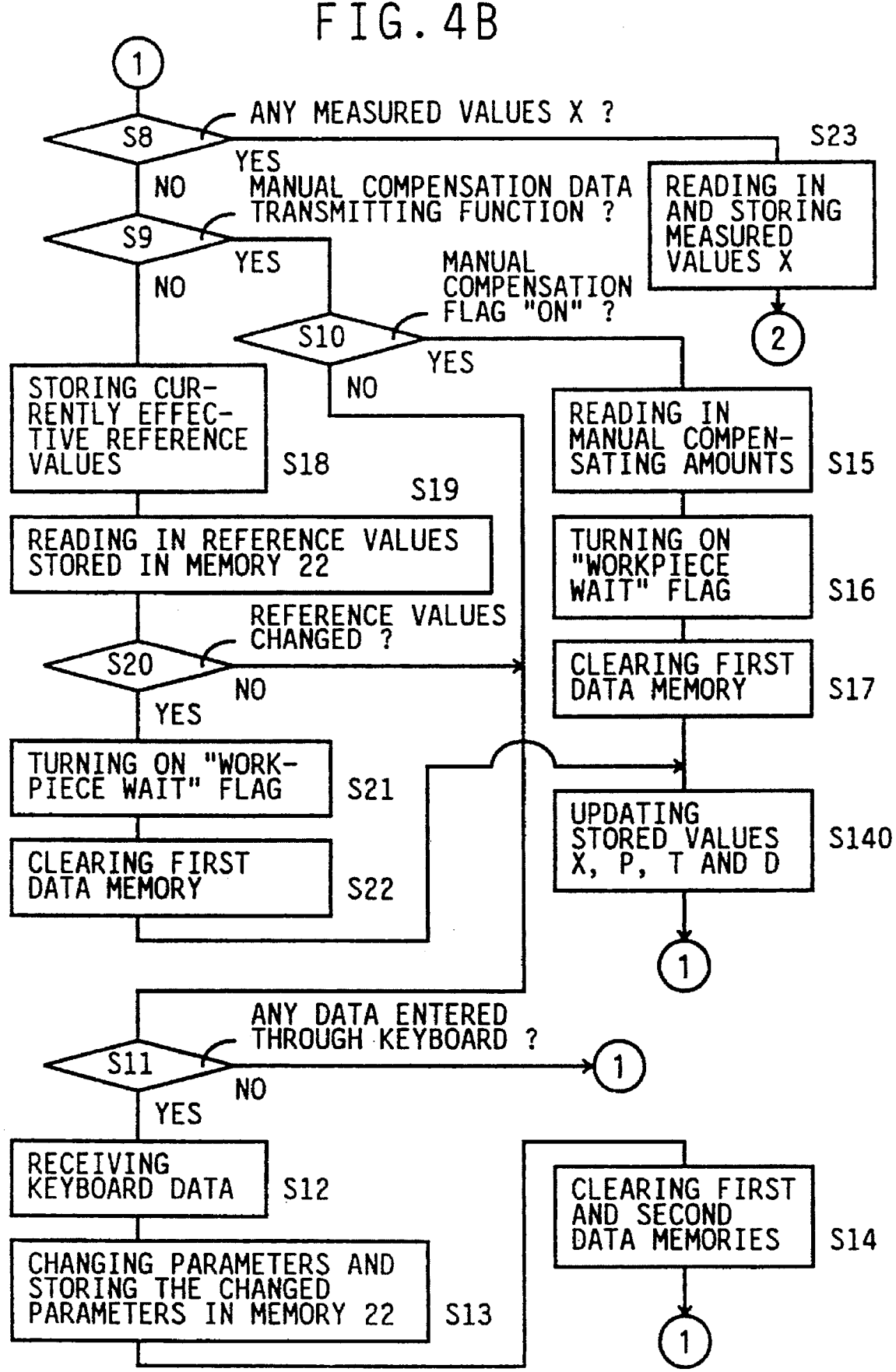
Figure 5A:
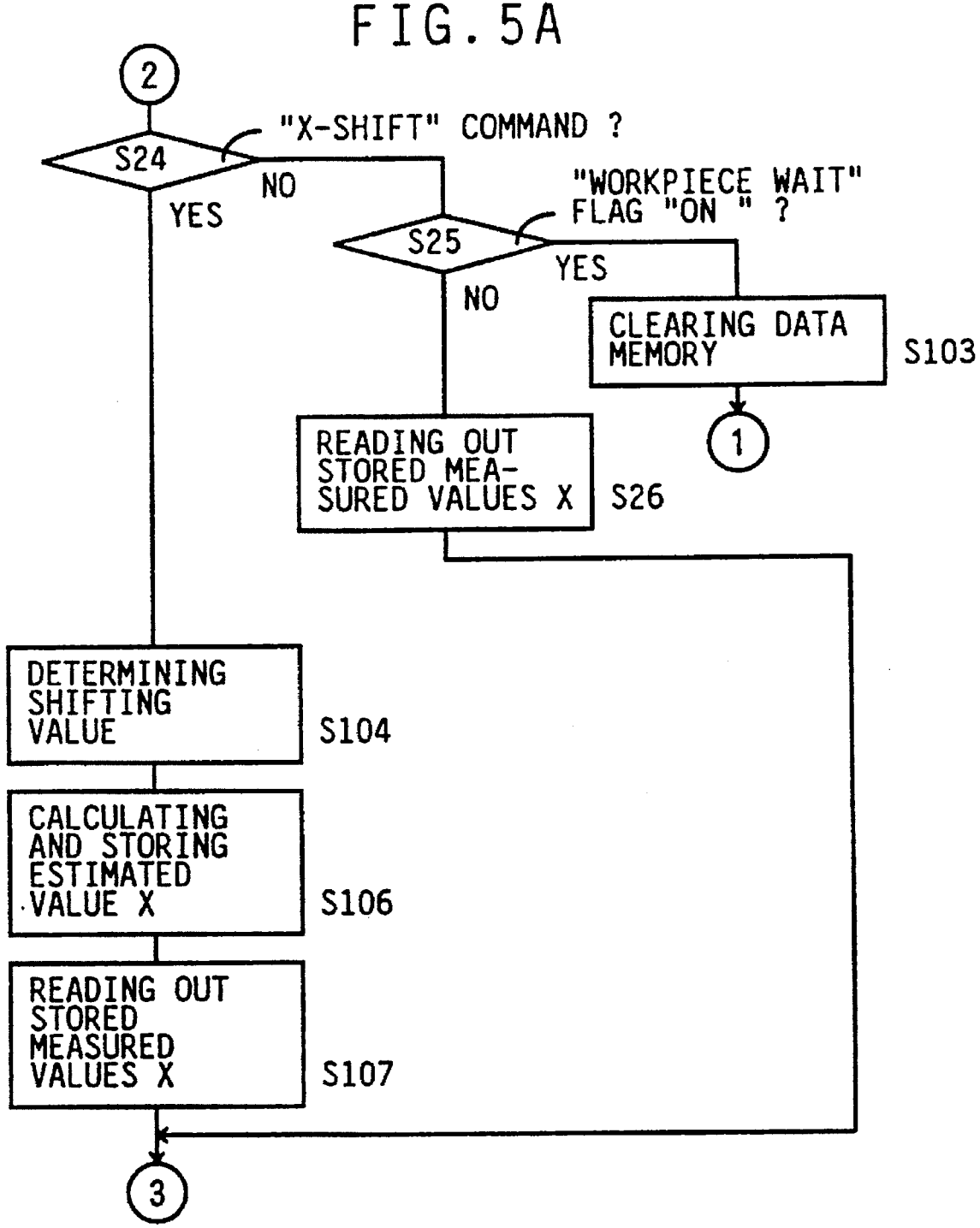
FIGS. 5A and 5B are flow charts illustrating another portion of the compensating routine.
Figure 5B:
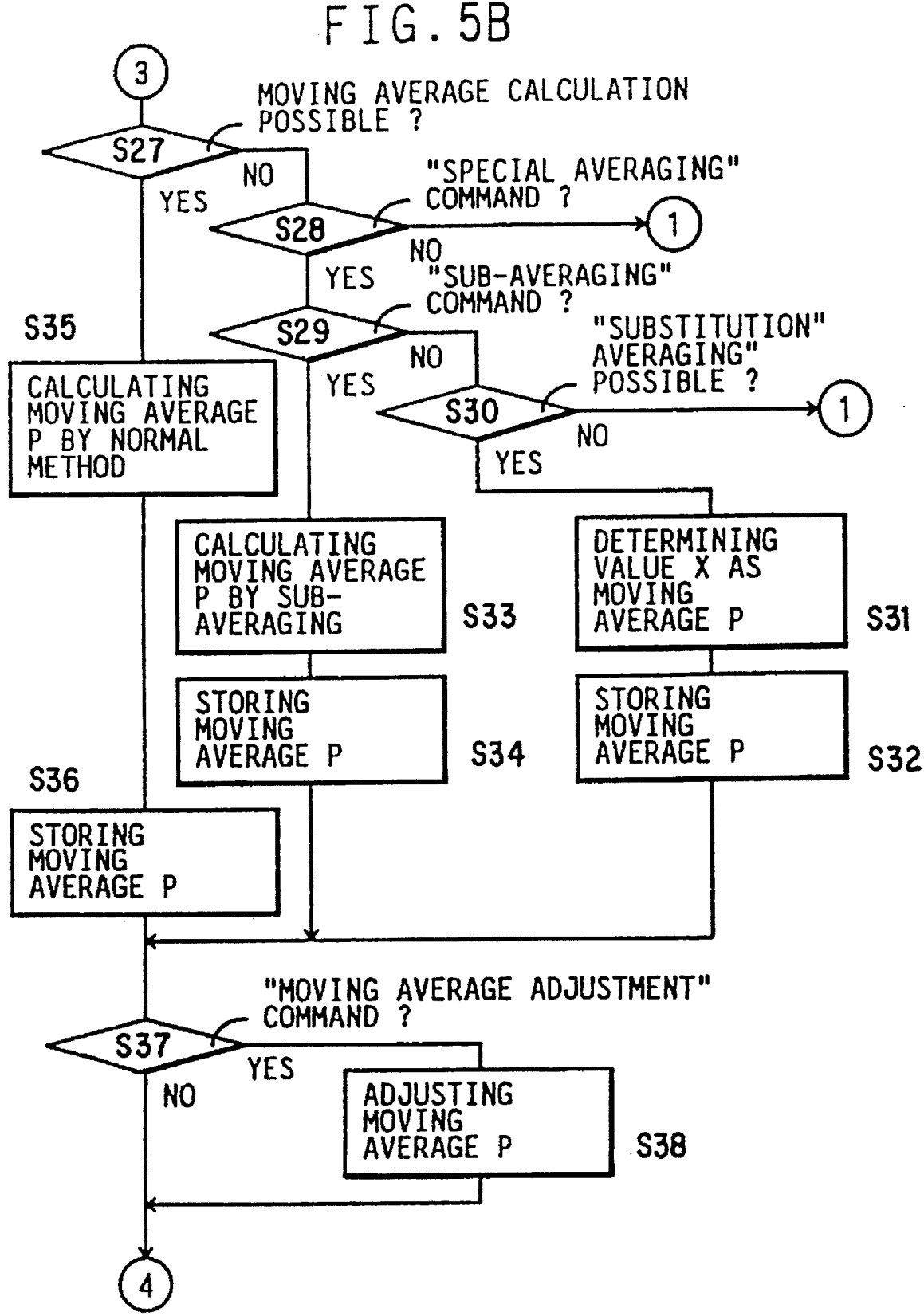

If step S25 of FIG. 5A is implemented when the WORKPIECE WAIT flag is set at "ON", the affirmative decision (YES) is obtained in this step S25, whereby the control flow goes to step S103 to clear the first calculation data memory, and returns to step S8. Consequently, the measured values X stored in the calculation data memory in step S23 of FIG. 4B are erased, for example. Therefore the values X and the other values measured or calculated immediately after the adjustment of the reference values by the manual or automatic compensation values are not stored until the WORKPIECE WAIT flag is set to "OFF", that is, until the first workpiece influenced by the manual or automatic compensating values has been measured by the measuring device 16. In other words, the measured values X, calculated moving average values P and other calculated values begin to be stored when the negative decision (NO) is obtained in step S25 with the WORKPIECE WAIT flag set to "OFF".

While the above description refers to the operation of the present embodiment when the X-SHIFT command is absent, there will be described an operation when the X-SHIFT command is present.

In the presence of the X-SHIFT command for placing the control device in the second intermittent compensating mode, an affirmative decision (YES), is obtained in step S24 of FIG. 5A, whereby the control flow goes to step S104. This step S104 will be described in detail by reference to the flow chart of FIG. 30.

The routine of FIG. 30 is initiated with step S601 to determine whether an influence of the last compensating value (automatic or manual) has appeared on the actually measured diameter value X. If a negative decision (NO) is obtained in step S601, the control flow goes to step S602 to determine whether the last compensating value is a manual compensating value U' manually entered through the keyboard 50. If the currently effective compensating value is the last automatic compensating value Ui−1, a negative decision (NO) is obtained in step S602, whereby step S603 is implemented to determine the last automatic compensating value Ui−1 as the present shifting value (by which the actually measured value X is changed or shifted as described above). Thus, one cycle of execution of the routine of FIG. 30 is terminated.

If the currently effective compensating value is a manual compensating value U', an affirmative decision (YES) is obtained in step S602, and the control flow goes to step S605 to determine whether an influence of the last automatic compensating value Ui−1 has appeared on the actually measured diameter value X. If a negative decision (NO) is obtained in step S605, the control flow goes to step S606 to determine the sum of the last automatic and manual compensating values Ui−1 and U' as the present shifting value.

If an affirmative decision (YES) is obtained in step S605, then step S607 is implemented to determine the last manual compensating value U' as the present shifting value.

If the influence of the last compensating value has appeared on the actually measured diameter value X, an affirmative decision (YES) is obtained in step S601, and step S604 is implemented to zero the present shifting value.

The determination in steps S601 and S605 is effected to determine the first workpiece which was ground under the condition influenced by the last manual or automatic compensating value U' or Ui−1 and which has been measured by the post-process measuring device 16. This determination is made by comparing the number of the workpieces measured by the device 16 after the last compensating value U' or Ui−1 is received by the automatic sizing device 14, with the number Y of the pre-measured workpieces which exist between the grinding machine 10 and the device 16 when the compensating value is received by the device 14. The number Y of the pre-measured workpieces, which corresponds to the dead time value MS, is stored in the RAM of the control device 20 as described below with respect to step S108 of FIG. 9A. This number Y is decremented each time one ground workpiece is measured by the device 16. When the number Y is zeroed, the affirmative decision (YES) is obtained in steps S601 and S605.

Step S104 of FIG. 5A is followed by step S106 to calculate the estimated value X by adding the determined shifting value to the actually measured value X and store the estimated value X in the second calculation data memory and in the auxiliary memory 22. Step S106 is followed by step S107 to read out the measured values X already stored in the second calculation data memory. Then, the control flow goes to step S27 and the following steps of FIG. 5B for calculating a moving average P of the measured values X (estimated values X).

When the X-SHIFT command is subsequently detected to be present in step S93 of FIG. 9A, the control flow goes to step S108 to read out from the workpiece counter 18 the dead time value MS (corresponding to the number Y of the pre-measured workpieces), and the number Y is set in the decrement counter in the RAM of the control device 20, so that the number Y is used in the next cycle of execution of the routine. The number Y is also stored in the auxiliary memory 22 (FIG. 2). The control then returns to step S8.

Similarly, an affirmative decision (YES) is obtained in step S99 of FIG. 9B, and the control flow goes to step S109 to read in the dead time value MS (number Y). The number Y is set in the decrement counter of the RAM and stored in the memory 22.

Thus, the number Y of the pre-measured workpieces is set when the intermittent compensation for automatic adjustment is terminated. Further, the number Y is also set when the manual compensation is terminated, though the manner to set the number Y is not illustrated in the flow charts. For the initial execution of the present routine, a predetermined value is stored in the ROM of the control device, as an initial number of the pre-measured workpieces to be used in the first cycle of execution of the present routine.

There will be described an operation when a manual compensating value U' is entered after the X-SHIFT command is generated. In this case, an affirmative decision (YES) is obtained in step S10 of FIG. 4B or in step S67 of FIG. 8A, and the control flow goes to step S140 or S150, namely, to step S501 of FIG. 31 to determine whether the diameter values X are stored in the second calculation data memory for the second intermittent compensation mode. If an affirmative decision (YES) is obtained in step S501, step S502 is implemented to determine whether the X-SHIFT command is present. Since an affirmative decision (YES) is obtained in step S502, the control flow goes to step S503.

In step S503, the present shifting value by which the already stored values X (which have been once shifted as the estimated values X) are changed or shifted is updated. That is, if the manual compensating value is entered before an influence of the last automatic compensating value Ui–1 has appeared on the actually measured value X, as indicated in FIG. 29A, the present shifting value is changed by adding thereto the manual compensating value U'. Similarly, the present shifting value is changed by adding thereto the manual compensating value U' if the manual compensating value is entered after the influence of the last automatic compensating value Ui–1 has appeared on the actually measured value X, as indicated in FIG. 29B.

Then, step S504 is implemented to read out the stored measured values X from the second calculation data memory, change the read-out values X by adding the updated shifting value thereto, and store the thus changed values X in the second calculation data memory. Namely, each of the values X which have been stored in the data memory before the implementation of step S504 is changed by the amount equal to the shifting value which has been updated in step S503.

Then, the control flow goes to step S505 to determine whether the number of the values X stored in the second calculation data memory is sufficient to permit the calculation of the moving average P. If a negative decision (NO) is obtained in step S505, one cycle of execution of the routine is terminated. If an affirmative decision (YES) is obtained in step S505, step S506 is implemented to calculate the moving average P on the basis of the values X and store the calculated moving average P in the data memory. Thus, each of the moving average values P stored before the implementation of step S506 is updated on the basis of the values X updated in step S504.

Then, steps S507 and S508 are implemented similarly to steps S506 and S506, to update the first derivative values T. Step S508 is then implemented to determine whether the SECOND DERIVATIVE USE command is present. If a negative decision (NO) is obtained in step S509, one cycle of execution of the present routine is terminated. If an affirmative decision (YES) is obtained in step S509, the control flow goes to steps S510 and S511 similar to steps S506 and S507, to update the second derivative values D.

It will be understood from the foregoing description of the illustrated embodiment that the grinding machine 10 constitutes one form of the working machine 1 in FIG. 36 while the automatic sizing device 14 and the motor controller 15 constitute one form of the machine control means 2 in FIG. 36, and that the post-process measuring device 16 constitutes one form of the measuring device 3 in FIG. 36. It will also be understood that the portion of the control device 20 assigned to execute the compensating routine of FIGS. 4–10 except steps S64, S68 and S84 of FIGS. 8A and 8C constitutes one form of the compensating value determining means 4 in FIG. 36, while the portion of the control device 20 assigned to implement the steps S64, S68 and S84 constitutes one form of the compensating value applying means 5 in FIG. 36.

In the illustrated embodiment of the present invention described above, the feedback compensating apparatus is adapted to control the automatic sizing apparatus 14 used in the grinding system for grinding the journals 28 (outer cylindrical surfaces) of the workpiece in the form of the crankshaft 26. However, the principle of the present invention is equally applicable to the feedback compensating apparatus for an automatic sizing device of other working systems such as a honing system adapted to hone the inner cylindrical surfaces of cylinder bores in cylinder blocks of an engine of a motor vehicle.

While the present invention has been described in its presently preferred embodiments and some modifications thereof, it is to be understood that the present invention may be otherwise embodied, in the light of the foregoing teachings.

What is claimed is:

1. A feedback compensating apparatus for a working system including (a) a working machine for performing successive working operations on a plurality of workpieces, (b) machine control means for determining a working condition of the working machine on the basis of an extraneous compensating signal and controlling the working machine according to the determined working condition, and (c) a measuring device for measuring dimensional values of the workpieces processed by the working machine, said measuring device being positioned relative to said working machine such that there exist pre-measured workpieces which have been processed by the machine and which have not been measured by the measuring device, said feedback compensating apparatus including compensating value determining means for determining an automatic compensating value as said extraneous compensating signal for the workpieces to be processed next, on the basis of a plurality of said dimensional values which have been measured by said measuring device and stored in memory means, and compensating value applying means for applying the determined automatic compensating value to said machine control means, wherein an improvement comprises:

said compensating value determining means being operable in an automatic compensation mode in which each automatic compensating cycle begins with commencement of the storing in said memory means of said dimensional values of the workpieces measured by said measuring device and ends with determination of a present automatic compensating value (Ui), and in a manual compensation mode in which a manual compensating value (U') is determined also as said extraneous compensating signal in response to and on the basis of a manual compensation command entered by an operator of said working system;

said compensating value determining means includes a first and a second operating state which are selectable in said automatic compensation mode, said compensating value determining means operating in said first operating state to determine said present automatic compensating value (Ui) on the basis of a plurality of first estimated dimensional values of the workpieces which are stored in said memory means in said automatic compensating cycle, each of said first estimated dimensional values being obtained by adding a last compensating value (U') to the dimensional value (X) of the corresponding workpiece which is measured by said measuring device, on an assumption that said corresponding workpiece is processed under the working condition influenced by said last compensating value, said compensating value determining means operating in said second operating state to determine said present automatic compensating value on the basis of a plurality of second estimated dimensional values of the workpieces which are stored in said memory means in said automatic compensating cycle, each of said second estimated dimensional values being obtained by adding a sum of said last compensating value (U') and a previous compensating value (Ui–2, Ui–1) immediately preceding said last compensating value, to the dimensional value (X) of the corresponding workpiece which is measured by said measuring device; and said compensating value applying means (5) applying said present automatic compensating value and said manual compensating value to said machine control means.

2. A feedback compensating apparatus according to claim 1, wherein when said manual compensation command is generated in a present automatic compensating cycle, said compensating value determining means terminates said present automatic compensating cycle, determines said manual compensating value (U'), and then starts a new automatic compensating cycle, and wherein where said new automatic compensating cycle is such that an influence of a previous automatic compensating value (Ui–2) determined in a previous automatic compensating cycle immediately preceding said present automatic compensating cycle appears on the measured dimensional values of the processed workpieces before an influence of said manual compensating value (U') appears on said measured dimensional values, so that said new automatic compensating cycle consists of a first period from a beginning thereof to a first moment at which the influence of said previous automatic compensating value (Ui–2) as said previous compensating value appears on said measured dimensional values, a second period from said first moment to a second moment at which the influence of said manual compensating value (U') as said last compensating value appears on said measured dimensional values, and a third period from said second moment to an end of said new automatic compensating cycle, said compensating value determining means operates to obtain said second estimated dimensional values by adding a sum of said previous automatic compensating value (Ui–2) and said manual compensating value (U') to each of the dimensional values (X) of the workpieces which are measured in said first period, said compensating value determining means further obtaining said first estimated dimensional values by adding only said manual compensating value (U') to each of the dimensional values of the workpieces which are measured in said second period, said compensating value determining means storing in said memory means said first and second estimated dimensional values, and the dimensional values of the workpieces which are measured by said measuring device (3) in said third period.

3. A feedback compensating apparatus according to claim 1, wherein when said manual compensation command is generated in a present automatic compensating cycle, said compensation value determining means continues said present automatic compensating cycle in which said present automatic compensating value (Ui) is determined on the basis of the dimensional values of the workpieces measured by said measuring device prior to the generation of said manual compensation command as well as the dimensional values of the workpieces measured after the generation of said manual compensation command.

4. A feedback compensating apparatus according to claim 3, wherein where said present automatic compensating cycle is such that an influence of a previous automatic compensating value (Ui–1) determined in a previous automatic compensating cycle immediately preceding said present automatic compensating cycle appears on the measured dimensional values of the processed workpieces before an influence of said manual compensating value (U') appears on said measured dimensional values, so that said present automatic compensating cycle consists of a first period from a beginning thereof to a first moment at which the influence of said previous automatic compensating value (Ui–1) as said previous compensating value appears on said measured dimensional values, a second period from said first moment to a second moment at which the influence of said manual compensating value (U') as said last compensating value appears on said measured dimensional values, and a third period from said second moment to an end of said new automatic compensating cycle, said compensating value determining means operates to obtain said second estimated dimensional values by adding a sum of said previous automatic compensating value (Ui–1) and said manual compensating value (U') to each of the dimensional values (X) of the workpieces which are measured in said first period, said compensating value determining means further obtaining said first estimated dimensional values by adding only said manual compensating value (U') to each of the dimensional values of the workpieces which are measured in said second period, said compensating value determining means storing in said memory means said first and second estimated dimensional values, and the dimensional values of the workpieces which are measured by said measuring device (3) in said third period.

5. A feedback compensating apparatus according to claim 1, wherein said working system further includes an in-process measuring device for measuring the dimensional values of the workpieces while the workpieces are being processed by said working machine, as well as a post-process measuring device as said measuring device, and wherein said machine control means includes an automatic sizing device for terminating the working operation on each workpiece when the dimensional value of said each workpiece measured by said in-process measuring device reaches a reference value, said apparatus comprising a controller incorporating said compensating value determining means and said compensating value applying means, said compensating value determining means being connected to said post-process measuring device, and said compensating value applying means being connected to said automatic sizing device to apply the determined automatic or manual compensating value (Ui, U') to said automatic sizing device to adjust said reference value, and said compensating value determining means determining said automatic compensating value (Ui) on the basis of at least an error value (R) of the dimensional value (X) measured by said post-processing measuring device with respect to a nominal value ($A_o$).

6. A method of processing a plurality of workpieces by a working system including (a) a working machine for performing successive working operations on a plurality of workpieces, (b) machine control means for determining a working condition of the working machine on the basis of an extraneous compensating signal and controlling the working machine according to the determined working condition, and (c) a measuring device for measuring dimensional values of the workpieces processed by the working machine, said measuring device being positioned relative to said working machine such that there exist pre-measured workpieces which have been processed by the machine and which have not been measured by the measuring device, said method comprising the steps of (i) determining an automatic compensating value as said extraneous compensating signal for the workpieces to be processed next, on the basis of a plurality of said dimensional values which have been measured by said measuring device and stored in memory means, (ii) determining a manual compensating value also as said extraneous compensating signal in response to and on the basis of a manual compensation command entered by an operator of the working system, and (iii) applying the determined automatic compensating value and manual compensating value to said machine control means, wherein an improvement comprises:

said step of determining an automatic compensating value comprising successive automatic compensating cycles each of which begins with commencement of the storing in said memory means of said dimensional values of the workpieces measured by said measuring device and ends with determination of a present automatic compensating value (Ui); and said automatic compensation including a first and a second state which are selectively established, said automatic compensation being effected in said first state to determine said present automatic compensating value (Ui) on the basis of a plurality of first estimated dimensional values of the workpieces which are stored in said memory means in said automatic compensating cycle, each of said first estimated dimensional values being obtained by adding a last compensating value (U') to the dimensional value (X) of the corresponding workpiece which is measured by said measuring device, on an assumption that said corresponding workpiece is processed under the working condition influenced by said last compensating value, said automatic compensation being effected in said second state to determine said present automatic compensating value on the basis of a plurality of second estimated dimensional values of the workpieces which are stored in said memory means in said automatic compensating cycle, each of said second estimated dimensional values being obtained by adding a sum of said last compensating value (U') and a previous compensating value (Ui–2, Ui–1) immediately preceding said last compensating value, to the dimensional value (X) of the corresponding workpiece which is measured by said measuring device.

\* \* \* \* \*